(12) United States Patent
Suemura et al.

(10) Patent No.: US 6,760,346 B1
(45) Date of Patent: Jul. 6, 2004

(54) PACKET SWITCHING NETWORK

(75) Inventors: Yoshihiko Suemura, Tokyo (JP); Soichiro Araki, Tokyo (JP); Yoshiharu Maeno, Tokyo (JP); Akio Tajima, Tokyo (JP); Seigo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/478,405

(22) Filed: Jan. 6, 2000

(30) Foreign Application Priority Data

Jan. 6, 1999 (JP) ............................................ 11-000820
May 28, 1999 (JP) ............................................ 11-149041

(51) Int. Cl.⁷ .................................................. H04J 3/06
(52) U.S. Cl. ...................................... 370/504; 370/517
(58) Field of Search ......................... 370/503, 504–520, 370/395.1, 389, 395.3, 395.31, 395.4

(56) References Cited

U.S. PATENT DOCUMENTS

| 5,091,905 A | 2/1992 | Amada |
| 5,197,097 A | 3/1993 | Takahashi et al. |
| 5,485,298 A | 1/1996 | Haas |
| 5,526,156 A * | 6/1996 | Bostica et al. ................. 398/54 |
| 5,654,815 A * | 8/1997 | Bunse .......................... 398/154 |

FOREIGN PATENT DOCUMENTS

| EP | 0 807 886 A2 | 11/1997 |
| JP | 60-137198 | 7/1985 |
| JP | 3-207139 | 9/1991 |
| JP | 6-125356 | 5/1994 |
| JP | 7-154422 | 6/1995 |
| JP | 7-193562 | 7/1995 |
| JP | 7-283826 | 10/1995 |
| JP | 9-307562 | 11/1997 |
| JP | 10-304406 | 11/1998 |

* cited by examiner

*Primary Examiner*—David Vincent
(74) *Attorney, Agent, or Firm*—Foley & Lardner

(57) ABSTRACT

A packet switching network which allows the duration of guard time of each packet to be reduced to a minimum and the transmission efficiency of the network to be increased is disclosed. The sending nodes send the packet switch packets each having a guard time added thereto. The receiving nodes receive the packets from the packet switch. Each of the receiving nodes includes a switch timing detector for detecting switch timing of the packet switch based on a serial signal received from the packet switch, and a timing holder for holding the switch timing.

7 Claims, 41 Drawing Sheets

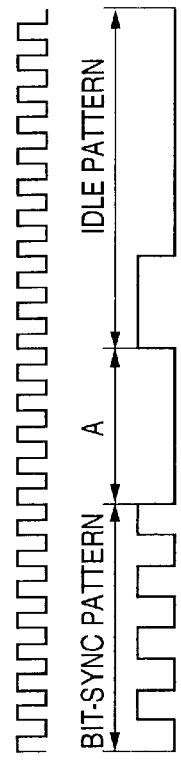
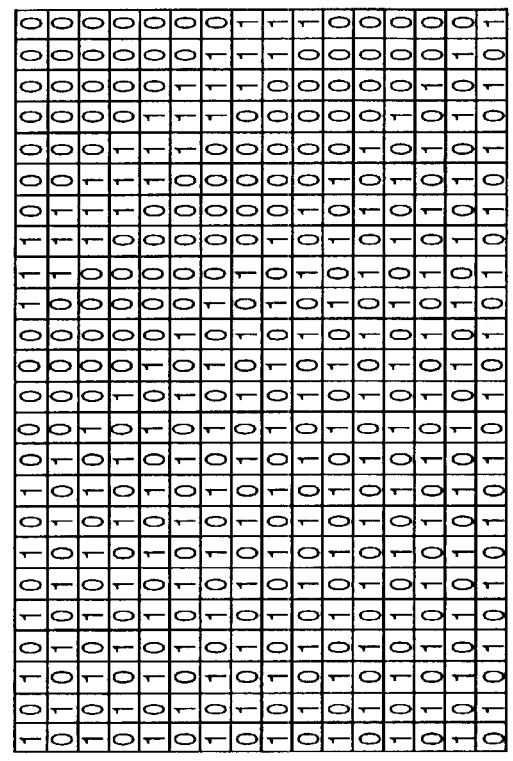
FIG. 19A SERIAL CLOCK 113
FIG. 19B SERIAL SIGNAL 207
FIG. 19C SHIFT REGISTER 80 (q0–q15)
FIG. 19D ENABLE SIGNAL 216
FIG. 19E SIGNAL 218
FIG. 19F SIGNAL 219
FIG. 19G SWITCH TIMING SIGNAL 204
FIG. 19H COUNT 205

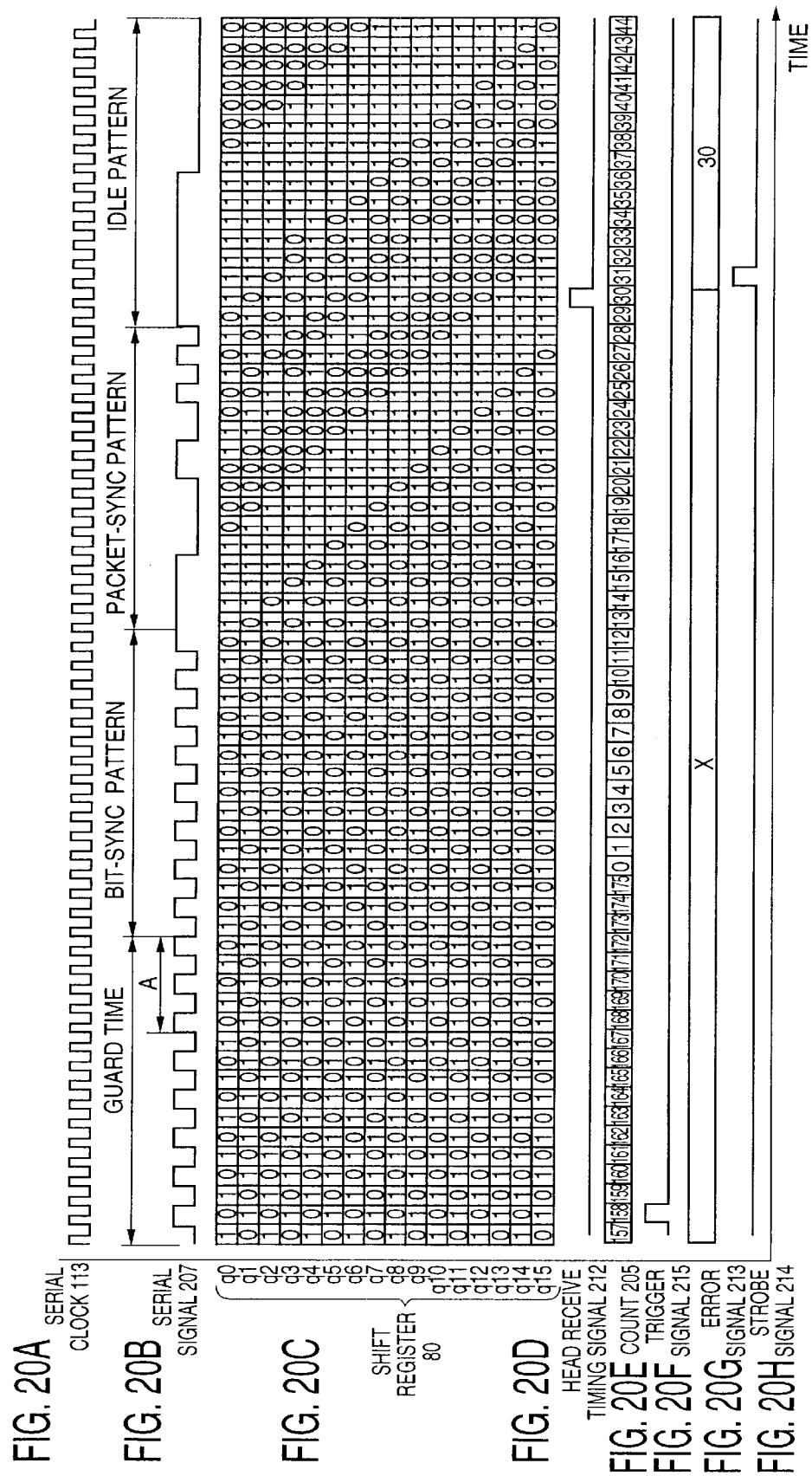

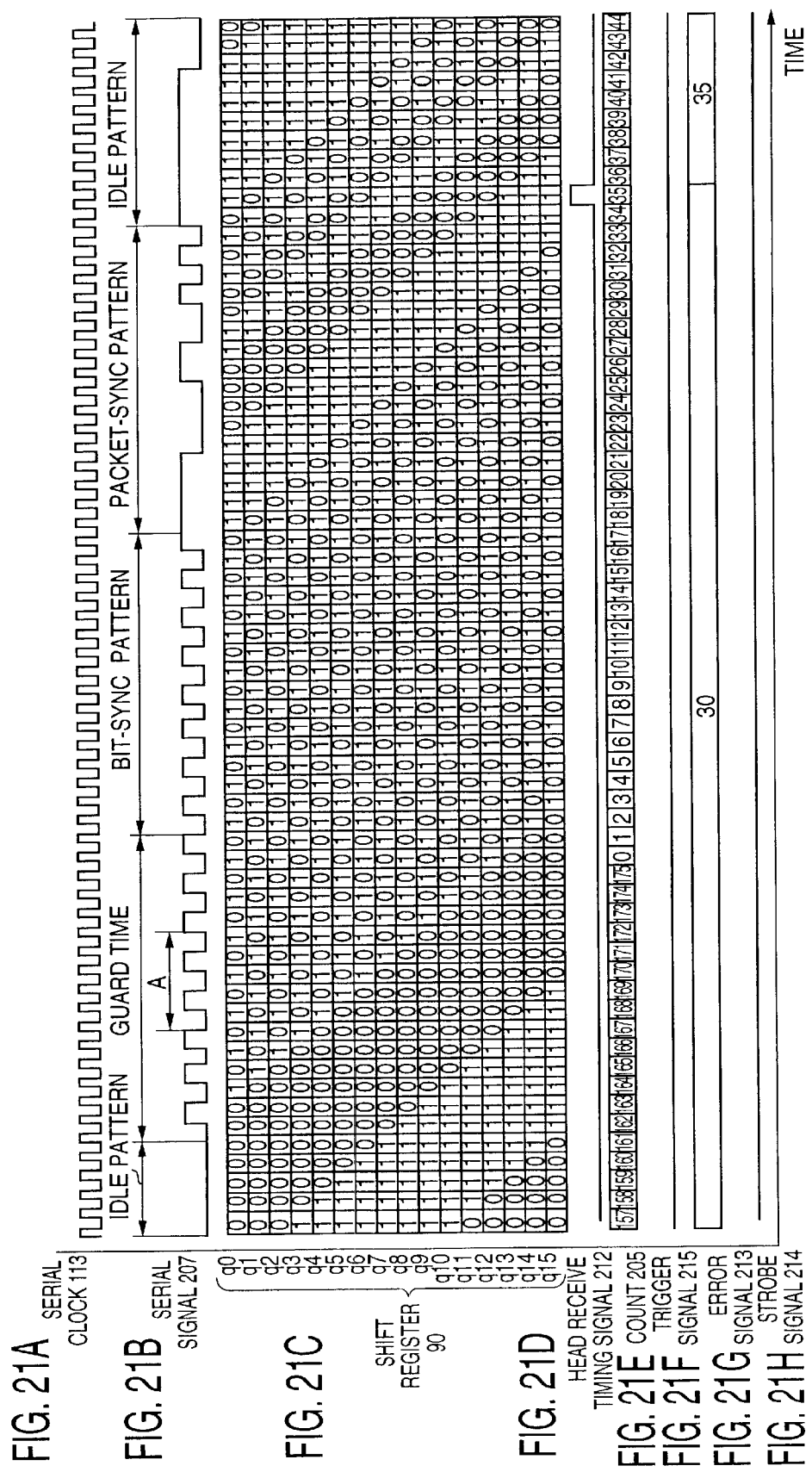

FIG. 27

FOR HEAD RECEIVE TIMING DETECTOR 56

| 220.15,220.14,220.13, · · ,220.0 | 212.0 | 212.1 |
|---|---|---|
| 0000000000000001 | 1 | 0000 |
| 0000000000000010 | 1 | 0001 |
| 0000000000000100 | 1 | 0010 |
| 0000000000001000 | 1 | 0011 |
| 0000000000010000 | 1 | 0100 |
| 0000000000100000 | 1 | 0101 |
| 0000000001000000 | 1 | 0110 |
| 0000000010000000 | 1 | 0111 |
| 0000000100000000 | 1 | 1000 |
| 0000001000000000 | 1 | 1001 |
| 0000010000000000 | 1 | 1010 |
| 0000100000000000 | 1 | 1011 |
| 0001000000000000 | 1 | 1100 |
| 0010000000000000 | 1 | 1101 |
| 0100000000000000 | 1 | 1110 |
| 1000000000000000 | 1 | 1111 |
| OTHER | 0 | HOLD PREVIOUS VALUE |

FIG. 28

FOR SWITCH TIMING DETECTOR 26

| 216 | 220.16,220.15,220.14, · · ,221.0 | 214.0 | 204.1 |
|---|---|---|---|
| 1 | 00000000000000001 | 1 | 0000 |
| 1 | 00000000000000011 | 1 | 0001 |
| 1 | 00000000000000111 | 1 | 0010 |
| 1 | 00000000000001111 | 1 | 0011 |
| 1 | 00000000000011111 | 1 | 0100 |
| 1 | 00000000000111111 | 1 | 0101 |
| 1 | 00000000001111111 | 1 | 0110 |
| 1 | 00000000011111111 | 1 | 0111 |
| 1 | 00000000111111111 | 1 | 1000 |
| 1 | 00000001111111111 | 1 | 1001 |
| 1 | 00000011111111111 | 1 | 1010 |
| 1 | 00000111111111111 | 1 | 1011 |
| 1 | 00001111111111111 | 1 | 1100 |
| 1 | 00011111111111111 | 1 | 1101 |
| 1 | 00111111111111111 | 1 | 1110 |
| 1 | 01111111111111111 | 1 | 1111 |
| 1 | OTHER | 0 | HOLD PREVIOUS VALUE |
| 0 | X | 0 | HOLD PREVIOUS VALUE |

Y: HEAD RECEIVE TIMING SIGNAL 212.0
CHANGES TO "1" IN WINDOW

N: HEAD RECEIVE TIMING SIGNAL 212.0
DOES NOT CHANGE TO "1" IN WINDOW

PACKET SWITCHING NETWORK

BACKGROUND OF THE INVENTION

1. Field of the Invention

The present invention relates to a packet switching network, and more particularly relates to a packet switching network in which an electric switch or an optical switch is used to carry out packet switching among multiple communication lines.

2. Description of the Related Art

A packet switching method has been widely used as a method for exchanging data in a communications network. In a communications network using a packet switching method, that is, in a packet switching network, a sending node assembles data into packets having a fixed length or a variable length, each packet having a header including a destination address of the data. The packets are sent on the network.

A packet switch in the network performs packet switching for every packet by referring to the destination address of the header thereof. A receiving node assembles packets received from the network into the original data.

An example of a packet switching network is an ATM network, which uses an asynchronous transfer mode. In the ATM network, data is transmitted in a 53-bite fixed-length packet called a cell.

Most conventional packet switches are implemented with a digital switch including electrical circuit flip-flops. Therefore, at the input port of the packet switch, bit synchronization is required to synchronize received packets to the internal clock of the packet switch. In other words, with the digital switch, when bit synchronization has been established and the switching time is sufficiently shorter than the bit interval, no bits in the packet are lost.

In the packet switch, it is necessary to perform packet synchronization after the bit synchronization has been established. Packet synchronization can be achieved by detecting the boundaries between packets. Since the switching during a packet destroys the packet, the switching must be carried out at the boundary between packets.

FIG. 1 shows an example of a conventional packet switch network using an electric digital switch. It is assumed that the packet switching network is composed of sending nodes 1.0 to 1.3, packet switching system 300, and receiving nodes 2.0 to 2.3. A system clock 111 has a period equal to the bit length in a packet, and a packet clock 112 has a period equal to the packet length. The system clock 111 and the packet clock 112 are distributed to the sending nodes 1.0 to 1.3, the packet switching system 300, and the receiving nodes 2.0 to 2.3.

The packet switching system 300 includes bit sync circuits 301.0 to 301.3 comprising elastic memories, a packet sync circuit 302, and a switch 306. The packet sync circuit 302 includes packet sync pattern detectors 303.0 to 303.3, FIFO memories 304.0 to 304.3, and a controller 305.

The sending nodes 1.0 to 1.3 send packets to the packet switching system 300, each packet having a packet sync pattern added thereto. The received packet is synchronized to the system clock 111 of the packet switching system 300 by the bit sync circuits 301.0 to 301.3.

The bit-synchronized packet is input to a packet sync circuit 302. When the packet sync pattern detectors 303.0 to 303.3 in the packet sync circuit 302 detect the packet synchronization pattern, they send a sync pattern detection signal to the controller 305. The controller 305 compares the timing of the synchronization pattern detection signal received from each of the synchronization pattern detectors 303.0 to 303.3 with the timing (leading edge) of the packet clock 112 to determine the time difference between them.

The respective FIFO memories 304.0 to 304.3 of the ports receive information on the time difference obtained by the controller 305, and then absorb the time difference by applying an appropriate delay to the corresponding packet. Since the respective head packets of all the ports are in synchronization with the packet clock 112 when output from the packet sync circuit 302, the digital switch 306 switches at the leading edge of the packet clock 112. In this manner, the switches are switched at the boundary of packets, so that loss of bits are avoided.

However, in the state-of-the-art of semiconductor technology, electric digital switches have a disadvantage that a clock frequency of several hundreds MHz is the maximum that allows the switch to operate. Recently, using optical transmission technology, it is possible to transmit between nodes at approximately 10 Gbps (bit/sec), but it is not possible for the electric digital switch to switch 10-Gbps serial signals as they are.

In order to increase the bit rate per port, the degree of signal parallelism must be increased. For instance, in order to achieve a per-port bit rate of 10 Gbps on condition that the switch operates at up to a clock frequency of 100 MHz, it would take one hundred 100-Mbps signals to form one port. That is, the serial signals received from the sending nodes are converted from serial to parallel, the parallel signals are exchanged at the switch, and thereafter the parallel signals are converted from parallel to serial and then the serial signals are sent to the receiving nodes. For the above reasons, there is an inevitable increase in the size and cost of the hardware.

Accordingly, in recent years, an optical packet switching method using an optical switch has come to much attention. The use of the optical packet switching method enables packets that have been sent directly as a 10-Gbit/sec serial optical signal to be switched without further alteration, whereby the hardware can be miniaturized and made inexpensive.

However, for the reasons explained below, the bit and packet synchronization methods used in the electric digital switch cannot be directly applied to an optical packet switch.

Firstly, there are no practical optical flip-flops at present. Therefore, it is not possible to use the clock of the packet switch to bring input packets in bit-sync with the clock. Since packet synchronization cannot be achieved without bit synchronization, in the conventional example, the packet synchronization cannot be obtained.

Secondly, in general, optical switches do not have a function of monitoring optical signals. Therefore, they cannot even detect a packet synchronization pattern. It is possible to monitor an optical signal by splitting a part of the optical signal. However, an optical receiver is needed to do so, consequently increasing costs.

Thirdly, as the bit rate of the signals to be switched increases, the switching time cannot be ignored with respect to the bit interval and thereby bits are likely to be erased. For instance, when the switching time is 1 nanosecond, ten bits of the 10-Gbps signal will be erased by the switching.

The above three problems may be developed not only in the optical packet switching method but also in cases such as the switching of high speed serial signals using an electric analog switch. To solve such problems, a method for providing a guard time at the boundary between packets has been proposed. For instance, in a packet communications network disclosed in Japanese Patent Application Laid-open (JP-A) No. 60-137198, a packet (a time slot in JP-A No. 60-137198) is comprised of a guard time, a preamble for synchronization, and data. At the receiving node, the preamble is used to obtain synchronization for each packet.

In the packet switch, even without bit synchronization or packet synchronization, as long as sufficient time is left for a guard time, the switching of the switch takes place within the guard time of the packet, and consequently no bits of the packet are lost.

Furthermore, Japanese Patent Application Laid-open (JP-A) No. 6-125356 discloses a synchronization circuit used in a packet communication network. At the sending side, the synchronization circuit is comprised of guard time setting means and bit-sync pattern generating means, packet-sync pattern generating means (frame synchronization in JP-A No. 6-125356). At the receiving side, the synchronization circuit is comprised of bit synchronization means, packet synchronization means and a counter.

The sending side sends a packet having a guard time, a bit-sync pattern, and a packet-sync pattern added thereto. In the receiving side, the bit synchronization means first starts bit synchronization, and then, when bit synchronization has been established according to the bit-sync pattern of the packet, the packet synchronization means is notified of the bit-sync establishment.

Upon receipt of the notification, the packet synchronization means starts packet synchronization, and after packet synchronization has been established according to the packet synchronization pattern of the packet, notifies the counter of that fact. The counter counts the clock, and when the count reaches the number of data bits of the packet, the counter notifies that fact to the bit sync circuit. When receiving it, the bit sync circuit starts the bit synchronization of a next packet.

In this manner, at the time when the packet sync circuit starts its operation, bit synchronization is already established, enabling the packet synchronization pattern to be detected with certainty. In addition, even when an irregular pattern occurs as a result of switching the switch during guard time, there is no case where the packet sync circuit erroneously determines it as a packet synchronization pattern.

Furthermore, in an optical network device disclosed in Japanese Patent Application Laid-open (JP-A) No. 9-307562, in addition to providing guard time for the boundary between packets, the entire network is designed to operate synchronously by adjusting the length of an optical fiber transmission line from a sending node to the optical switch and the length of an optical fiber transmission line from the optical switch to a receiving node. As a result, it is no longer necessary for the receiving node to detect the packet synchronization pattern to achieve packet synchronization, whereby no packet synchronization pattern is needed, and packet transmission latency time can be reduced.

According to the conventional packet switching network mentioned above, the deviation of a timing of an input packet to the switch cannot be absorbed unless the guard time is sufficiently long. The guard time is nothing more than a waste of time for the network, since packets cannot be transmitted during the guard time. Therefore, the longer the guard time, the lower the transmission efficiency of the network.

Conversely, in order to increase the transmission efficiency of the network by minimizing the length of guard time, the length of the transmission path from a sending node to the packet switch must be precisely adjusted. In particular, in order for the optical network device disclosed in Japanese Patent Application Laid-down (JP-A) No. 9-307562 to synchronize the packets, the transmission path from the packet switch to the receiving node must also be precisely adjusted.

SUMMARY OF THE INVENTION

Accordingly, it is an object of the present invention to provide a packet switching network in which the duration of guard time can be reduced to a minimum, and the transmission efficiency of the network can be increased without precisely adjusting the length of a transmission path.

According to a first aspect of the present invention, a packet switching network includes a plurality of sending nodes; a plurality of receiving nodes; and a packet switch for switching packets from the sending nodes to the receiving nodes, wherein the sending nodes send the packet switch packets each having a guard time added thereto and the receiving nodes receive the packets from the packet switch. Each of the receiving nodes includes: a switch timing detector for detecting switch timing of the packet switch based on a serial signal received from the packet switch; and a timing holder for holding the switch timing.

According to a second aspect of the present invention, a packet switching network includes a plurality of sending nodes; a plurality of receiving nodes; and a packet switch for switching packets from the sending nodes to the receiving nodes, wherein the sending nodes send the packet switch packets each having a guard time added thereto and the receiving nodes receive the packets from the packet switch. Each of the sending nodes includes a delay controller for adjusting an amount of delay of a packet to be sent so that the network operates in synchronization with the switch timing of the packet switch.

Each of the receiving nodes preferably includes: a switch timing detector for detecting switch timing of the packet switch based on a serial signal received from the packet switch; a packet head detector for detecting head receive timing of a packet based on a packet synchronization pattern included in the packet received from the packet switch; and a time difference detector for detecting a time difference between the switch timing and the head receive timing. The delay controller changes the amount of delay of a packet to be sent depending on the time difference.

According to a third aspect of the present invention, a packet switching network includes a plurality of sending nodes; a plurality of receiving nodes; and a packet switch for switching packets from the sending nodes to the receiving nodes, wherein the sending nodes send the packet switch packets each including a packet synchronization pattern and having a guard time added thereto and the receiving nodes receive the packets from the packet switch. Each of the receiving nodes comprises: a packet synchronization pattern detector for detecting the packet synchronization pattern from a received packet; a switch timing detector for detecting switch timing of the packet switch based on a serial signal received from the packet switch; a packet head detector for detecting head receive timing of a packet based on the packet synchronization pattern; a window generator for generating a window which is a certain fixed period of time taking as its center a detection timing at which the packet synchronization pattern is detected; and a controller controlling the packet synchronization pattern detector such that the packet synchronization pattern is detected only within the window after the detection timing.

Preferably, the controller determines that packet synchronization is established only when the packet synchronization pattern is consecutively detected within the window a predetermined number of times, and determines that packet synchronization is lost only when the packet synchronization pattern fails to be detected within the window consecutively the predetermined number of times.

According to a fourth aspect of the present invention, a packet switching network includes: a plurality of sending nodes; a plurality of receiving nodes; and a packet switch for switching packets from the sending nodes to the receiving nodes, wherein the sending nodes send the packet switch packets each having a guard time added thereto and the receiving nodes receive the packets from the packet switch. The packet switch includes: N input ports; N output ports; a N×N switching device for selecting one of N×N interconnections to switch a packet from one of the N input ports to one of the N output ports; N×N variable delay devices provided respectively to the N×N interconnections. Each of the receiving nodes includes a switch timing detector for detecting switch timing of the packet switch based on a serial signal received from the packet switch; a packet head detector for detecting head receive timing of a packet based on a packet synchronization pattern included in the packet received from the packet switch; and a time difference detector for detecting a time difference between the switch timing and the head receive timing. A first receiving node detects a first time difference occurring in a first interconnection through which the first receiving node is connected to a sending node, and a second receiving node detects a second time difference occurring in a second interconnection through which the second receiving node is connected to the sending node, wherein a third time difference between the first and second time differences is used to control an amount of delay of a variable delay device associated with one of the first and second interconnections.

According to a fifth aspect of the present invention, in a packet switching network comprising a plurality of sending nodes; a plurality of receiving nodes; and a packet switch for switching packets from the sending nodes to the receiving nodes, wherein the sending nodes send the packet switch packets each having a guard time added thereto and the receiving nodes receive the packets from the packet switch, each of the sending nodes comprising a delay controller for adjusting an amount of delay of a packet to be sent, a control method comprises the steps of:

at start up,
in each of the receiving nodes,
a) detecting switch timing of the packet switch based on a serial signal received from the packet switch;
b) detecting head receive timing of a packet based on a packet synchronization pattern included in the packet received from the packet switch;
c) calculating a time difference between the switch timing and the head receive timing; and
in each of the sending nodes,
d) adjusting the amount of delay of a packet to be sent depending on the time difference.

Preferably, when the network is in operation, the control method further comprises the steps of:
sending a packet including a sending-node address from a sending node to a receiving node through the packet switch;

at the receiving node,
determining whether the sending-node address included in the packet received from the sending node is identical to a predetermined address; and
when the sending-node address is identical to the predetermined address, performing the step b).

alternatively, the control method further comprises the steps of: when the network is in operation,
sending a sending-node address associated with a sending node from the packet switch to a receiving node;
at the receiving node,
determining whether the sending-node address received from the packet switch is identical to a predetermined address; and
when the sending-node address is identical to the predetermined address, performing the step b).

BRIEF DESCRIPTION OF THE DRAWINGS

FIGS. 19A–19H are a timing chart showing the operation of a packet sync circuit in the switch timing detection mode in the third embodiment of the present invention;

FIGS. 20A–20H are a timing chart showing the operation of a packet sync circuit prior to delay adjusting in the delay adjustment mode according to the third embodiment of the present invention;

FIGS. 21A–21H are a timing chart showing the operation of a packet sync circuit after delay adjustment in the delay adjustment mode according to the third embodiment of the present invention;

FIG. 27 is a truth value chart showing the operation of the head receive timing detector of FIG. 26;

FIG. 28 is a truth value chart showing the operation of the switch timing detector of FIG. 26;

DESCRIPTION OF THE PREFERRED EMBODIMENTS

First Embodiment

Figure 1:
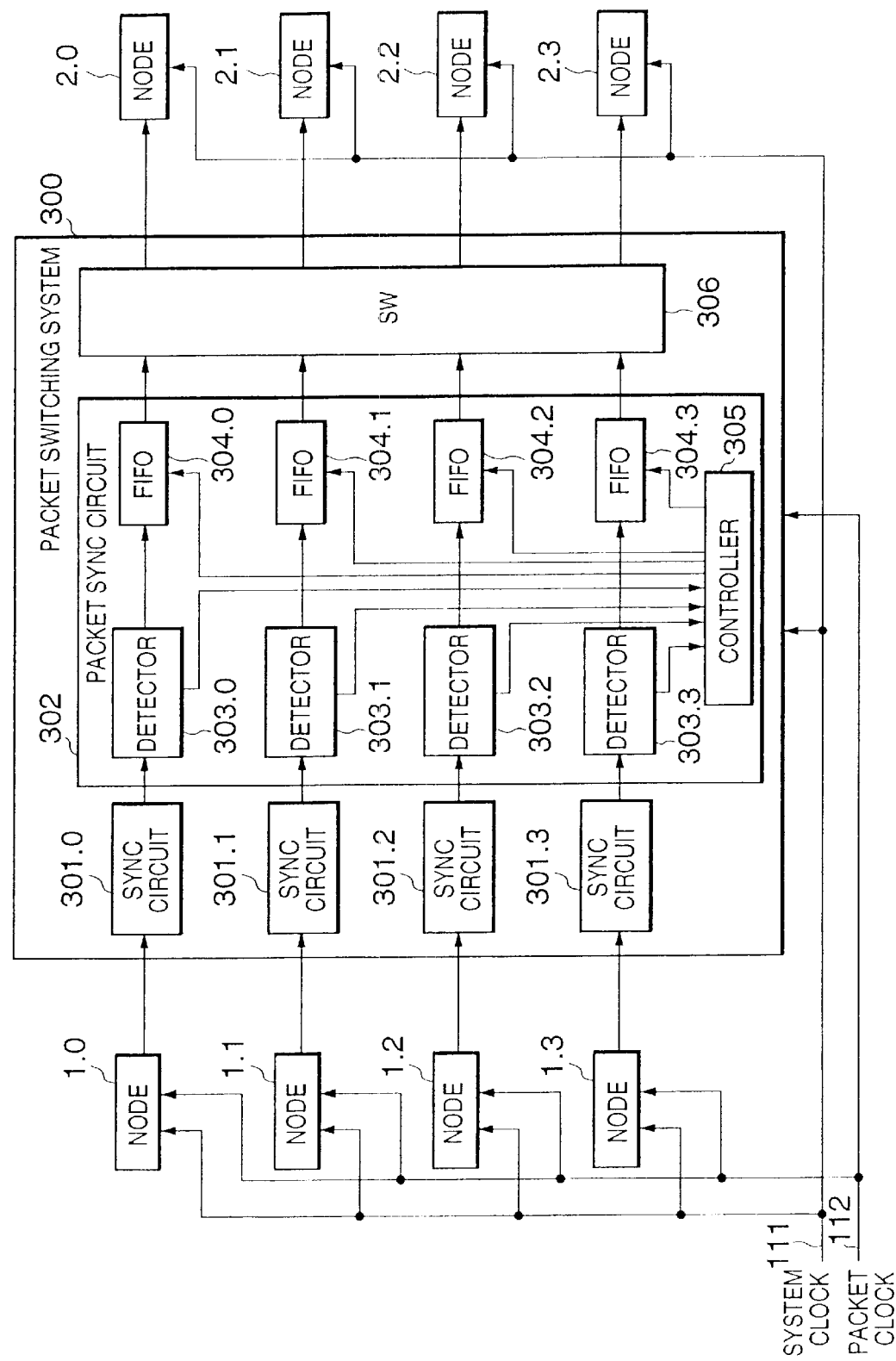
FIG. 1 is a block diagram showing a constitution of a conventional packet switching network using an electrical digital switch.
Figure 2:
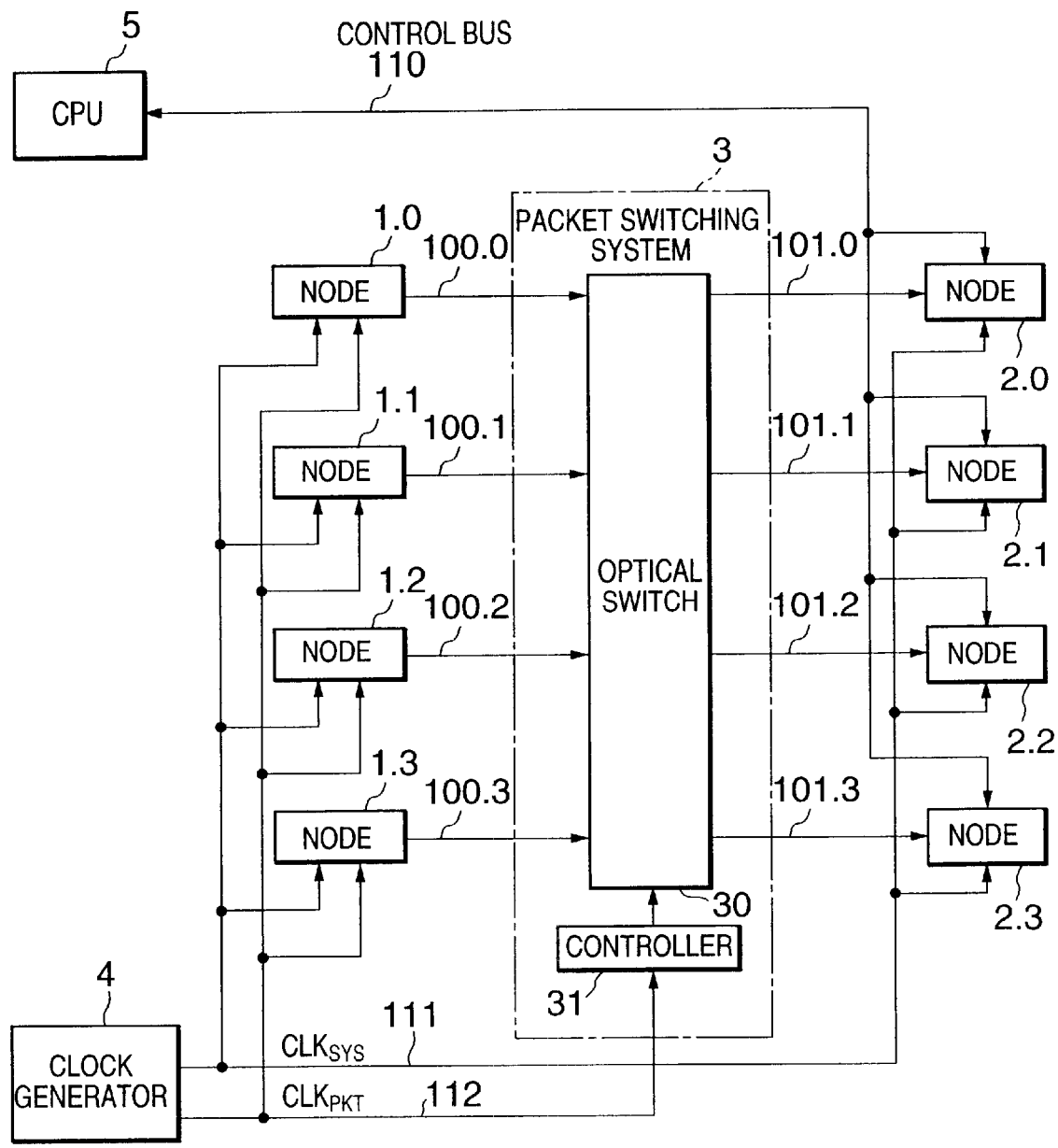
FIG. 2 is a block diagram showing a constitution of a packet switching network according to a first embodiment of the present invention.

Referring to FIG. 2, a packet switching network according to a first embodiment of the present invention is a 4×4 packet switching network which includes sending nodes 1.0 to 1.3, receiving nodes 2.0 to 2.3, a packet switching system 3, a clock generator 4, and a processor (CPU) 5.

Here, a system clock 111 generated by the clock generator 4 is distributed to the sending nodes 1.0 to 1.3 and the receiving nodes 2.0 to 2.3 by equal-length wiring where the length of a cable connecting the clock generator 4 and each of the sending nodes 1.0 to 1.3 and the receiving nodes 2.0 to 2.3 is the same. Therefore, the respective system clocks supplied from the clock generator 4 to the sending nodes 1.0 to 1.3 and the receiving nodes 2.0 to 2.3 are in phase.

Furthermore, a packet clock 112 has a period that is ten times that of the system clock 111, and is distributed by equal-length wiring to the sending nodes 1.0 to 1.3 and the packet switching system 3. All the receiving nodes 2.0 to 2.3 can communicate with the CPU 5 via a control bus 110. The packet switching system 3 is comprised of an optical switch 30 and a controller 31. The respective sending nodes 1.0 to 1.3 are connected to the packet switching system 3 by optical fibers 100.0 to 100.3 and the respective receiving nodes 2.0 to 2.3 are connected to the packet switching system 3 by optical fibers 101.0 to 101.3.

Figure 3:
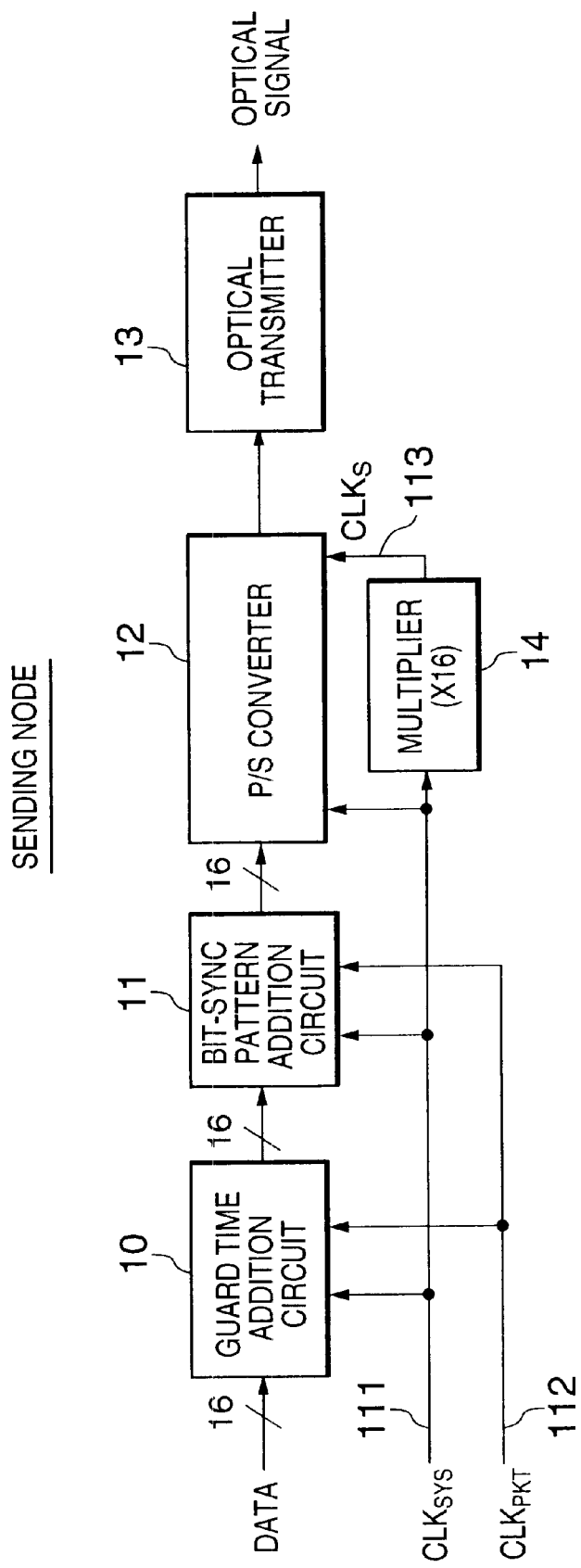
FIG. 3 is a block diagram showing a constitution of a sending node of FIG. 2.
Figure 4:
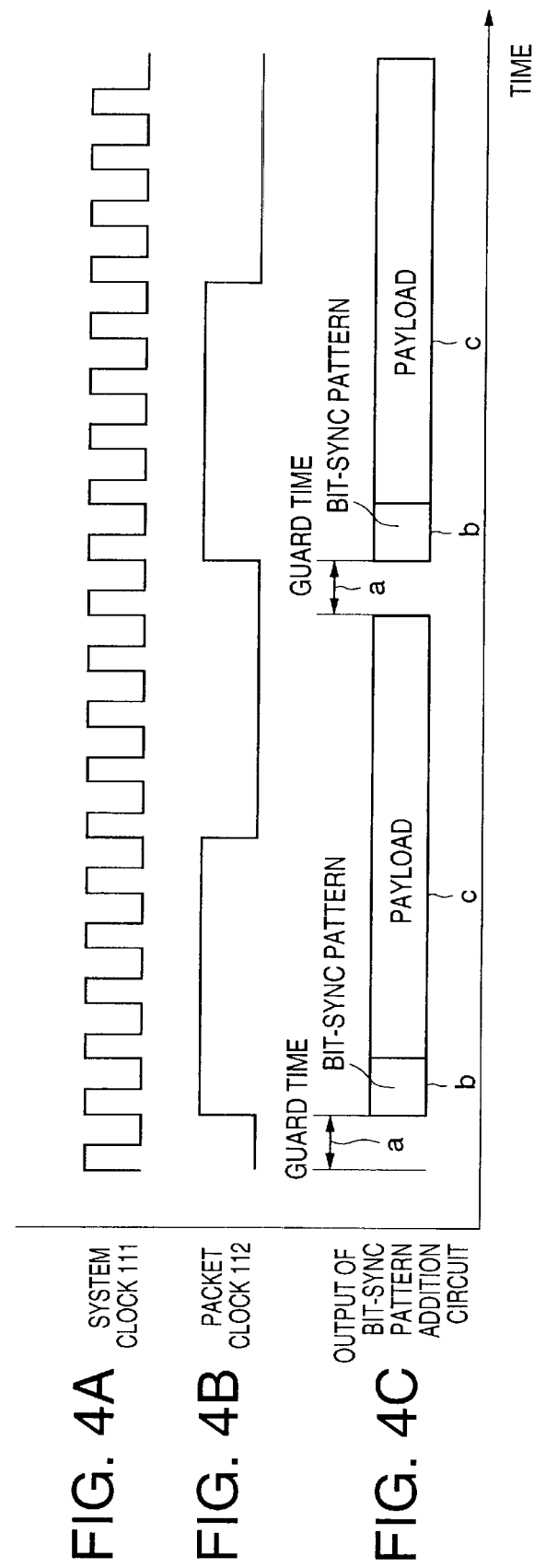
FIGS. 4A–4C are a timing chart showing an output signal of a bit synchronization pattern addition circuit in a sending node of FIG. 2 with respect to system and packet clocks.

FIG. 3 shows a sending node in the packet switching network, and FIG. 4 shows an output signal of a bit synchronization pattern addition circuit. 16-byte data is input as the payload c of a packet to a sending node in synchronization with the system clock 111. Since the width of a data bus is 16-bits, the length of the payload c is equal to eight periods of the system clock 111.

Referring to FIG. 3, the sending node is comprised of a guard time addition circuit 10, a bit synchronization pattern addition circuit 11, a parallel-to-serial (P/S) converter 12, an optical transmitter 13, and a multiplier 14.

The guard time addition circuit 10 first stores data as payload c (see FIG. 4), and outputs it to the bit sync pattern addition circuit 11 when the head of the payload c matches the leading edge of the packet clock 112. As shown in FIG. 4, since the payload c is eight system clock periods and a period of the packet clock 112 is ten system clock periods, 32 bits of "1" are inserted into the time period corresponding to two system clock periods (a and b in FIG. 4C) which is left after the payload c has been assigned.

The bit synchronization pattern addition circuit 11 delays the payload c input from the guard time addition circuit 10 by one system clock period, and then adds a 16-bit bit synchronization pattern b of "0101010101010101" to the head of the payload data. As a result, sixteen successive bits of "1" remain after the payload c as a guard time a. The parallel/serial converter 12 converts the output signal of the bit synchronization pattern addition circuit 11 from a 16-bit parallel signal to a serial signal.

The multiplier 14 multiplies the frequency of the system clock 111 by 16 to produce a serial clock 113. The serial signal output from the parallel/serial converter 12 is synchronized to the serial clock 113. The optical transmitter 13 converts the serial signal received from the parallel/serial converter 12 to an optical signal and transmits it to the packet switching system 3 through an optical fiber line. The sending nodes 1.0 to 1.3 of FIG. 2 have the same circuit configuration as shown in FIG. 3, and each operate in the same way.

The length of each of the optical fibers 100.0 to 100.3, which connect the respective sending nodes 1.0 to 1.3 and the packet switching system 3, is precisely adjusted so that the latency of the packet when transferred from the bit synchronization pattern addition circuit 11 of each of the sending nodes 1.0 to 1.3 to the optical switch 30 of the packet switching system 3 is equal to a time period calculated by "one packet clock period"–"eight serial clock periods", that is, a difference obtained by subtracting the eight serial clock periods from the one packet clock period. Moreover, the controller 31 of the packet switching system 3 switches the optical switch 30 in synchronization with the packet clock 112.

Therefore, packets are sent from the sending nodes 1.0 to 1.3 at the leading edge of the packet clock 112, pass through the packet switching system 3 simultaneous to the next leading edge of the packet clock 112 while the optical switch 30 switches at the midpoint of the guard time immediately before a packet.

Figure 5:
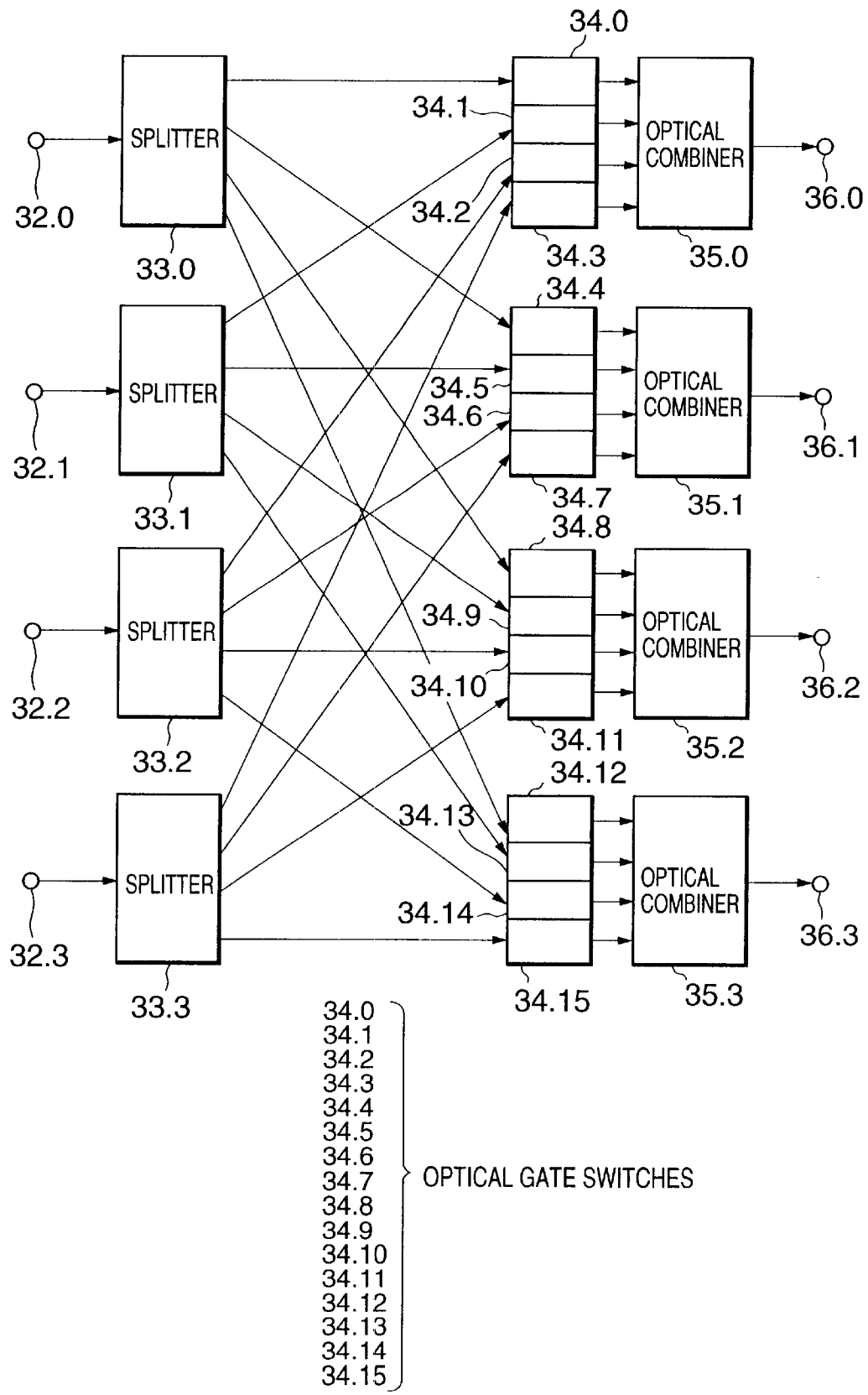
FIG. 5 is a block diagram showing a constitution of the optical switch of FIG. 2.

FIG. 5 shows the constitution of the optical switch 30 of FIG. 2. In FIG. 5, the optical switch 30 includes splitters 33.0 to 33.3, optical gate switches 34.0 to 34.15, and optical combiners 35.0 to 35.3. The optical gate switches 34.0 to 34.15 are grouped into four sets: first set of 34.0 to 34.3; second set of 34.4 to 34.7; third set of 34.8 to 341.1; and fourth set of 34.12 to 34.15. The respective optical signals input through the input ports 32.0 to 32.3 are split by the optical splitters 33-0 to 33-3, and the split signals are input to four sets of optical gate switches: 34.0 to 34.3; 34.4 to 34.7; 34.8 to 341.1; and 34.12 to 34.15, respectively.

The optical switch 30 is controlled by the optical gate switches 34.0 to 34.15 each switching on and off. Each of the optical gate switches 34.0 to 34.15 is comprised of a semiconductor optical amplifier, which switches on when an electrical current is applied thereto, allowing the optical signal to pass through, and switches off when the supply of current stops, blocking the optical signal. The four sets of optical gate switches: 34.0 to 34.3; 34.4 to 34.7; 34.8 to 341.1; and 34.12 to 34.15 are connected to the optical combiners 35.0 to 35.3, respectively. Therefore, by switching on one of four optical gate switches in each set, the optical signal input from an input port can be transferred to any of the output ports 36.0 to 36.3 via a corresponding one of the optical combiners 35.0 to 35.3.

In other words, the optical switch 30 functions as a 4×4 cross bar switch. For instance, by switching the optical gate switch 34.4 on, an optical signal input from the input port 32.0 can be output from the output port 36.1. The lengths of the optical fibers 101.0 to 101.3, which connect the packet switching system 3 and the receiving nodes 2.0 to 2.3, have not been precisely adjusted.

Figure 6:
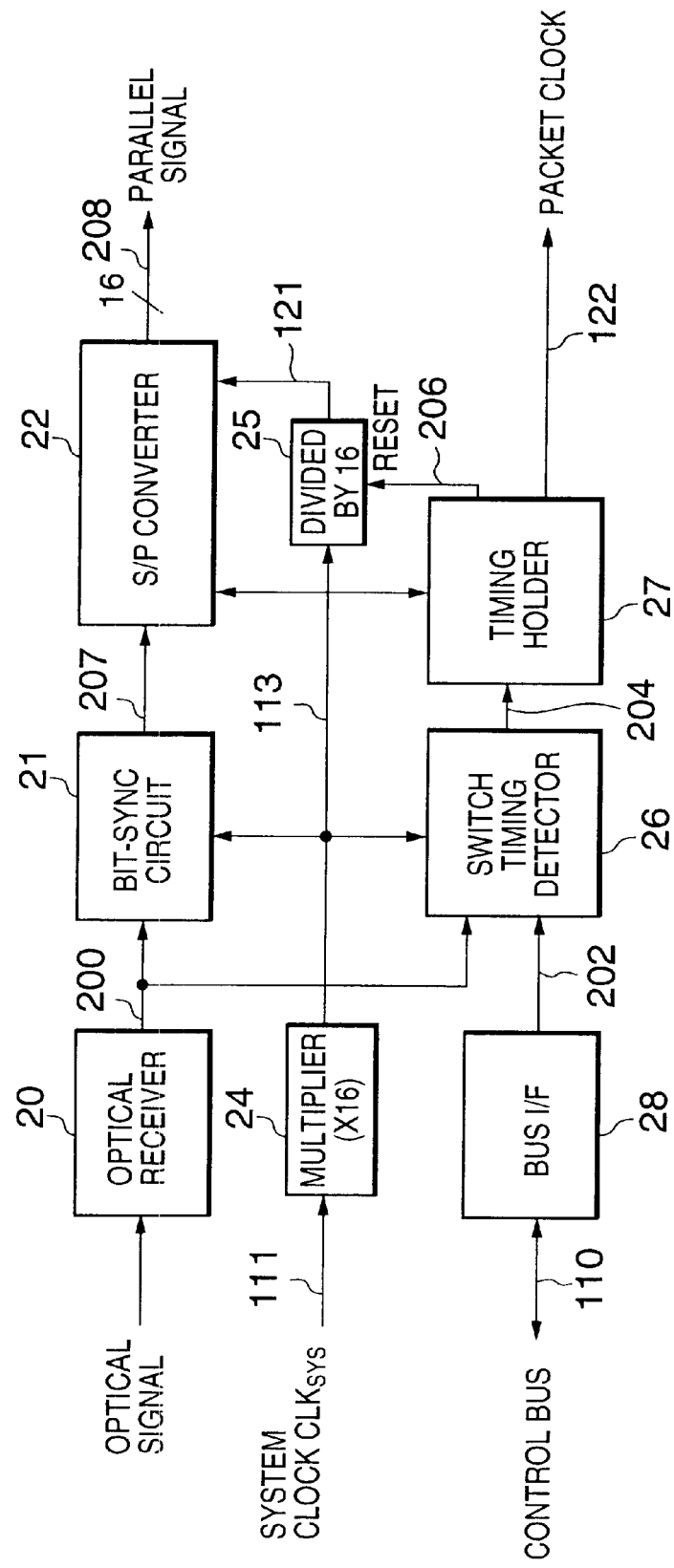
FIG. 6 is a block diagram showing a constitution of the receiving node of FIG. 2.

FIG. 6 is a block diagram showing the constitution of a receiving node of FIG. 2. In FIG. 6, the receiving node is comprised of an optical receiver 20, a bit sync circuit 21, a serial/parallel (S/P) converter 22, a multiplier 24, a frequency divider 25, a switch timing detector 26, a timing holder 27, and a bus interface 28.

The optical receiver 20, when receiving an optical signal from the packet switching system 3, converts it to an electric serial signal 200. The serial signal 200 is divided into two parts, one of which is output to the bit sync circuit 21, and the other is output to the switch timing detector 26.

The bit sync circuit 21 is of a multi-phase clock type, and brings the serial signal 200 in synchronization with the serial clock 113 to output a bit-sync serial signal 207 to the serial/parallel converter 22. The serial clock 113 is produced by the multiplier 24 multiplying the system clock 111 distributed by the clock generator 4 by 16. The details of such a multi-phase clock type bit sync circuit are disclosed in Japanese Patent Application Laid-open (JP-A) No. 7-193562, and the bit sync circuit 21 can easily be realized using the technology disclosed therein.

The switch timing detector 26 outputs an switch timing signal 204 to the timing holder 27. The timing holder 27 holds the switch timing and produces a reset signal 206 and a packet clock 122 based on the held switch timing. The reset signal 206 is output to the frequency divider 25. In this example, the frequency of the packet clock 122 is equal to that of the packet clock 112, however, the phases of the packet clock 122 and the packet clock 112 do not necessarily match.

The frequency divider 25 divides the frequency of the serial clock 113 by 16 to produce the system clock 121. The leading edge of the system clock 121 is determined depending on the reset timing of the frequency divider 25. Therefore, the frequencies of the system clock 121 is equal to that of the system clock 111, but the phases of the system clock 121 and the system clock 111 do not necessarily match.

The serial/parallel converter 22 brings the serial signal 207 from the bit sync circuit 21 in synchronization with the serial clock 113 and converts it to a 16-bit parallel signal 208 in synchronization with the system clock 121. Therefore, the position of the head bit at which the serial-to-parallel conversion is started is determined by the leading edge of the system clock 121. The bus interface 28 receives an enable signal 202 from the CPU 5 via the control bus 110, and outputs the received enable signal 202 to the switch timing detector 26. The receiving nodes 2.0 to 2.3 of FIG.2 have the same circuit configuration as shown in FIG. 6, and function in the same way.

Figure 7:
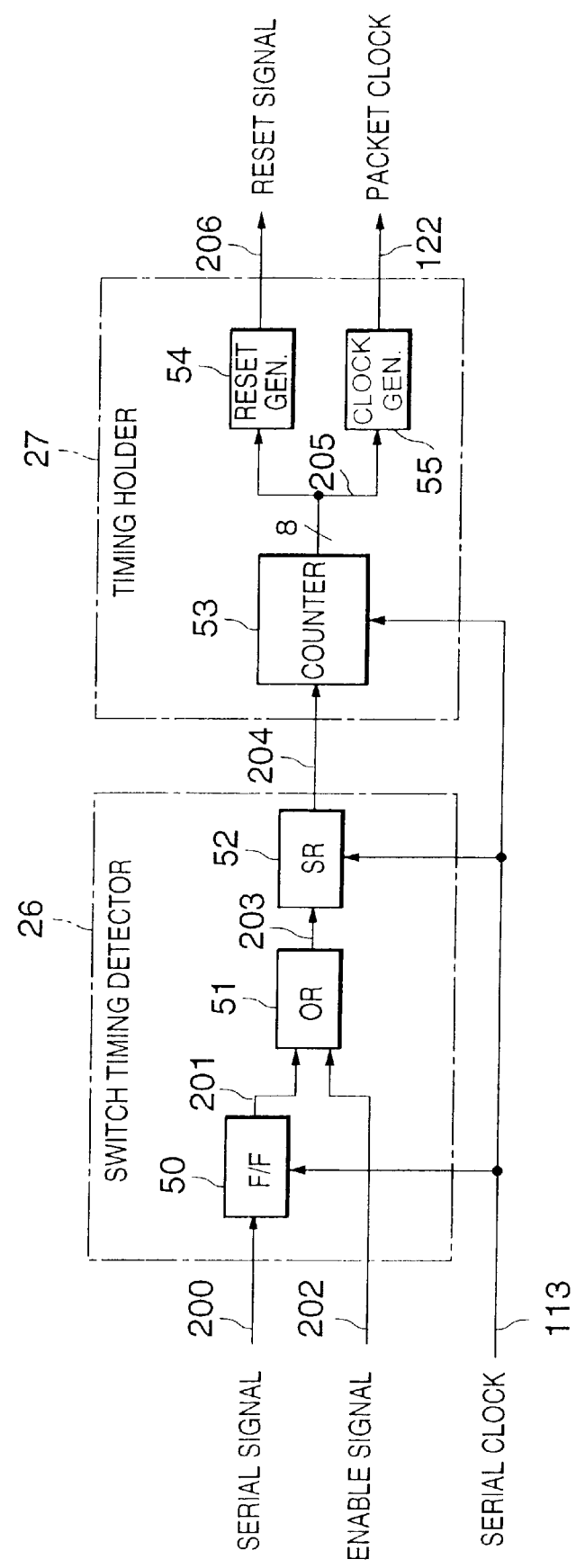
FIG. 7 is a block diagram showing constitutions of a switch timing detector and a timing holder of FIG. 6.

FIG. 7 shows the circuit configurations of the switch timing detector 26 and the timing holder 27 of FIG. 6. The switch timing detector 26 is comprised of a flip-flop (F/F) 50, an OR circuit 51, and a shift register (SR) 52. The timing holder 27 is comprised of a counter 53, a reset generator 54, and a packet clock generator 55.

Figure 8:
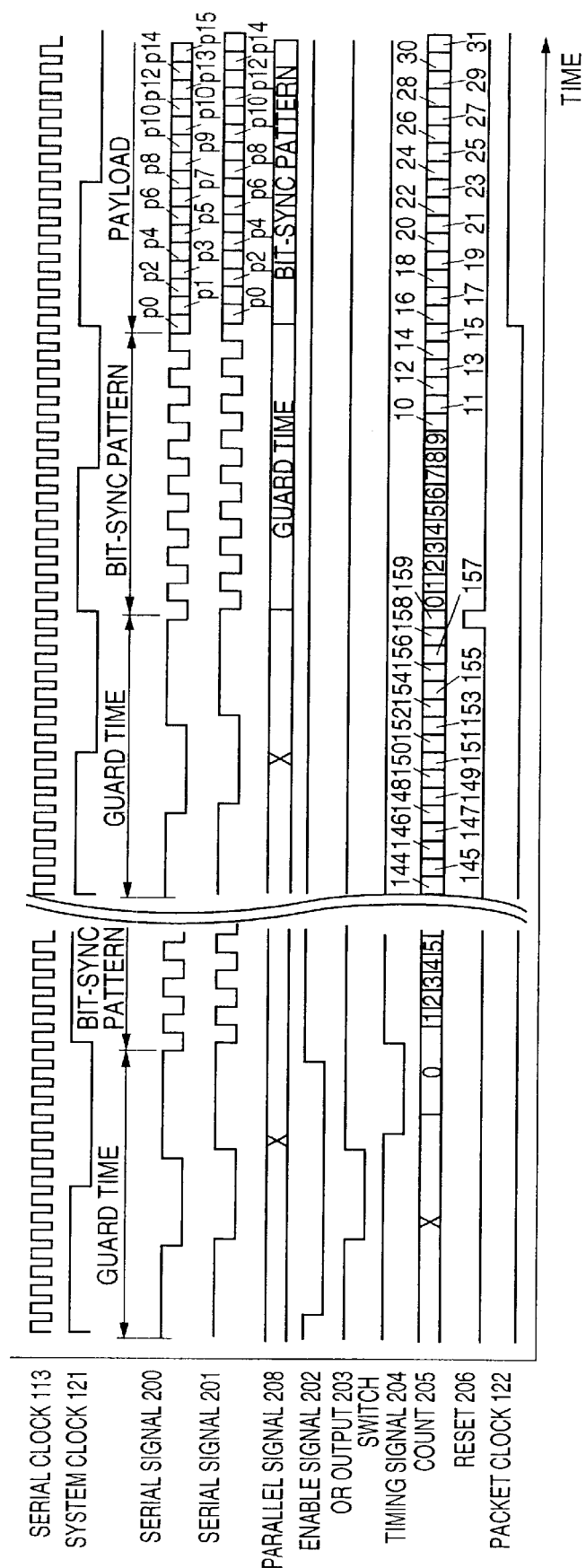
FIG. 8 is a timing chart showing the operation of the switch timing detector and the timing holder of FIG. 7.

FIG. 8 is a timing chart showing the functions of the switch timing detector 26 and the timing holder 27 of FIG. 7. The functions of the switch timing detector 26 and the timing holder 27 will be described hereinafter with reference to FIGS. 7 and 8.

Referring to FIGS. 7 and 8, the serial signal 200 is received by the optical receiver 20. The bits of the serial signal 200 during the guard time are basically "1" but only change to "0" during the time period in which the optical switch 30 is switching. The flip-flop 50 corrects the serial signal 200 according to the serial clock 113 to output a serial signal 201 to the OR circuit. The OR circuit 51 outputs a logical OR signal 203 of the serial signal 201 and the enable signal 202.

The logical OR signal 203 is delayed by the shift register 52 for a predetermined period of time, and is then output as an switch timing signal 204 to the counter 53. The counter 53 is reset to "0" while the switch timing signal 204 is "0". Here, the number of bits of the shift register 52 is previously determined so that the counter 53 is reset at the head of the bit synchronization pattern.

The count 205 of the counter 53 returns to "0" after it reaches "159". That is, the counter 53 is counting during a packet clock period and returns to "0" when reaching "159". As long as the enable signal 202 is "1", the count 205 is not reset, and repeatedly performs the counting operation such that it returns to "0" at the head of the bit synchronization pattern, thereafter it continues counting, and returns to "0" at the head of the next bit synchronization pattern, and so on. The count 205 is output to both the reset generator 54 and the packet clock generator 55.

The reset generator 54 outputs a reset signal 206 of "1" when the count 205 is at "159", and a reset signal of "0" at all other times. Since the frequency divider 25 is reset when the reset signal 206 is "1", the system clock 121 rises when the count 205 goes to "0". Therefore, when the count 205 changes to "0" (i.e. when the head of the bit synchronization pattern becomes the head bit of the serial-to-parallel conversion of the serial/parallel converter 22), frame synchronization is achieved. In the present embodiment, "frame synchronization" is defined as a process by which the bit sequence of the parallel signal after serial/parallel conversion at the receiving node is made equal to the bit sequence of the parallel signal prior to parallel/serial conversion at the sending node. Frame synchronization is prerequisite for packet synchronization.

Furthermore, the packet clock generator 55 outputs "1" as a packet clock 122 when the counter value is higher than "16" and less than "96", and otherwise outputs "0". Therefore, the leading edge of the packet clock 122 matches the bit synchronization pattern of the parallel signal 208, that is, the head of the packet, thereby achieving the packet synchronization.

As described above, the counter 53 is reset by the switch timing signal 204 based on the switch timing of the optical switch 30, and since it maintains that timing as long as the enable signal 202 is "1", its function is equivalent to storing the switch timing of the packet switching system 3.

In the present embodiment, the relationship between the timing of the packet passing through the packet switching system 3 and the switch timing of the packet switching system 3 is regulated by precisely adjusting the respective lengths of the optical fiber 100.0 to 100.3 from sending nodes 1.0 to 1.3 to the packet switching system 3.

Furthermore, at the receiving node, the switch timing detector 26 detects the switch timing, which can then be stored by the timing holder 27. According to the above-mentioned features, the receiving node can determine the head location of the packet from the switch timing, thereby making packet synchronization possible.

Since packet synchronization can be achieved without adding a packet synchronization pattern to a packet, the latency of the packet synchronization is reduced. That is, similar effects obtained by adjusting the length of the optical fiber from the packet switching system 3 to the receiving node disclosed in Japanese Patent Application Laid-open (JP-A) No. 9-307562, can be achieved without adjusting the length of the optical fiber from the packet switching system 3 to the receiving node.

Second Embodiment

Figure 9:
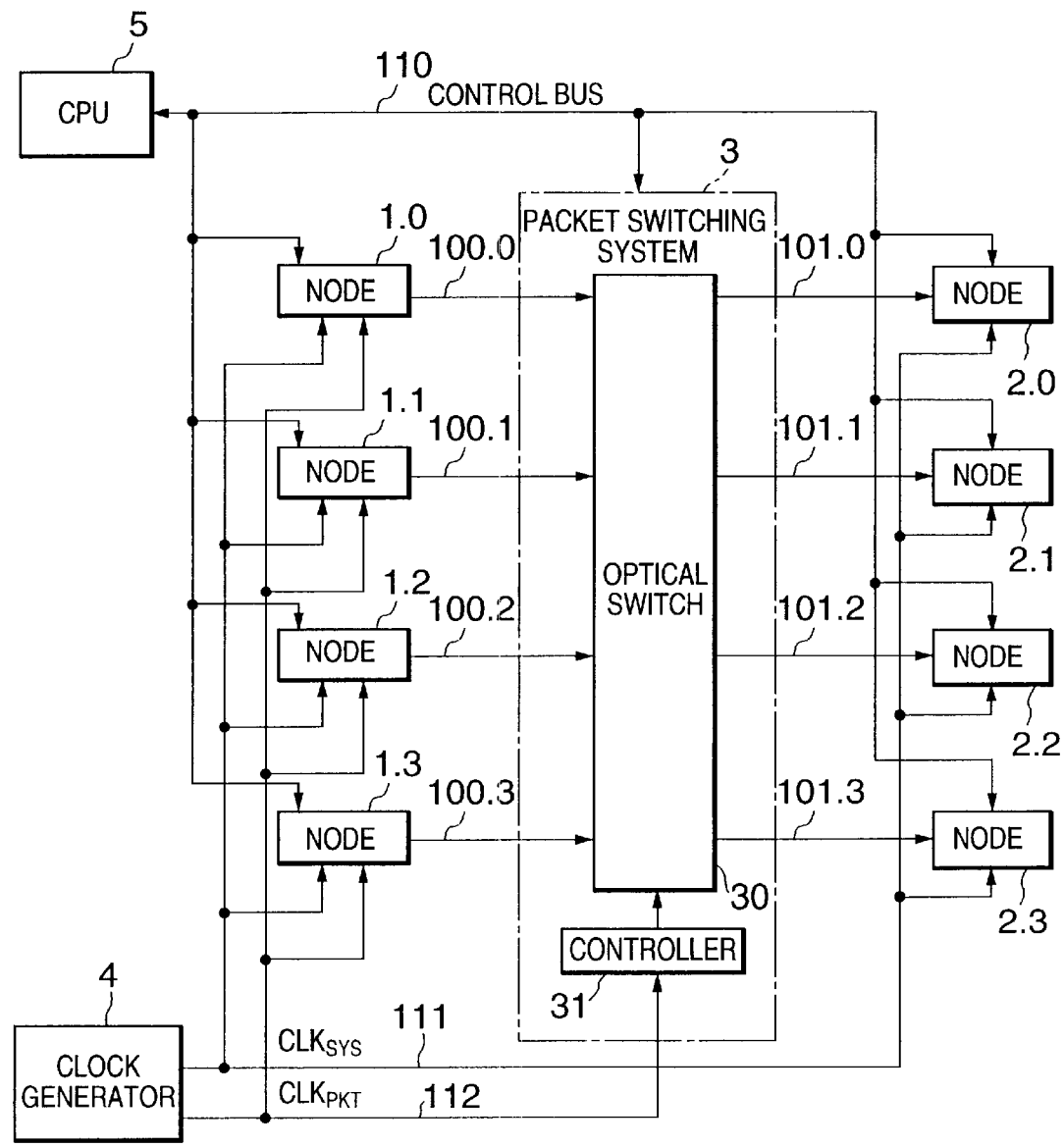
FIG. 9 is a block diagram showing a constitution of a packet switching network according to a second embodiment of the present invention.

FIG. 9 shows the system configuration of a packet switching network according to a second embodiment of the present invention. In FIG. 9, the packet switching network is a 4×4 packet switching network which includes sending nodes 1.0 to 1.3, receiving nodes 2.0 to 2.3, packet switching system 3, clock generator 4, and processor (CPU) 5.

Here, the system clock 111 from the clock generator 4 is distributed to the sending nodes 1.0 to 1.3 and the receiving nodes 2.0 to 2.3 by equal-length wiring. In addition, a packet clock 112 has a period that is ten times that of the system clock 111, and is distributed by equal-length wiring to the sending nodes 1.0 to 1.3 and to the packet switching system 3 and the receiving nodes 2.0 to 2.3. Therefore, the system clock 111 and the packet clock 112 are in the same phase at all the sending nodes 1.0 to 1.3 and the receiving nodes 2.0 to 2.3.

The CPU 5, the sending nodes 1.0 to 1.3, the receiving nodes 2.0 to 2.3, and the controller 31 of the packet switching system 3 are linked via a control bus 110. The CPU 5 outputs a delay control signal 210 to the sending nodes 1.0 to 1.3, and receives a synchronization detection signal 211 from the receiving nodes 2.0 to 2.3, which will be described later.

Figure 10:
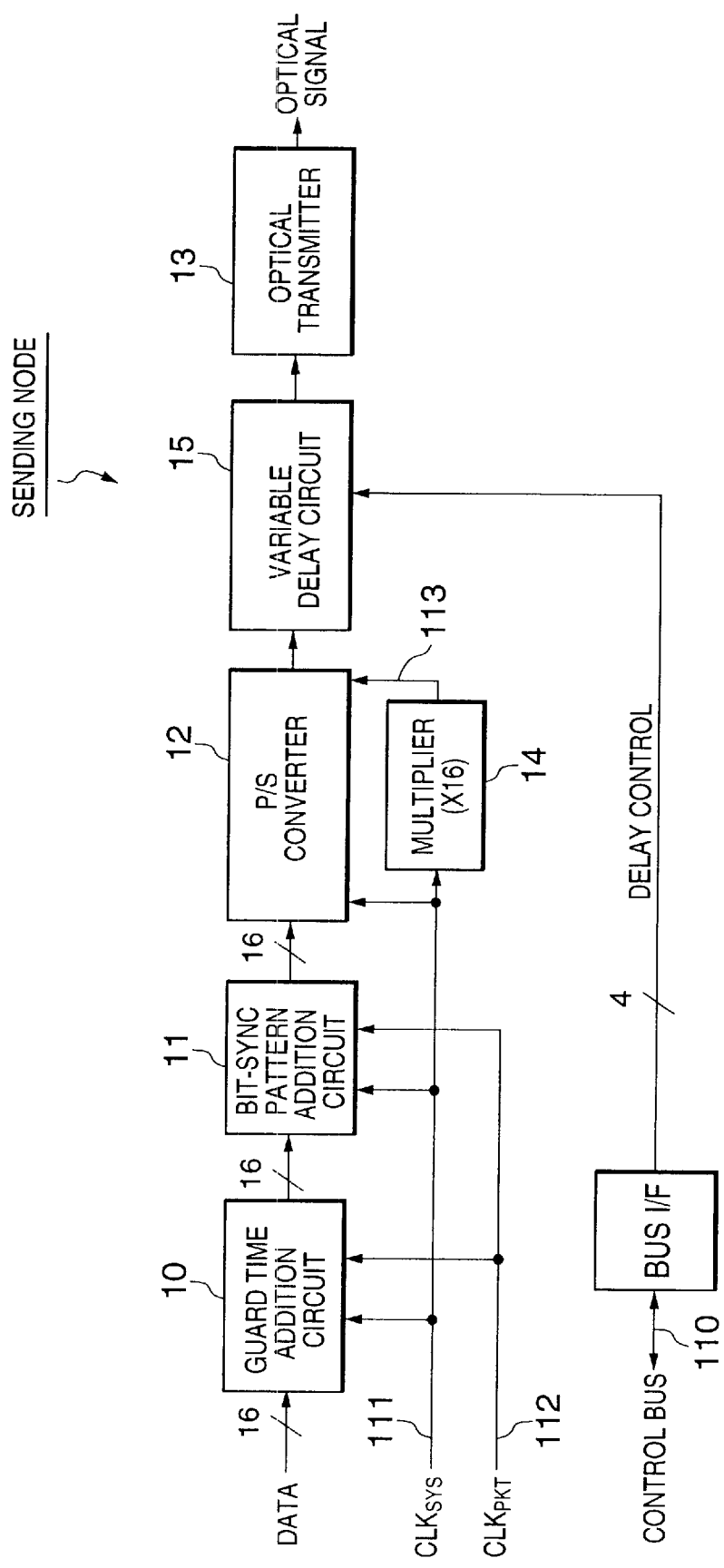
FIG. 10 is a block diagram showing a constitution of the sending node of FIG. 9.

FIG. 10 shows the circuit configuration of a sending node of FIG. 9. In FIG. 10, the sending node according to the second embodiment of the present invention has the same circuit configuration as the sending node according to the first embodiment except for the addition of a variable delay circuit and a bus interface 16. Therefore, other circuit blocks similar to those previously described with reference to FIG. 3 are denoted by the same reference numerals and the details thereof are omitted.

The variable delay circuit 15 includes a delay line which can vary the amount of delay depending on a delay control signal 210 received from the CPU 5 through the bus interface 16. The serial signal output from the parallel/serial converter 12 is delayed by the variable delay circuit 15 and the delayed serial signal is output to the optical transmitter 13. The amount of delay can be specified in steps of a serial clock period within a range of 0 to 15 serial clock periods depending on the 4-bit delay control signal 210.

When the delay of the variable delay circuit 15 of the sending node is "0", the length of the optical fiber linking the sending node to the packet switching system 3 is approximately adjusted so that the latency of the packet transferred from the bit synchronization pattern addition circuit 11 to the optical switch 30 of the packet switching system 3 falls into a range from a time period calculated by subtracting "twenty-three (23) serial clock periods" from "one (1) packet clock period" to a time period calculated by subtracting "eight (8) serial clock periods" from "one (1) packet clock period". Furthermore, the circuit configuration and the operation of the packet switching system 3 are the same as those of the packet switching system 3 according to the first embodiment of the present invention.

Figure 11:
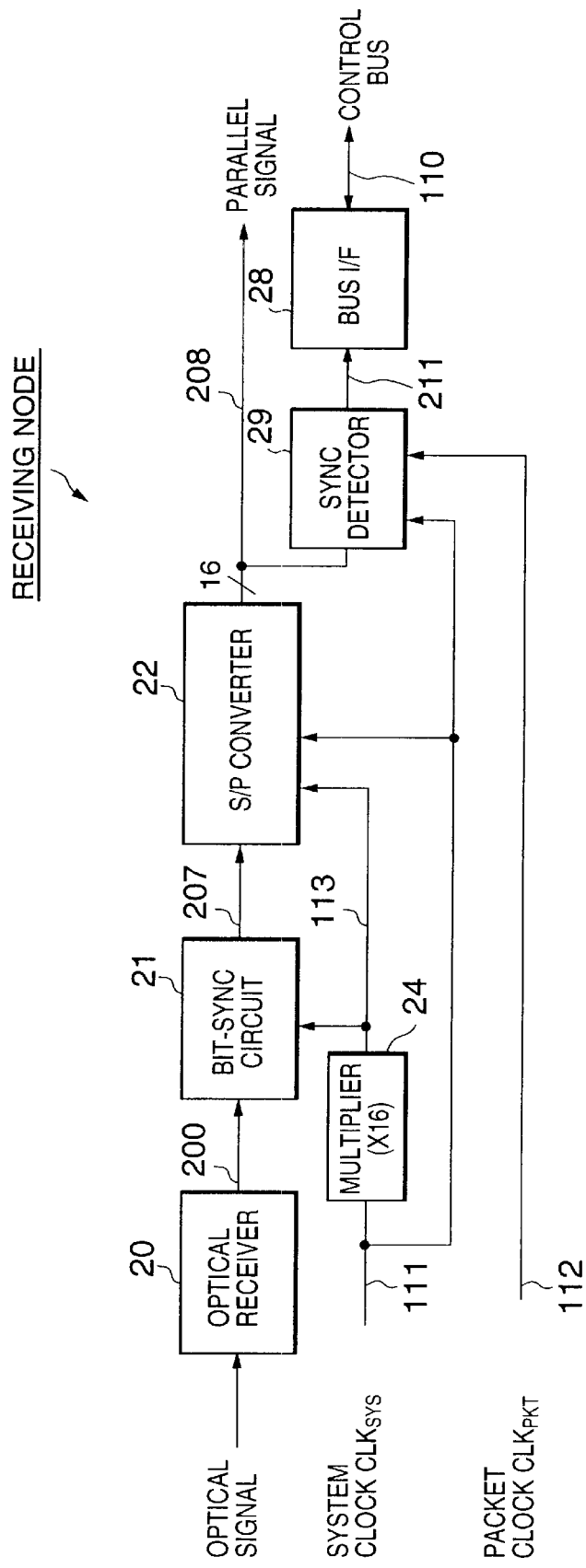
FIG. 11 is a block diagram showing a constitution of the receiving node of FIG. 9.

FIG. 11 shows the circuit configuration of a receiving node of FIG. 9. In FIG. 11, the receiving node is comprised of optical receiver 20, bit sync circuit 21, serial/parallel converter 22, multiplier 24, bus interface 28, and synchronization detector 29.

The optical receiver 20 converts an optical signal to an electric serial signal 200, and outputs it to the bit sync circuit 21. The bit sync circuit 21 is of multi-phase clock type and brings the input serial signal 200 in synchronization with the serial clock 113 to output a bit-sync serial signal 207 to the serial/parallel converter 22. The serial clock 113 is produced by the multiplier 24 multiplying the system clock 111 distributed by the clock generator 4 by 16. The serial signal 207 is converted by the serial/parallel converter 22 to a 16-bit parallel signal 208, which is also output to the synchronization detector 29.

The synchronization detector 29 detects established packet synchronization. When packet synchronization is established, the synchronization detector 29 changes a synchronization detection signal 211 to "1", and otherwise to "0". The synchronization detector 29 refers to the parallel signal 208 for two system clock periods following the leading edge of the packet clock 112 and, if the 16-bit data is the packet synchronization pattern of "1111000011001010", then the synchronization detector 29 determines that both frame synchronization and packet synchronization have been established.

In this embodiment, the length of the optical fiber linking the packet switching system 3 with the receiving node is precisely adjusted so that the latency of a packet from the optical switch 30 of the packet switching system 3 to the receiving node is equal to a time period obtained by adding "one packet clock period" to "eight serial clock periods".

Therefore, in the case where the packet input timing is adjusted so that the packet switching system 3 switches at the exactly midpoint of the guard time a, the packet is able to achieve frame synchronization by itself at the receiving node. In addition, a signal from the head of the bit synchronization pattern b can be output as the serial signal 208 immediately after the leading edge of the packet clock 112. That is, when the input timing of a packet is adjusted so that the packet switching system 3 switches at the exactly midpoint during the guard time a, the packet can achieve frame synchronization and packet synchronization by itself.

The second embodiment of the present invention has two operation modes: delay adjustment mode and packet transmission mode. Initially, operation is in the delay adjustment mode, during which the timing of a packet input to the packet switching system 3 is adjusted. When this input timing adjustment is completed, the network shifts to the packet transmission mode, and performs ordinary packet transmission. Next, the operation of the delay adjustment mode will be explained in detail.

In the initial state, the CPU 5 sets the delay control signal 210 supplied to all the sending nodes 1.0 to 1.3 to "0000". Furthermore, the CPU 5 sends a command to the controller 31 of the packet switching system 3 so that the sending node 1.0 is fixedly connected to the receiving node 2.0, the sending node 1.1 to the receiving node 2.1, the sending node 1.2 to the receiving node 2.2, and the sending node 1.3 to the receiving node 2.3. The sending nodes 1.0 to 1.3 send 16-bit idle patterns consisting of the first two bytes of the payload as a packet synchronization pattern, and send the remaining fourteen bytes thereof as "1111111100000000" seven consecutive times.

The CPU 5 receives the synchronization detection signal 211 from the receiving node via the control bus 110. Here, when the synchronization detection signal 211 of the receiving node 2.0 is "0", the CPU 5 increments the delay control signal 210 of the sending node 2.0, and increases the amount of delay by one serial clock period. The sending node 1.0 sends the synchronization packet once again, and repeats the above operation until the synchronization detection signal 2.21 of the receiving node 2.0 goes to "1".

The same delay adjustment mode as described above is repeatedly performed between the sending node 1.1 and the receiving node 2.1, between the sending node 1.2 and the receiving node 2.2, and between the sending node 1.3 and the receiving node 2.3 until all the synchronization detection signals 211 of the receiving nodes 2.0 to 2.3 have changed to "1". If all the synchronization detection signals 211 of the receiving nodes 2.0 to 2.3 have changed to "1", then the delay adjustment mode is completed.

As described above, since the lengths of the optical fibers 100.0 to 100.3 in the second embodiment of the present invention are adjusted approximately, the input timing of packets can be adjusted by the above-mentioned operation so that the packet switching system 3 can switch at the exactly midpoint during the guard time a. Therefore, the length of the guard time a can be minimized, and the latency of the packet transmission can be reduced.

Furthermore, since the length of the optical fiber from the packet switching system 3 to a receiving node is precisely adjusted, frame synchronization and packet synchronization can be both established. Since it is not necessary to add a packet synchronization pattern to a packet for packet synchronization, the latency of packet transmission is further shortened. That is, the effect obtained by precisely adjusting the length of an optical fiber from a sending node to a packet switch in the optical network device disclosed in Japanese Patent Application Laid-open (JP-A) No. 9-307562, can be obtained simply by approximately adjusting the length of the optical fiber from the sending node to the packet switch.

Third Embodiment

Figure 12:
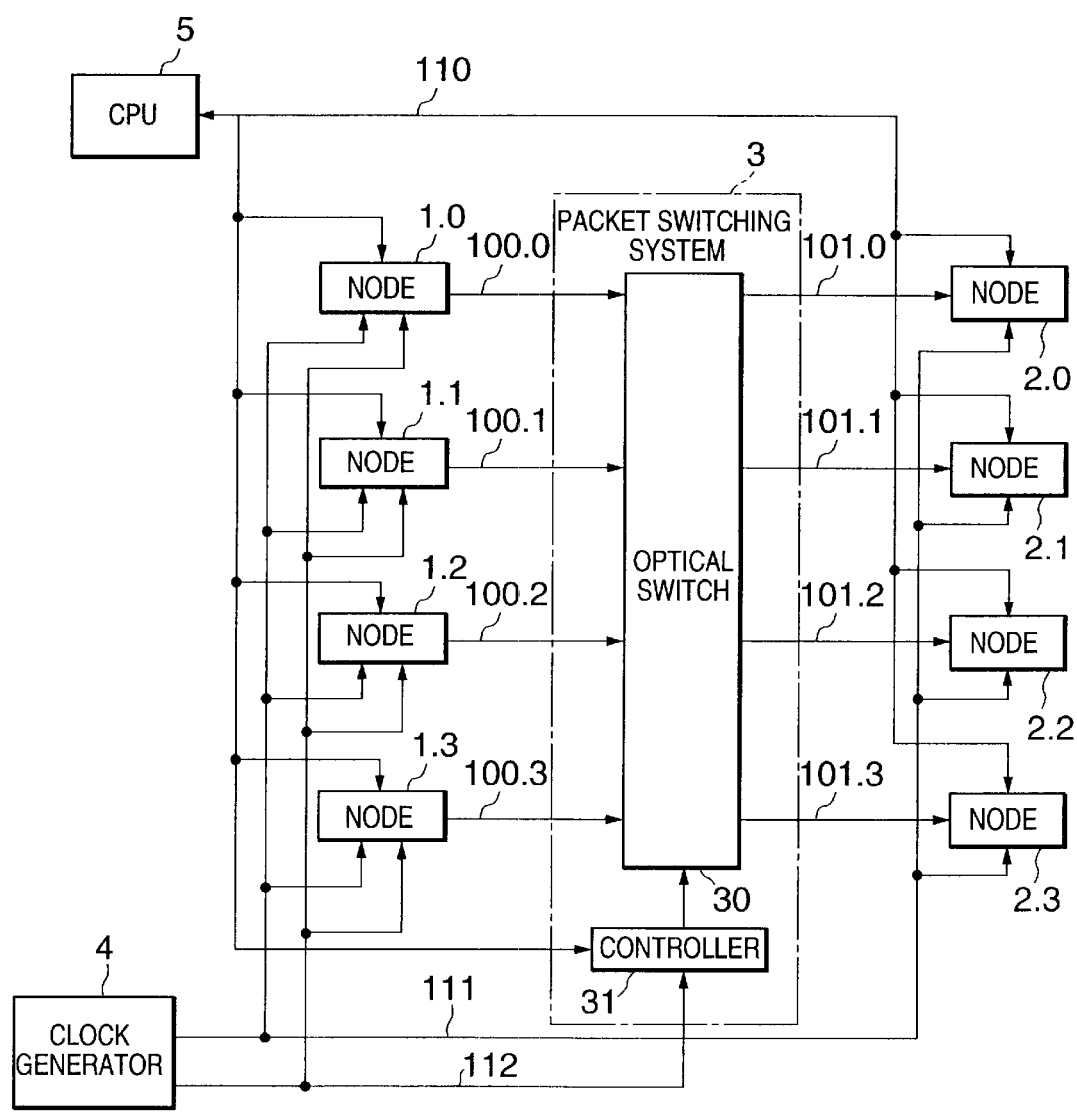
FIG. 12 is a block diagram showing the constitution of a packet switching network according to a third embodiment of the present invention.

FIG. 12 shows the configuration of a packet switching network according to a third embodiment of the present invention. As shown in FIG. 12, the packet switching network according to the third embodiment of the present invention is a 4×4 packet switching network which includes sending nodes 1.0 to 1.3, receiving nodes 2.0 to 2.3, packet switching system 3, clock generator 4, and processor (CPU) 5.

Here, a system clock 111 generated by the clock generator is distributed to the sending nodes 1.0 to 1.3 and the receiving nodes 2.0 to 2.3 by equal-length wiring. Furthermore, a packet clock 112 has a period eleven times as long as the system clock 111, and is distributed to the sending nodes 1.0 to 1.3 and to the packet switching system 3 by equal-length wiring. The CPU 5, the sending nodes 1.0 to 1.3, the receiving nodes 2.0 to 2.3, and the controller 31 of the packet switching system 3, are connected by the control bus 110.

Figure 13:
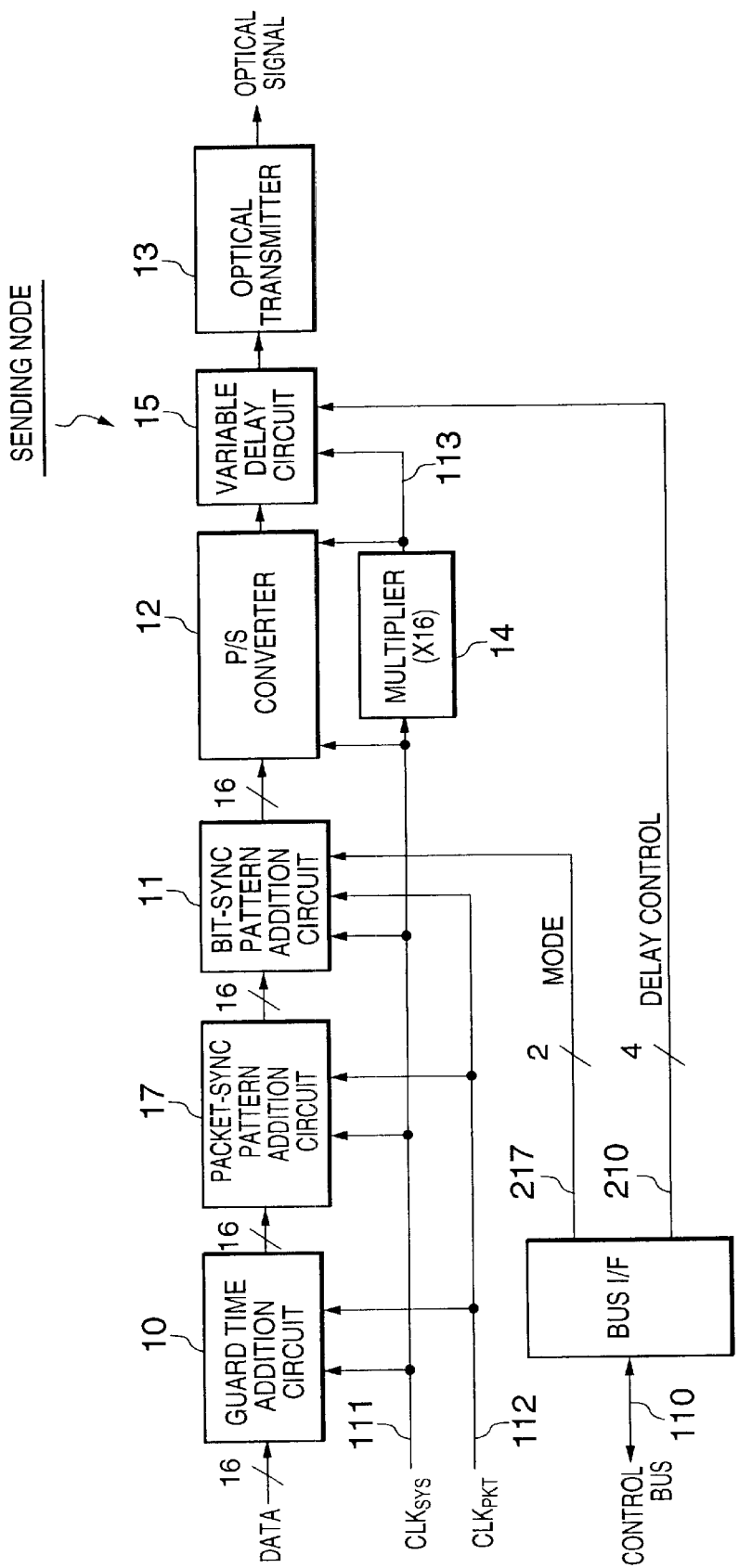
FIG. 13 is a block diagram showing a constitution of the sending node of FIG. 12.

FIG. 13 shows the circuit configuration of a sending node of FIG. 12. The sending node according to the third embodiment of the present invention has the same circuit configuration as the sending node according to the second embodiment of FIG. 10 except for the addition of a packet sync pattern addition circuit 17 and a modification of a variable delay circuit 15. Therefore, other circuit blocks similar to those previously described with reference to FIG. 10 are denoted by the same reference numerals.

Here, the bit synchronization pattern addition circuit 11 operates in different ways depending on a 2-bit mode signal 217, which is supplied by the CPU 5 through the bus interface 16. Furthermore, the variable delay circuit 15 according to the second embodiment of the present invention is comprised of a delay line with a variable amount of delay, but the variable delay circuit 15 according to the third embodiment is comprised of a shift register and a selector as described later.

Figure 14:
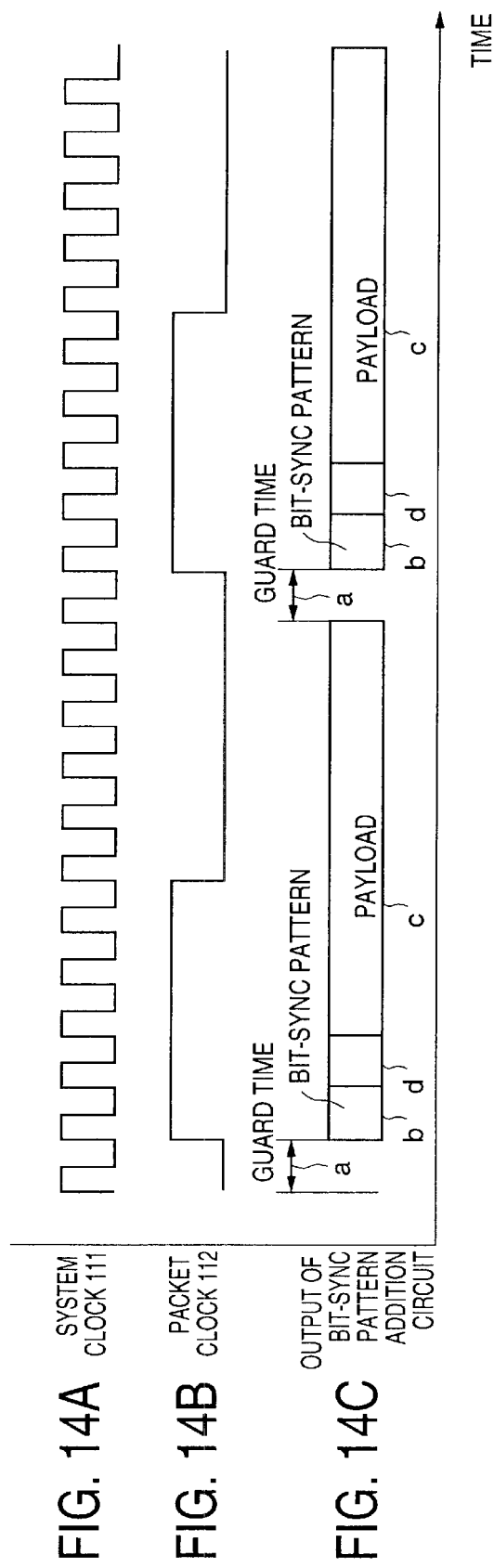
FIGS. 14A–14C are a timing chart showing a signal output from a bit synchronization pattern addition circuit in the sending node according to the third embodiment of the present invention.
Figure 15:
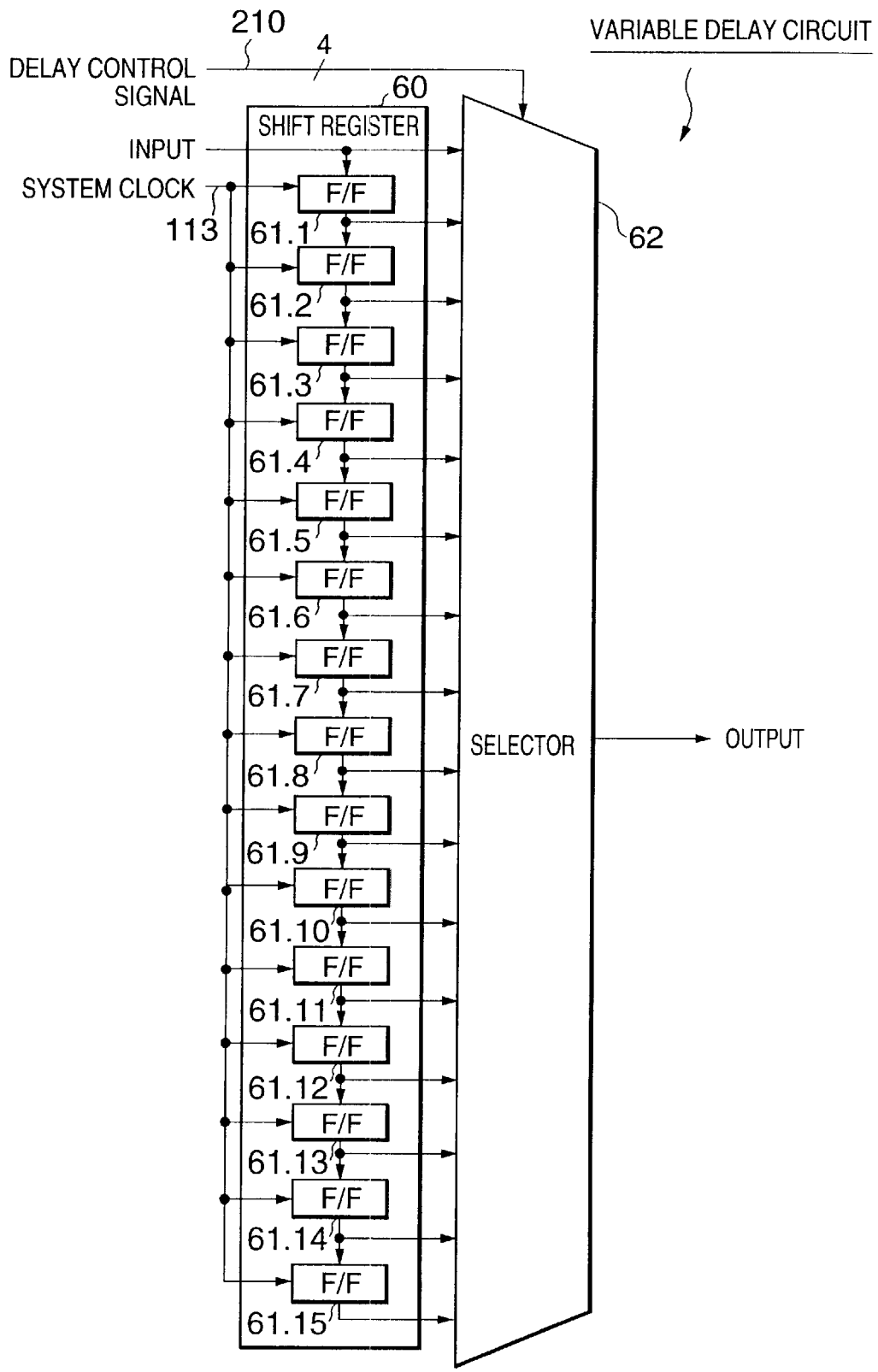
FIG. 15 is a block diagram showing a constitution of the variable delay circuit of FIG. 13.

FIG. 14 shows an output signal of the bit synchronization pattern addition circuit with respect to system and packet clocks, and FIG. 15 shows the circuit of the variable delay circuit 15 of FIG. 13.

Referring to FIG. 15, the variable delay circuit 15 is comprised of a shift register 60 composed of fifteen flip-flops (F/F) 61.1 to 61.15, and a 16-to-1 selector 62, which is controlled by a 4-bit delay control signal 210.

When the delay control signal 210 is set to "0000", the input signal is output directly, but when the delay control signal 210 is set to "0001", a signal delayed by one serial clock period after passing through the first flip-flop 61.1, becomes the output signal. Similarly, when the delay control signal 210 is set to "1111", a signal delayed by fifteen serial clock periods after passing through the fifteenth flip-flop 61.15 becomes the output signal.

Accordingly, the variable delay circuit 15 according to the third embodiment of the present invention achieves the same functions as the variable delay circuit 15 according to the second embodiment of the present invention. The delay line with a variable amount of delay, used in the second embodiment of the present invention, does not always operate in synchronization with the clock, resulting in possibility of delay errors. However, the variable delay circuit 15 comprising the shift register 60 and the selector 62 according to the third embodiment operates in synchronization with the clock, and consequently is able to produce precise delays equivalent to an integral multiple of the clock period. Furthermore, there is an advantage of not having to modify the hardware even when the clock frequency is changed to another.

When the amount of delay of the variable delay circuit 15 in the sending node is set to "0", the length of the optical fiber connecting the sending node and the packet switching system 3 is approximately adjusted so that the latency of the packet output from the bit synchronization pattern addition circuit 11 and input to the optical switch 30 of the packet switching system 3 falls into a range from a time period obtained by subtracting "twenty-three serial clock periods" from "one packet clock period" to a time period obtained by subtracting "eight serial clock periods" from "one packet clock period". Furthermore, the circuit configuration and operation of the packet switching system 3 are the same as those of the packet switch according to the first embodiment of the present invention.

Figure 16:
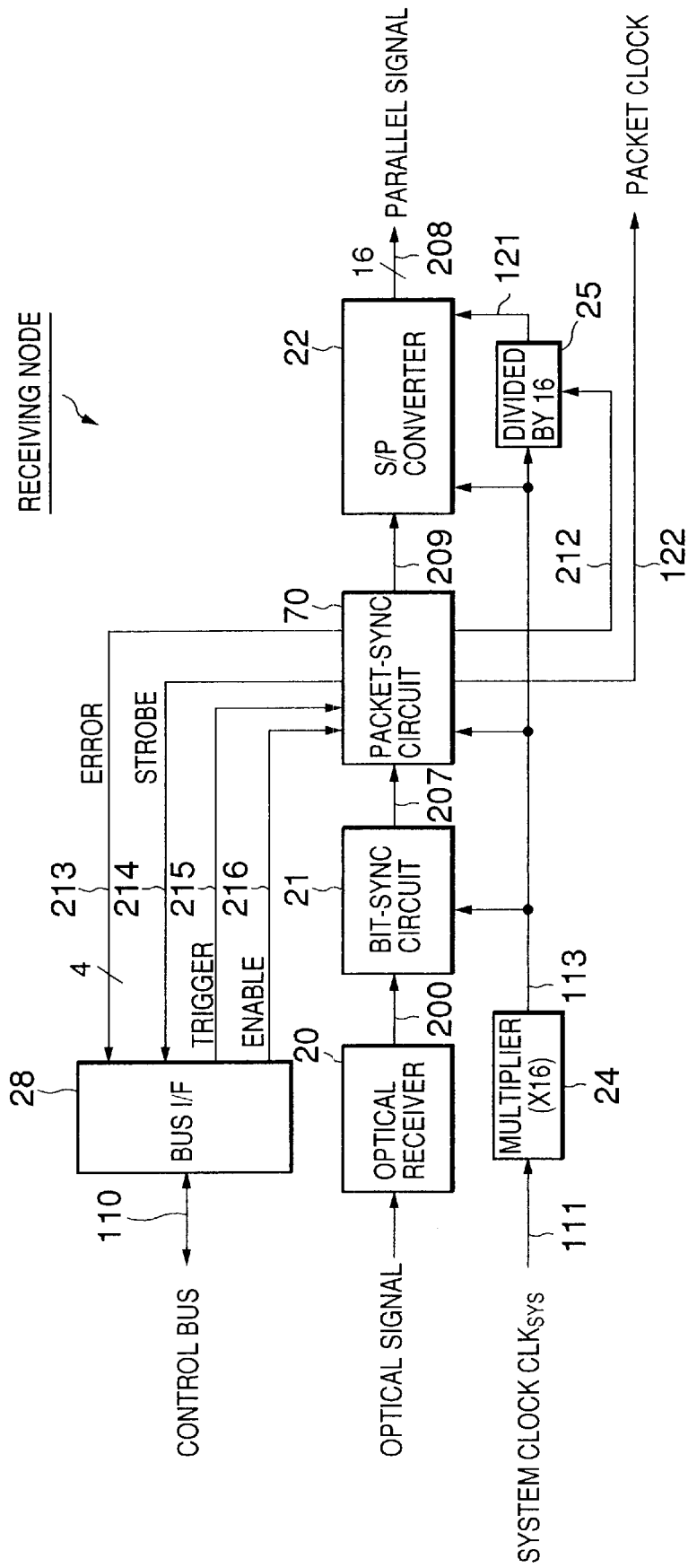
FIG. 16 is a block diagram showing a constitution of the receiving node of FIG. 13.

FIG. 16 shows the circuit configuration of a receiving node of FIG. 13. In FIG. 16, the receiving node is comprised of optical receiver 20, bit sync circuit 21, packet sync circuit 70, serial/parallel converter 22, multiplier 24, frequency divider 25, and bus interface 28.

Figure 17:
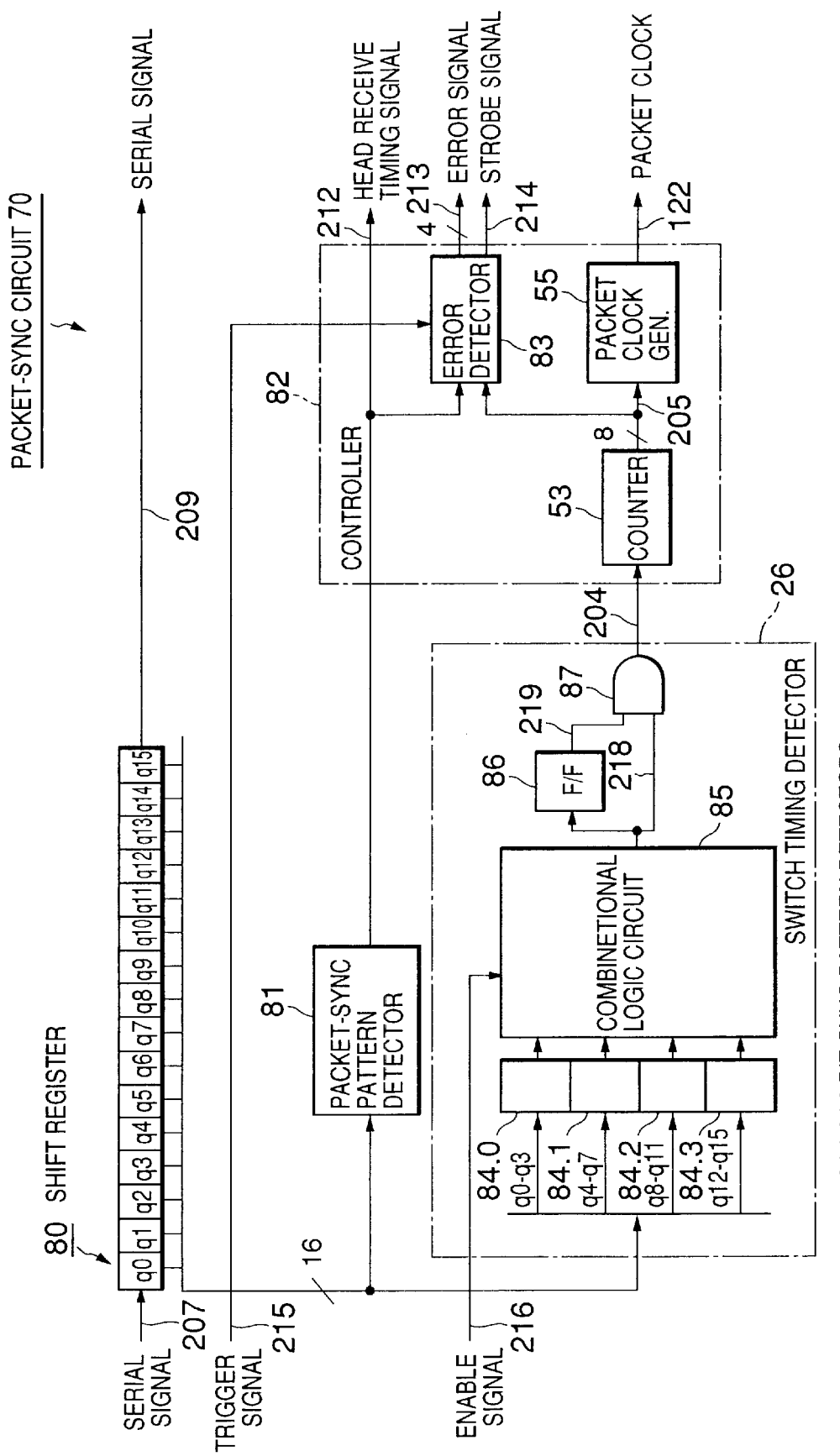
FIG. 17 is a block diagram showing a constitution of the packet sync circuit of FIG. 16.
Figure 18A:
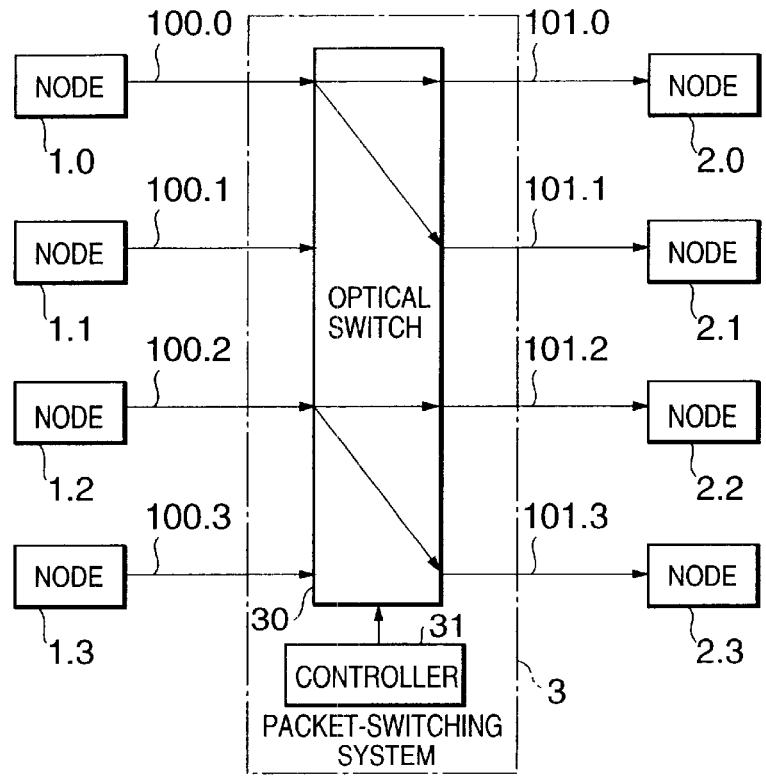
FIGS. 18A an 18B are diagrams showing connection states of a packet switch in switch timing detection mode according to the third embodiment of the present invention.
Figure 18B:
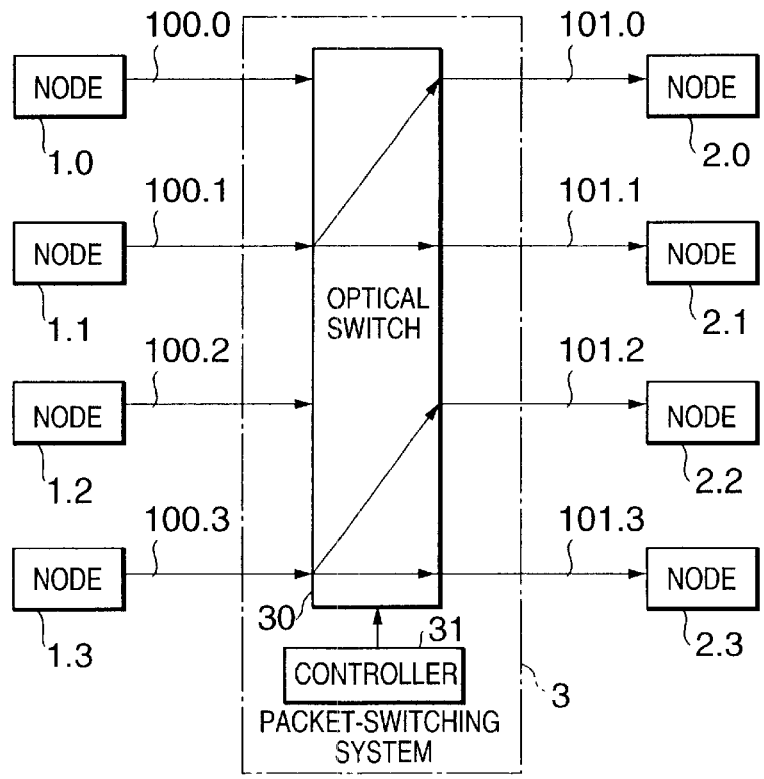

FIG. 17 shows the circuit configuration of the packet sync circuit 70 of FIG. 16. FIGS. 18A and 18B show connections of the packet switching system 3 in the switch timing detection mode according to the third embodiment of the present invention.

Referring to FIG. 17, the packet sync circuit 70 is comprised of a shift register 80, a packet sync pattern detector 81, an switch timing detector 26, and a controller 82.

The third embodiment of the present invention has three operation modes: switch timing detection mode; delay adjustment mode; and packet transmission mode. An operation in each of the three modes will be explained hereafter.

Switch Timing Detection Mode

In the initial state, the network operates in the switch timing detection mode. In the switch timing detection mode, the CPU 5 sets the mode signal 217 of the sending nodes 1.0 and 1.2 to "00", and sets the mode signal 217 of the sending nodes 1.1 and 1.3 to "01". Furthermore, the CPU 5 sets the delay control signal 210 of all the sending nodes 1.0 to 1.3 to "0000", and sets the enable signal 216 of the receiving nodes 2.0 to 2.3 to "1".

The CPU 5 sends a command to the controller 31 of the packet switching system 3 so that the switch 30 alternately changes between the connection states as shown in FIGS. 18A and 18B at every leading edge of the packet clock 112. More specifically, in the connection state as shown in FIG. 18A, the sending node 1.0 is connected to both of the receiving nodes 2.0 and 2.1 and the sending node 1.2 is connected to both of the receiving nodes 2.2 and 2.3. In the connection state as shown in FIG. 18B, the sending node 1.1 is connected to both of the receiving nodes 2.0 and 2.1 and the sending node 1.3 is connected to both of the receiving nodes 2.2 and 2.3.

Referring to FIG. 13, the bit synchronization pattern addition circuit 11 of the sending node continuously outputs a bit synchronization pattern "0101010101010101" when the mode signal 217 is "00", and an idle pattern "1111111100000000" when the mode signal 217 is "01". The parallel signal output from the bit synchronization pattern addition circuit 11 is converted to a serial signal by the parallel/serial converter 12. The serial signal is delayed by the variable delay circuit 15 and the delayed serial signal is converted to an optical signal by the optical transmitter 13.

The packet switching system 3 repeats the connection switching operation as shown in FIGS. 18A and 18B, whereby the receiving node alternately receives the bit synchronization pattern and the idle pattern. However, since the two patterns are sent from different sending nodes, their bit phases do not necessarily match.

Referring to FIG. 16, at the receiving node, the received optical signal is converted to an electric serial signal 200 by the optical receiver 20, and outputs it to a multi-phase clock type bit sync circuit 21. When receiving the bit synchronization pattern, the bit sync circuit 21 brings the received bit synchronization pattern in synchronization with the serial clock 113, and once the bit synchronization has been established, the receive bit phase is fixed at that time.

As mentioned already, since the bit phases of the bit synchronization pattern and the idle pattern received by the receiving node do not always match, bit synchronization can be established using the bit synchronization pattern, but cannot necessarily be obtained in the case of the idle pattern, leaving a possibility of bit errors.

However, since the idle pattern consists of eight consecutive "0s" and eight consecutive "1s", bit errors resulting from a failure to achieve bit synchronization only occur in the first or last bit of the consecutive bits. Therefore, there is no possibility that the idle pattern is erroneously recognized as the bit synchronization pattern. A serial signal 207 of the bit sync circuit 21 is output to the packet sync circuit 70.

FIG. 19 shows an operation of the packet sync circuit 70 in the switch timing detection mode according to the third embodiment of the present invention. The operation of the packet sync circuit 70 will be explained referring to FIG. 17 and FIG. 19.

When receiving the serial signal 207 from the bit sync circuit 21, the packet sync circuit 70 stores sequentially into the shift register 80 comprising a series of sixteen flip-flops q0, q1, . . . , and q15. The four sets of bits: q0 to q3; q4 to q7; q8 to q11; and q12 to q15, are read in parallel from the shift register 80 and are each output to bit synchronization pattern detectors 84.0 to 84.3 of the switch timing detector 26, respectively.

Each of the synchronization pattern detectors 84.0 to 84.3 output "1" when the input signals are "0101" or "1010", and output "0" at all other times. A combinational logic circuit 85 changes the signal 218 to "1" when the respective values output from the bit synchronization pattern detectors 84.0 to 84.3 are "0", "0", "1", and "1", and otherwise changes the signal 218 to "0". A flip-flop (F/F) 86 holds the signal 218 for one clock period, and outputs a delayed signal 219 of inverse logic to an AND circuit 87. The AND circuit 87 outputs the logical AND of the signals 2.18 and 219 as an switch timing signal 204 to the controller 82.

The serial signal 207 changes from the bit synchronization pattern to the idle pattern after passing through the part where bits have been erased (i.e. the part shown by reference symbol "A" in FIG. 19) due to the switching of the packet switching system 3. As described above, although there is a possibility of bit errors occurring in the idle pattern, the idle pattern does not change into the bit synchronization pattern as a result of such bit errors.

As a result of the operation of the packet sync circuit 70 described above, the switch timing signal 204 changes to "1" for one clock period as shown in FIG. 19G. That is, the switch timing of the packet switching system 3 is detected at the position where the switch timing signal 204 is changed to "1".

When the switch timing signal becomes "1", a counter 53 of the controller 82 is reset to "0". The counter 53 is incremented according to the serial clock and returns to "0" when the count reaches "175". Therefore, the counter 53 stores the switch timing of the packet switching system 3 by repeating the operation such that the count is incremented during one packet clock period and then returns to "0" when reaching "175". When all the receiving nodes 2.0 to 2.3 have stored the switch timing, the network shifts to the delay adjustment mode.

Delay Adjustment Mode

In the delay adjustment mode, the CPU 5 sets the mode signal 217 of all the sending nodes 1.0 to 1.3 to "10", and sets the delay control signal 210 to "0000". Furthermore, the CPU 5 sets the enable signals 216 of all the receiving nodes 2.0 to 2.3 to "0". The CPU 5 also sends a command to the controller 31 of the packet switching system 3 so as to fixedly connect the sending node 1.0 with the receiving node 2.0, the sending node 1.1 with the receiving node 2.1, the sending node 1.2 with the receiving node 2.2, and the sending node 1.3 with the receiving node 2.3.

The guard time addition circuit 10 first stores the input data for payload c, and then outputs the head of the payload c at the leading edge of the packet clock 112. In the delay adjustment mode, the payload c contains successive idle patterns.

Since the payload c contains eight system clock periods, unlike the packet clock 112 which has a length of eleven system clock periods, the bit synchronization patterns are inserted to a time period of the three system clock periods remaining after the payload c has been set as shown in FIG. 14. The packet synchronization pattern addition circuit 17 delays the payload c input from the guard time addition circuit 10 by one system clock, and adds a 16-bit packet synchronization pattern d "1111000011001010" to the head of data for payload c.

When the mode signal 217 is set to "10", the bit synchronization pattern addition circuit 11 delays the payload c output from the packet synchronization pattern addition circuit 17 by a further one system clock, and appends the bit synchronization pattern b to the head of the data (see FIG. 14). As a result, the 16-bit bit synchronization pattern b remains after the payload c. This part becomes the guard time a. The parallel signal output from the bit synchronization pattern addition circuit 11 is converted to a serial signal by the parallel/serial converter 12. The serial signal is delayed by the variable delay circuit 15 and the delayed serial signal is converted to an optical signal by the optical transmitter 13.

The optical signal, as shown in FIG. 16, the is received and converted to an electric serial signal by the optical receiver 20 of a receiving node and the serial signal is output to the bit sync circuit 21. Since the packet switching system 3 does not switch in the delay adjustment mode, after the bit sync circuit 21 has established bit synchronization, signals are always received in bit synchronization. The serial signal is output from the bit sync circuit 21 to the packet sync circuit 70.

FIG. 20 shows an operation of the packet sync circuit 70 prior to delay adjustment in the delay adjustment mode, according to the third embodiment of the present invention. The operation of the packet sync circuit 70 in the delay adjustment mode will be explained with reference to FIGS. 17 and 20.

When entering the delay adjustment mode, the CPU 5 changes a trigger signal 215 of all the receiving nodes 2.0 to 2.3 to a value of "1" for one clock period. When the trigger signal 215 is "1", the error detector 83 waits for the head receive timing signal 212 to change to "1".

At this time, the counter 53 is holding the switch timing which has been stored in the switch timing detection mode, and is repeating the counting operation in a period of the packet clock as mentioned before. Therefore, the switch timing shown in FIG. 19, that is, the relationship between the period A in FIG. 19 and the timing at which the count 205 becomes "0", is also maintained in the delay adjustment mode. The switching is not performed in the delay adjustment mode, however, if the switching were to be provided, it would be performed during the period A as shown in FIG. 20. That is, in this state, the packet switching system 3 does not carry out switching at the midpoint during the guard time a.

The packet sync pattern detector 81 compares the contents of the shift register 80 with the packet synchronization pattern, and when all the bits match, it changes the head receive timing signal 212 to "1". When the head receive timing signal 212 changes to "1", the error detector 83 reads the count 205 of the counter 53 at the next leading edge of the serial clock 113 and outputs it as an error signal 213, while simultaneously shifting a strobe signal 214 to "1". When the strobe signal 214 is at "1", the bus interface 28 reads the error signal 213, and sends it to the CPU 5.

The CPU 5 executes a calculation: "delay control signal 210"–"error signal 213"+35, and supplies the calculated value to the variable delay circuit 15 of the sending node as a new delay control signal 210. At this time, the delay control signals 210 calculated from the error signals 213 obtained from the receiving nodes 2.0 to 2.3, are applied to the sending nodes 1.0 to 1.3, respectively. In the example as shown in FIG. 20, since the error signal 213 is "30", the delay control signal 210 is changed from "0" to "5".

FIG. 21 shows an operation of the packet sync circuit 70 after delay adjustment in the delay adjustment mode according to the third embodiment of the present invention. In FIG. 20, the timing after the delay control signal 210 has been updated is shown.

Since the amount of delay in the variable delay circuit 15 of the sending node is increase by five serial clock periods, the switch timing of the packet switching system 3 (i.e. the period A) is exactly at the midpoint of the guard time a. After the trigger signal 215 becomes "1", the delay detector 83 turns the strobe signal 214 to "1" only once. Therefore, the amount of delay in the variable delay circuit 15 is altered only once. When all the sending nodes 1.0 to 1.3 have been adjusted, the network shifts to the packet transmission mode.

Packet Transmission Mode

In the packet transmission mode, the CPU 5 changes the mode signal 217 of all the sending nodes 1.0 to 1.3 to "10", and changes the enable signal 216 of the receiving node 2 to "0". The delay control signal 210 is kept at the value that is at the end of the delay adjustment mode. The respective operations of the sending nodes 1.0 to 1.3 are the same as during the delay adjustment mode, except for the fact that the payload c does not contain an idle pattern but data conveyed by a packet. Therefore, the switch timing of the packet switching system 3 is in the period A of FIG. 21, that is, at the exactly midpoint during the guard time a.

In the receiving nodes 2.0 to 2.3, the packet synchronization pattern is detected by the packet sync pattern detector 81 by the same manner as in the delay adjustment mode, and a head receive timing signal 212 is output. When the head receive timing signal 212 changes to "1", the frequency divider 25 is reset, thereby achieving frame synchronization.

Furthermore, the counter 53 continues the count-up in the same way as in the delay adjustment mode, maintaining a fixed interval between the timing at which the count 205 becomes "0" and the timing at which the head of the packet is received. Therefore, packet synchronization is achieved by generating a packet clock 122 using the count 205 as a reference at the packet clock generator 55.

In the third embodiment of the present invention, the respective lengths of the optical fibers 100.0 to 100.3 between the sending nodes 1.0 to 1.3 and the packet switching system 3 are only approximately adjusted, but the amount of delay of the variable delay circuit 15 is automatically adjusted by passing through the switch timing detection mode and the delay adjustment mode. As a result, the packet switching system 3 switches exactly midway during the guard time a, and the payload c and the bit synchronization pattern b are not erased by the switching of the optical switch 30.

Since bit synchronization and packet synchronization are obtained using a bit synchronization pattern and a packet synchronization pattern, there is no need to adjust the length of an optical fiber between the packet switching system 3 and the receiving node. That is, the third embodiment of the present invention achieves bit synchronization and packet synchronization at the packet switching system 3 and the receiver nodes 2.0 to 2.3 without the need of precisely adjusting the length of the optical fiber.

Furthermore, since the delays of the sending nodes 1.0 to 1.3 are automatically adjusted so that the switch timing of the packet switching system 3 is exactly midway during the guard time a, there is no need to provide an unnecessarily long guard time a, and consequently it is possible to obtain highly practical and effective throughput.

Fourth Embodiment

A packet switching network according to a fourth embodiment of the present invention is a 4×4 packet switching network as in the case of the third embodiment. However, the circuit configurations of the sending nodes 1.0 to 1.3 and the receiving nodes 2.0 to 2.3 according to the fourth embodiment are different from those of the third embodiment.

Furthermore, when the delay of the variable delay circuit 15 of the sending nodes 1.0 to 1.3 is set to "0", the respective lengths of the optical fibers 100.0 to 100.3 linking the sending nodes 1.0 to 1.3 and the packet switching system 3 are approximately adjusted to the extent that the latency of the packet output by the bit synchronization pattern addition circuit 11 and input to the optical switch 30 of the packet switching system 3 falls into a range from a time period calculated by subtracting "263 serial clock periods" from "one packet clock period" to a time period calculated by subtracting "eight serial clock periods" from "one packet clock period". The constitutions of other circuit blocks of the present embodiment are the same as in the third embodiment of the present invention.

Figure 22:
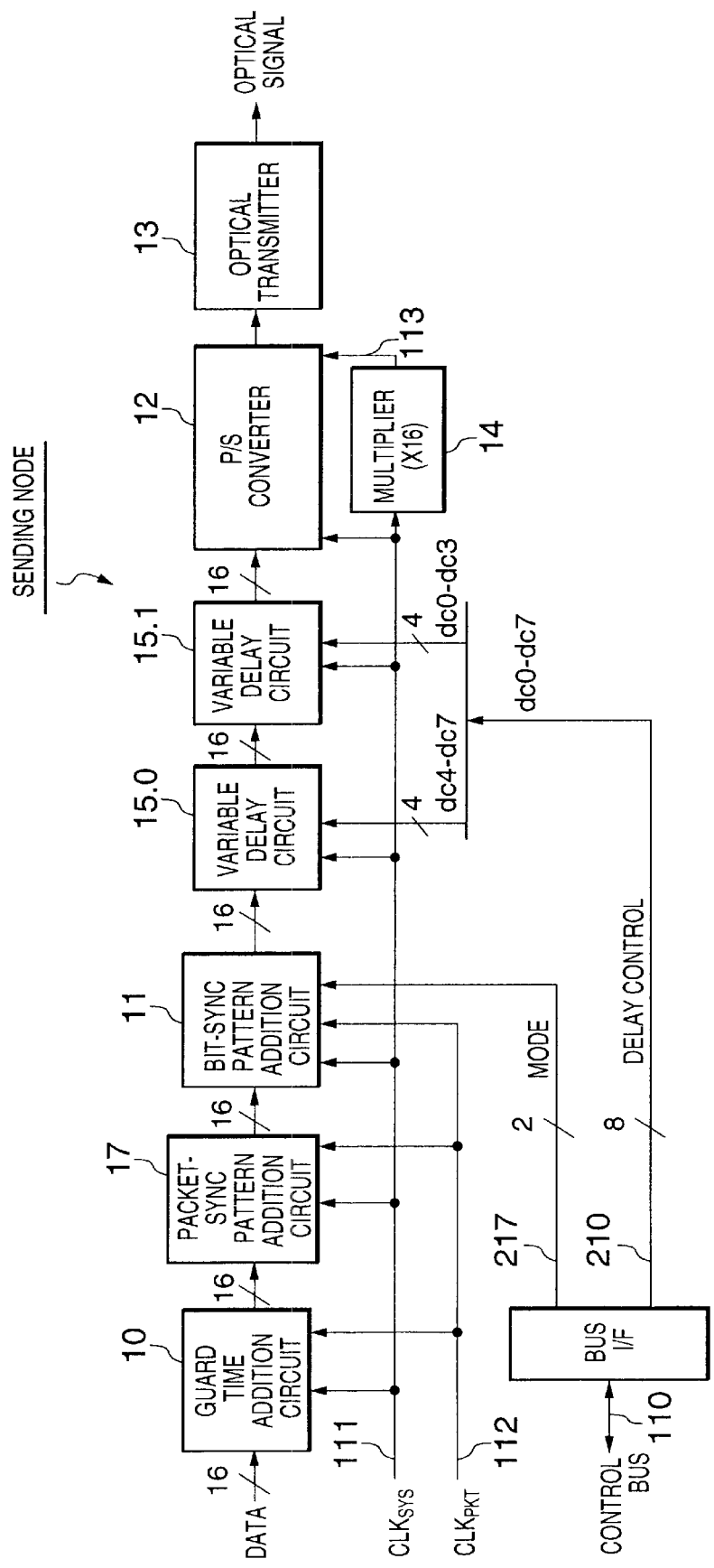
FIG. 22 is a block diagram showing a constitution of a sending node according to a fourth embodiment of the present invention.

FIG. 22 shows the circuit configuration of a sending node according to the fourth embodiment of the present invention. In the sending node according to the fourth embodiment of the present invention, a series of the variable delay circuit 15.0 and the variable delay circuit 15.1 is provided between the bit synchronization pattern addition circuit 11 and the parallel/serial converter 12. A delay control signal 210 has the width of eight bits, the upper four bits thereof are connected to the variable delay circuit 15.0, and the lower four bits are connected to the variable delay circuit 15.1.

The respective variable delay circuits 15.0 and 15.1 provide rough delay adjustment and precise delay adjustment. In all other respects, their constitutions are the same as those of the sending node according to the third embodiment of the present invention.

Figure 23:
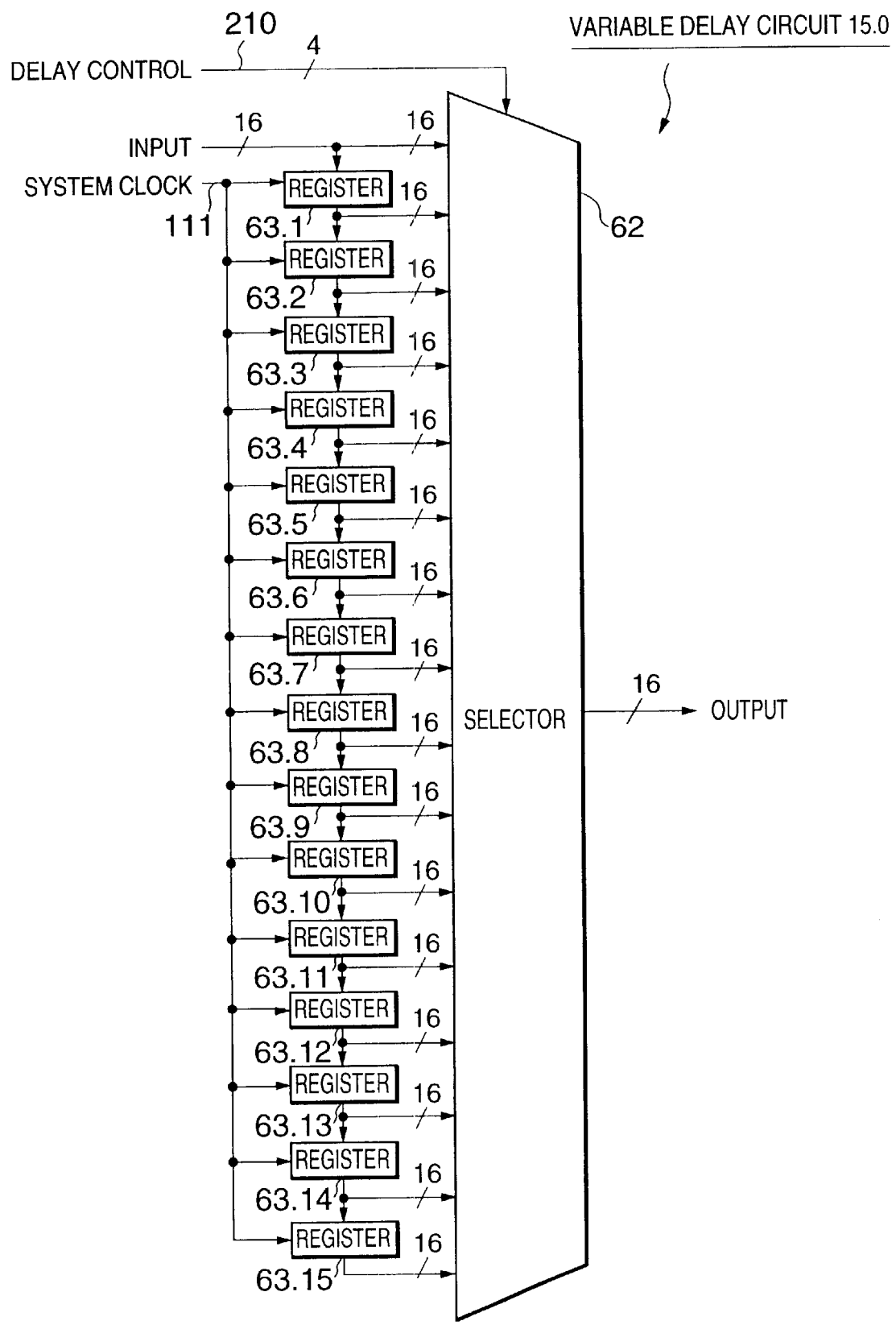
FIG. 23 is a block diagram showing a constitution of the variable delay circuit of FIG. 22.

FIG. 23 shows the circuit configuration of the variable delay circuit 15.0 of FIG. 22. As shown in FIG. 23, instead of the flip-flops 61.1 to 61.15 used by the variable delay circuit 15 according to the third embodiment of the present invention, the variable delay circuit 15.0 uses registers 63.1 to 63.15. When the delay control signal 210 is set to "0000", the input signal directly becomes the output signal, and when the delay control signal 210 is set to "1111", a signal delayed by fifteen system clock periods after passing through the fifteenth register 63.15 becomes the output signal. Therefore, the variable delay circuit 15.0 adjusts the amount of delay in steps of one system clock period, that is, insteps of sixteen serial clock periods.

Figure 24:
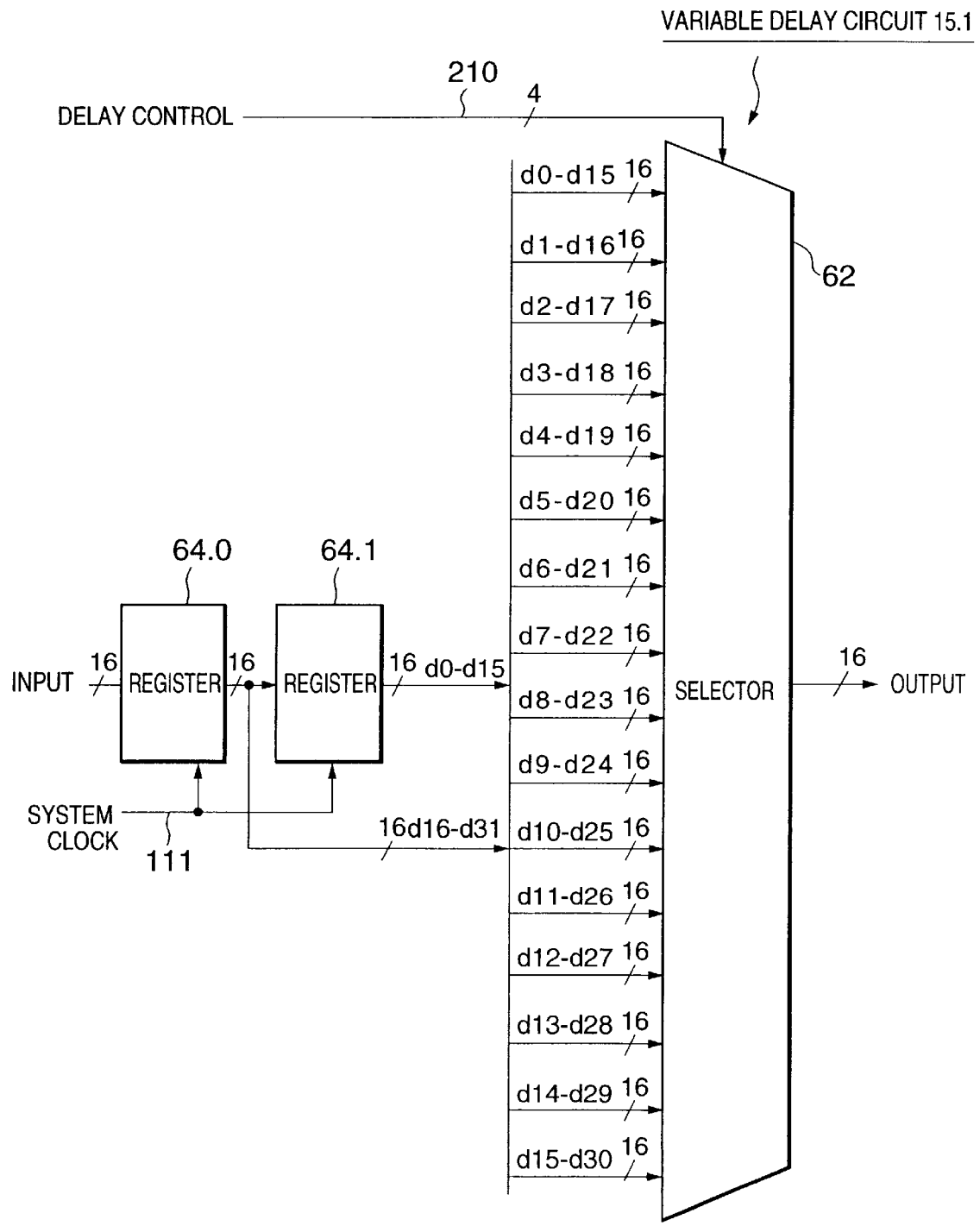
FIG. 24 is a block diagram showing a constitution of the variable delay circuit of FIG. 22.

FIG. 24 shows the circuit configuration of the variable delay circuit 15.1 of FIG. 22. In FIG. 24, the variable delay circuit 15.1 uses a bit rotator as a variable delay circuit, and comprises registers 64.0 and 64.1, and a selector 62.

The selector 62 selects which sixteen bits to be output from a total of thirty-two bits consisting of the sixteen bits d0 to d15 stored in the register 64.1, and the sixteen bits d16 to d31 stored in the register 64.0. For example, when the delay control signal 210 is set to "0000", d0 to d15 are output, when the delay control signal 210 is set to "0001", d1 to d16 are output, when the delay control signal 210 is set to "1111", d15 to d30 are output.

Therefore, the variable delay circuit 15.1 adjusts the amount of delay in steps of one serial clock period, and thus it is functionally equivalent to the variable delay circuit 15 according to the third embodiment of the present invention. By using both the variable delay circuits 15.0 and 15.1, the amount of delay can be adjusted within a range of 0 to 255 serial clock periods.

Figure 25:
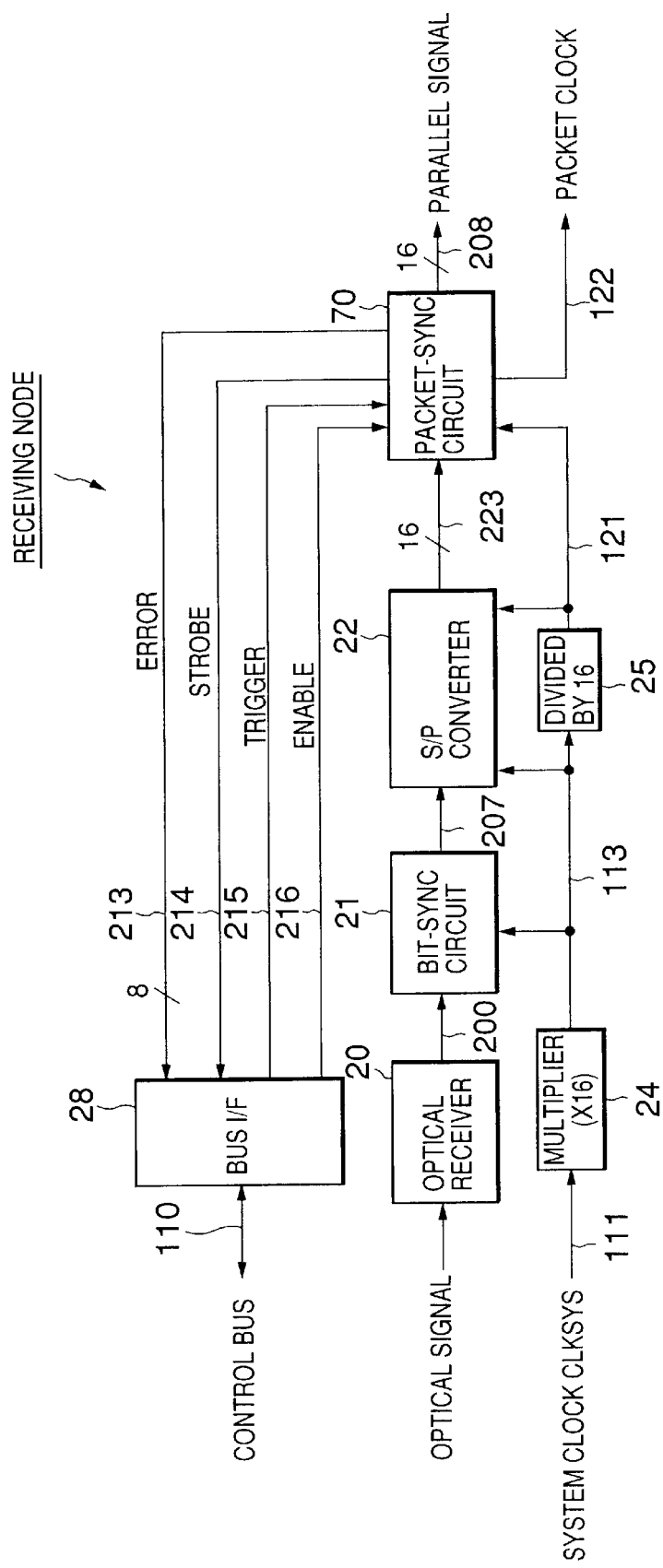
FIG. 25 is a block diagram showing a constitution of a receiving node according to the fourth embodiment of the present invention.

FIG. 25 shows the circuit configuration of a receiving node according to the fourth embodiment of the present invention. In FIG. 25, the receiving node according to the fourth embodiment of the present invention is comprised of a packet sync circuit 70 in the latter stage of the serial/parallel converter 22. The packet sync circuit 70 outputs an error signal 213 having a width of eight bits, the other parts of the constitution being identical to those of the receiving node according to the third embodiment of the present invention.

Figure 26:
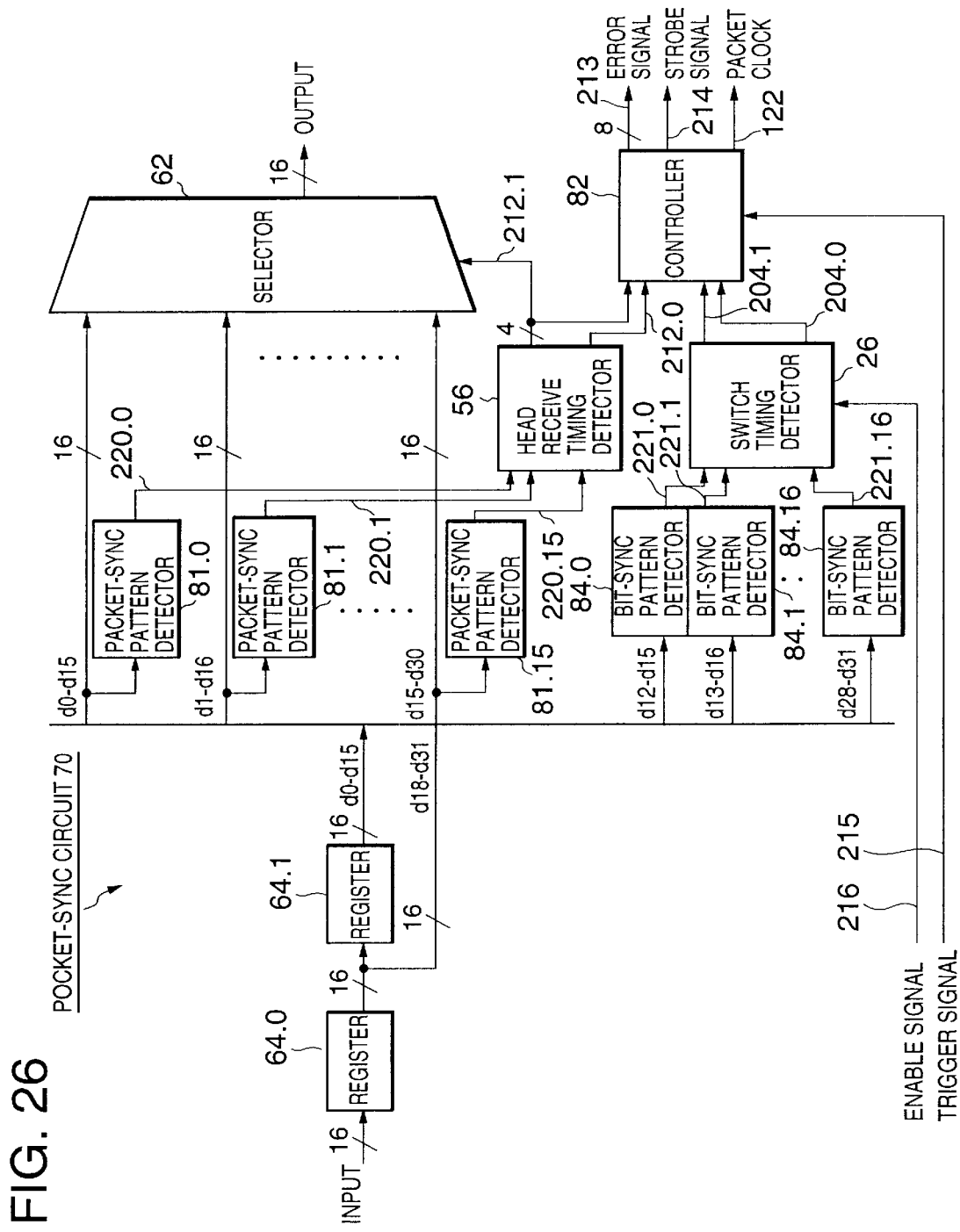
FIG. 26 is a block diagram showing a constitution of the packet sync circuit of FIG. 25.

FIG. 26 shows the circuit configuration of the packet sync circuit 70 of FIG. 25. In FIG. 26, the packet sync circuit 70 is comprised of an switch timing detector 26, a header receive timing detector 56, a selector 62, registers 64.0 and 64.1, packet sync pattern detectors 81.0 to 81.15, a controller 82, and bit synchronization pattern detectors 84.0 to 84.16.

The packet sync circuit 70 has a frame and packet synchronization function using the bit rotator, and a function of obtaining an error signal used to adjust the amount of delay in a sending node by comparing the switch timing with the head receiving timing. The bit rotator is comprised of the registers 64.0 and 64.1, and the selector 62, the circuit configuration of which is identical to that of the variable delay circuit 15.1 as shown in FIG. 24.

Each of the packet sync pattern detectors 81.0 to 81.15 compares an input 16-bit parallel signal with the packet synchronization pattern. When they match, the packet sync pattern detector changes the packet synchronization pattern detection signal 220 to "1", and when they do not match, the packet sync pattern detector changes the signal 220 to "0". The head receive timing detector 56 outputs the head receive timing signals 212.0 and 212.1 depending on the packet synchronization pattern detection signals 220.0 to 220.15 received from the packet sync pattern detectors 81.0 to 81.15.

FIG. 27 is a truth table showing an operation of the head receive timing detector 56 of FIG. 26. The head receive timing signal 212.0 is "1" when the packet synchronization pattern is detected from the signals d0 to d30 stored in the registers 64.0 and 64.1, and is otherwise "0".

On the other hand, the head receive timing signal 212.1 having a width of four bits identifies the position at which the packet synchronization pattern has been detected among d0 to d30. When the packet synchronization pattern is detected between d0 and d15, the signal becomes "0000". When it is detected between d1 and d16, the signal becomes "0001". Similarly, when it is detected between d15 and d30, the signal becomes "1111". Therefore, by referring to the head receive timing signals 212.0 and 212.1, it is possible to identify the timing at which the packet synchronization pattern is detected in one packet clock period with the resolution of one serial clock period.

The receive timing signal 212.1 is also a control signal of the selector 62. When the head receive timing signal 212.1 is "0000", d0 to d15 are selected by the selector 62, when it is "0001", d1 to d16 are selected, and similarly when it is "1111", d15 to d30 are selected. Therefore, the bit rotator composed of the registers 64.0 and 64.1 and the selector 62 is controlled depending on a position at which the packet synchronization pattern is detected by the packet sync pattern detector 81. As a result, a 16-bit parallel signal selected by the selector 62 is in frame synchronization.

When a 4-bit parallel signal is either "0101" or "1010", the respective bit synchronization pattern detectors 84.0 to 84.16 change bit synchronization detection signals 221.0 to 221.16 to "1", and otherwise to "0". The switch timing detector 26 outputs switch timing signals 204.0 and 204.1 depending on the enable signal 216 and the bit synchronization pattern detection signals 221.0 to 221.16 that are output respectively from the bit synchronization detectors 84.0 to 84.16.

FIG. 28 is a truth table showing an operation of the switch timing detector 26 of FIG. 26. In FIG. 28, the switch timing signal 204.0 is "1" when the enable signal 216 is "1" and the signals d0 to d19 stored in the registers 64.0 and 64.1 include a point of change from the bit synchronization pattern to another pattern. At other times, the switch timing signal 204.0 is "0".

On the other hand, the 4-bit switch timing signal 204.1 shows the position of a point of change among d12 and d31. When a point of change is between d15 and d16, the 4-bit switch timing signal 204.1 becomes "0000", when between d16 and d17, it becomes "0001", and similarly when between d30 and d31, the signal becomes "1111". Therefore, a combination of the two switch timing signals 204.0 and 204.1 can specify the position of a change point at which the input signal changes from the bit synchronization pattern to another pattern within one packet clock period.

The fourth embodiment of the present invention also has three operation modes: the switch timing detection mode, the delay adjustment mode, and the packet transmission mode. The basic operations of the modes are the same as those of the third embodiment of the present invention.

As in the case of the third embodiment of the present invention, in the switch timing detection mode, the receiving node alternately receives a bit synchronization pattern and an idle pattern. As mentioned earlier, the switch timing signal 204.0 changes to "1" when the signals d0 to d19 stored in the registers 64.0 and 64.1 of the packet sync circuit 70 include a point at which the signal changes to a pattern other than the bit synchronization pattern, and the switch timing signal 204.1 shows the position of a point of change occurring between d12 and d31. The signals 204.0 and 204.1 are supplied to the controller 82.

Figure 29:
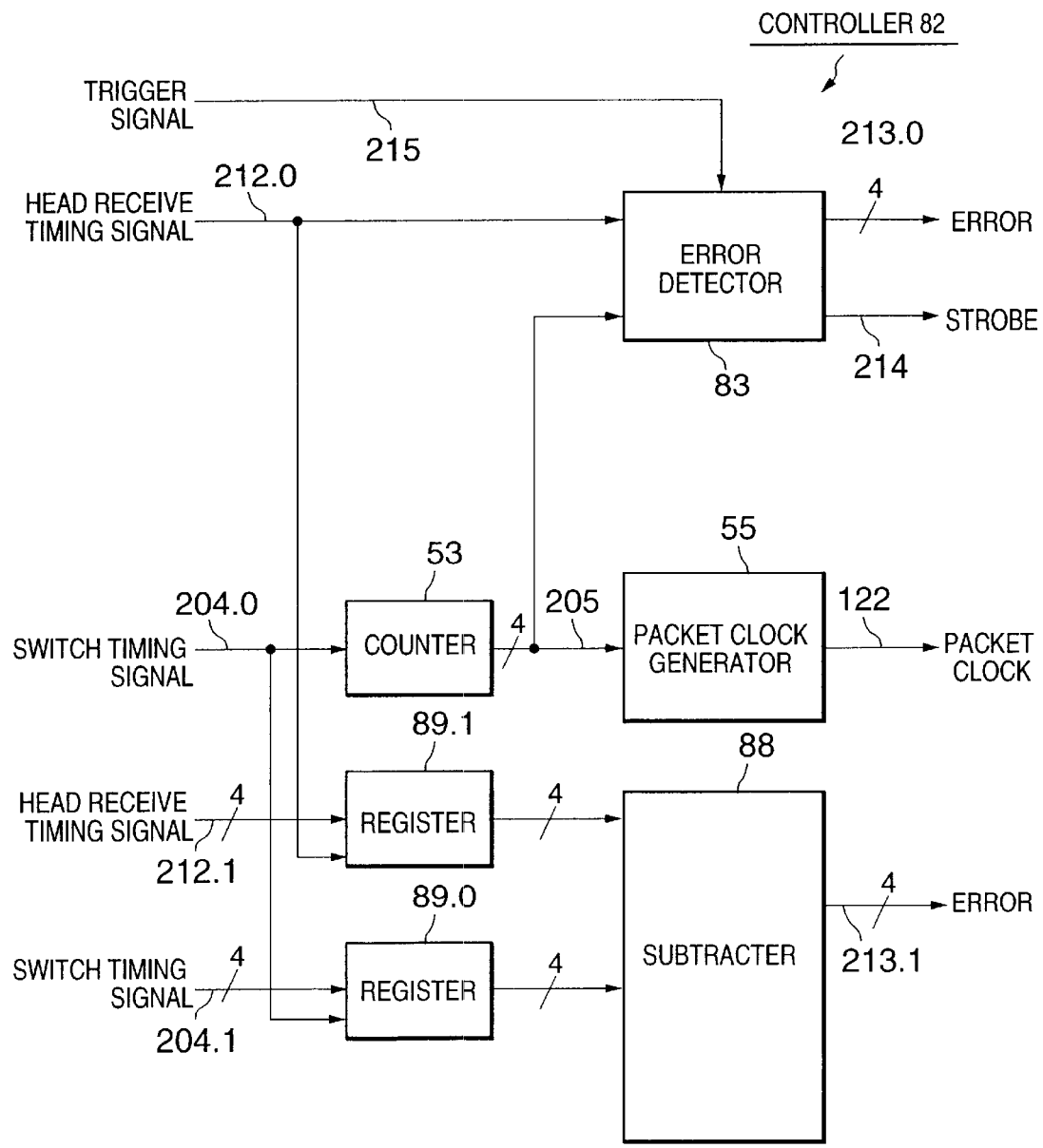
FIG. 29 is a block diagram showing a constitution of a the controller of FIG. 26.

FIG. 29 shows the circuit configuration of the controller 82 of FIG. 26. In FIG. 29, the controller 82 comprises a counter 53, a packet clock generator 55, an error detector 83, a subtracter 88, and registers 89.0 and 89.1. The counter 53 is reset when the switch timing signal 204.0 becomes "1", and returns to "0" when counting to "10" according to the system clock 121. That is, the switch timing is stored by repeating the counting operation of one packet clock period. Furthermore, the switch timing signal 204.1 is written onto the register 89.0.

The switch timing signal 204.0 is supplied to the register 89.0 as an enable signal, and the switch timing signal 204.1 is written onto the register 89.0 just once immediately after the switch timing signal 204.1 has been updated. That is, in the fourth embodiment of the present invention, the switch timing is stored by a combination of the counter 53 and the register 89.0.

As in the third embodiment of the present invention, in the delay adjustment mode, the sending node 1.0 and the receiving node 2.0, the sending node 1.1 and the receiving node 2.1, the sending node 1.2 and the receiving node 2.2, and the sending node 1.3 and the receiving node 2.3 are each fixedly connected. The sending nodes 1.0 to 1.3 transmit a packet having an idle pattern as data of payload c.

The packet received by each of the receiving nodes 2.0 to 2.3 is converted to an electric serial signal 200 by the optical receiver 20 and the serial signal 200 is then bit-synchronized by the bit sync circuit 21. The bit-sync serial signal 207 is converted to a parallel signal 223 by the serial/parallel converter 22 and the parallel signal 223 is output to the packet sync circuit 70. At this stage, there is established no frame synchronization.

As described above, when the signals do to d30 stored in the registers 64.0 and 64.1 of the packet sync circuit 70 include a packet synchronization pattern, the head receive timing signal 212.0 becomes "1", and the head receiver timing signal 212.1 shows the position of the packet synchronization pattern between do and d30. The signals 212.0 and 212.1 are input to the controller 82.

The head receive timing signal 212.0 is applied to the error detector 83, and when the head receive timing signal 212.0 becomes "1", the error detector 83 outputs the count 205 of the counter 53 as the error signal 213.0. That is, the error signal 213.0 shows the error between the head receive timing and the switch timing in units of 16 serial clock periods, its value falling into a range from 0 to 10.

On the other hand, the head receive timing signal 212.1 is stored in the register 89.1, which inputs the head receive timing signal 212.0 as an enable signal. The subtracter 88 calculates a difference between the switch timing signal 204.1 and the head receive timing signal 212.1 which are each stored in the registers 89.0 and 89.1, obtaining an error signal 213.1. The error signal 213.1 shows an error between the head receive timing and the switch timing in units of one serial clock period.

By combining the error signal 213.0 as the upper four bits and the error signal 213.1 as the lower four bits, it is possible to obtain an error signal 213 of eight bits which shows an error between 0 to 175 serial clock periods, i.e. one packet clock period, with the resolution of one serial clock period. The error signal 213 is written onto the bus interface 28 according to a strobe signal 214, and is sent to the CPU 5 through the control bus 110. As in the third embodiment of the present invention, the CPU 5 calculates a new delay control signal 210 based on the error signal 213 received from the receiving node 2.0, and supplies it to the sending node 1.0.

The same procedures as above are carried out between the receiving node 2.1 and sending node 1.1, the receiving node 2.2 and the sending node 1.2, and the receiving node 2.3 and the sending node 1.3. Thereafter, when the amounts of delay in all of the sending nodes 1.0 to 1.3 have been adjusted, the network enters the packet transmission mode.

In the packet transmission mode, ordinary packet transmission is performed. When the amount of delay of the variable delay circuit 15 in a sending node has been adjusted following the switch timing detection mode and the delay adjustment mode, the switch timing of the packet switching system 3 is positioned exactly midway through the guard time a.

This is achieved in the packet synchronization circuit 70 in a receiving node using the method already described. Furthermore, packet synchronization is achieved by the packet clock generator 55 of the packet sync circuit 70 generating a packet clock using the count 205 of the counter 53 as a reference.

The variable delay circuit 15 and the packet sync circuit 70 according to the third embodiment of the present invention both operate in accordance with the serial clock. However, in the fourth embodiment of the present invention, the variable delay circuit 15 is provided before the parallel/serial converter 12, and the packet sync circuit 70 is provided after the serial/parallel converter 22, and both are operated by the system clock.

The frequency of the system clock is lower than that of the serial clock. For instance, in the present embodiment, when the serial clock frequency is 3.2 GHz, the frequency of the system clock is 200 MHz. In order to obtain an electric circuit operating at 3.2 GHz, a highly expensive production process is needed. However, at present, an electric circuit operating at approximately 200 MHz can easily be obtained inexpensively by using a CMOS (Complementary Metal Oxide Semiconductor) process.

Furthermore, in the fourth embodiment of the present invention, the variable delay circuit 15, the switch timing signal 204, the head receive timing signal 212, the error signal 213, and the like, are composed of a combination of rough and precise adjustment sections. Therefore, the resolution of the delay adjustment is kept at the same as that of the third embodiment of the present invention, while having an adjustable range which is sixteen times greater than that of the third embodiment of the present invention. As a result, when adjusting the length of an optical fiber connecting a sending node to the packet switching system 3 in advance, sixteen times as many errors as in the third embodiment of the present invention can be discounted. As in the third embodiment of the present invention, an optical fiber connecting the packet switching system 3 and a receiving node does not require adjustment.

Fifth Embodiment

A fifth embodiment of the present invention is a 4×4 packet switching network which is characterized by using a so-called window control to achieve frame synchronization. The fifth embodiment of the present invention is basically the same as the fourth embodiment of the present invention, the only difference being that it comprises a synchronization protector for performing the window control in the packet sync circuit 70 of a receiving node.

Figure 30:
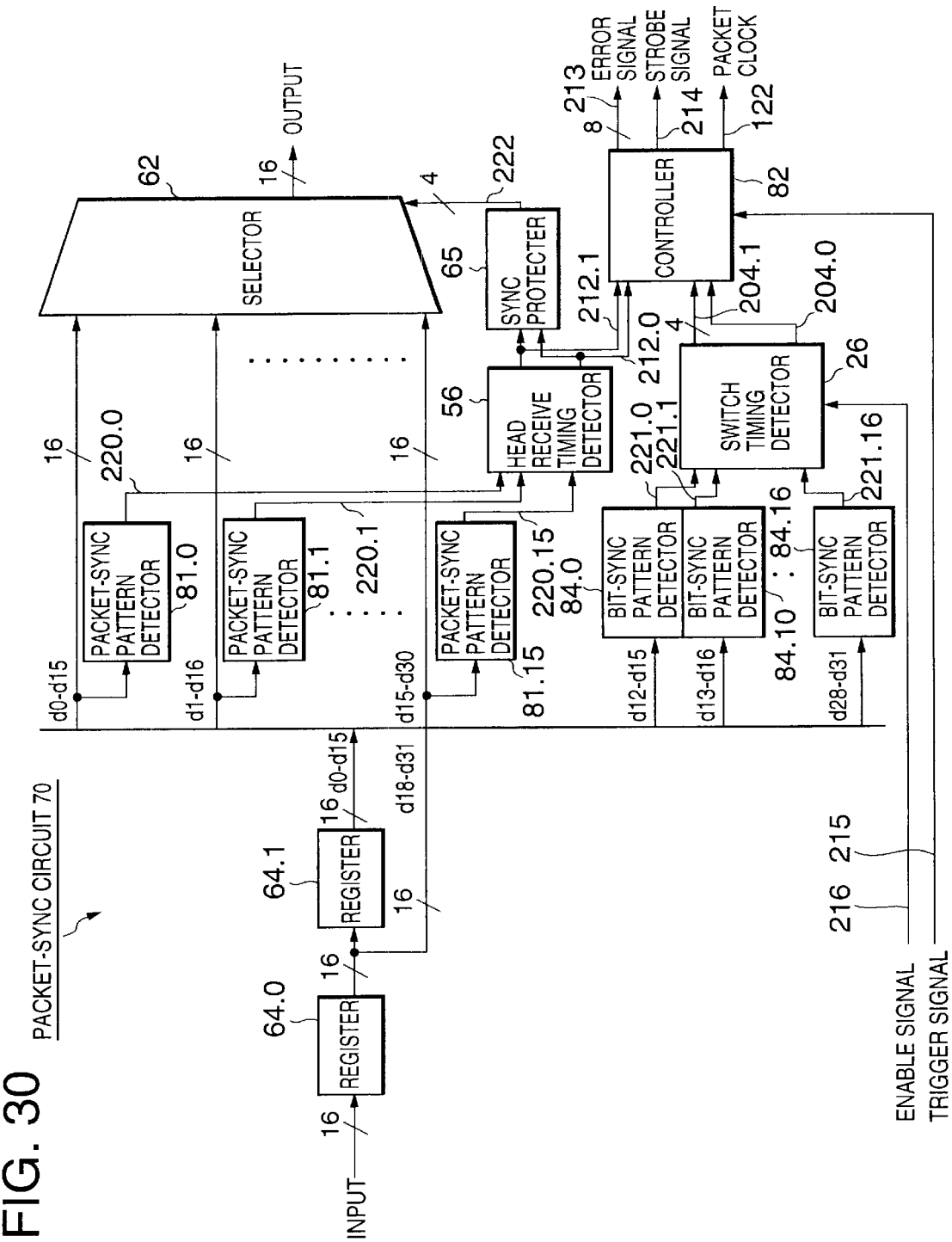
FIG. 30 is a block diagram showing a constitution of a packet synchronization circuit according to a fifth embodiment of the present invention.

FIG. 30 shows the circuit configuration of the packet sync circuit 70 according to the fifth embodiment of the present invention. In FIG. 30, the packet sync circuit 70 has the same constitution as in the fourth embodiment of the present invention in FIG. 26, with the exception that it further comprises a synchronization protector 65. Other circuit blocks are denoted by the same reference numerals and the details thereof are omitted.

As described above, the synchronization protector 65 performs so-called window control during frame synchronization, and produces a selector control signal 222 from the head receive timing signals 212.0 and 212.1 received from the head receive timing detector 56.

Figure 31:
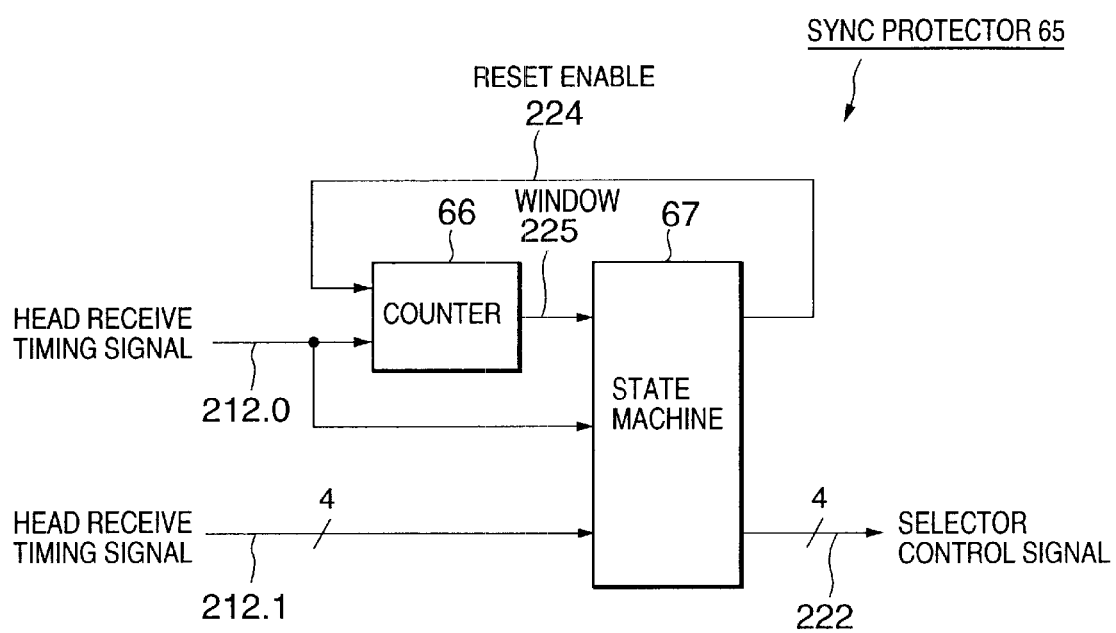
FIG. 31 is a block diagram showing a constitution of a synchronization protection circuit of FIG. 30.
Figure 32:
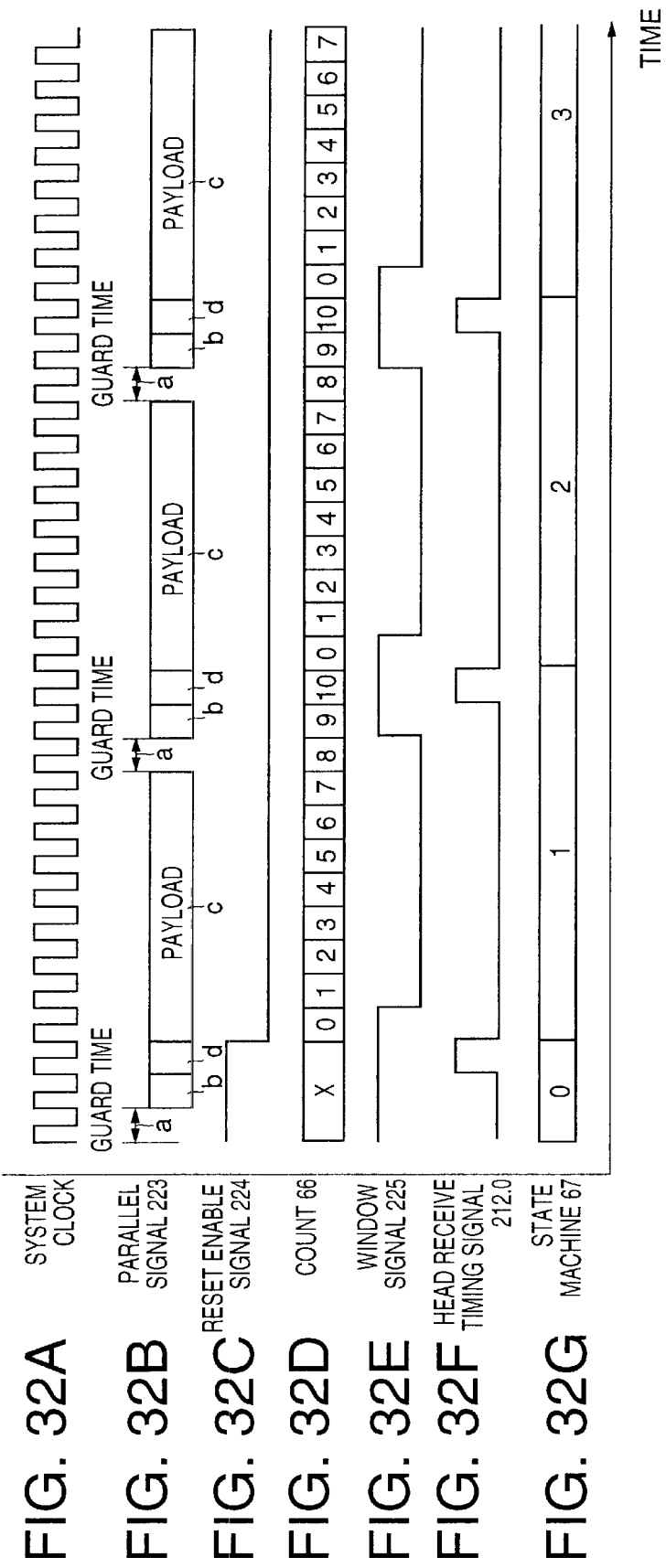
FIGS. 32A–32G are a timing chart showing the operation of the synchronization protection circuit of FIG. 30.
Figure 33:
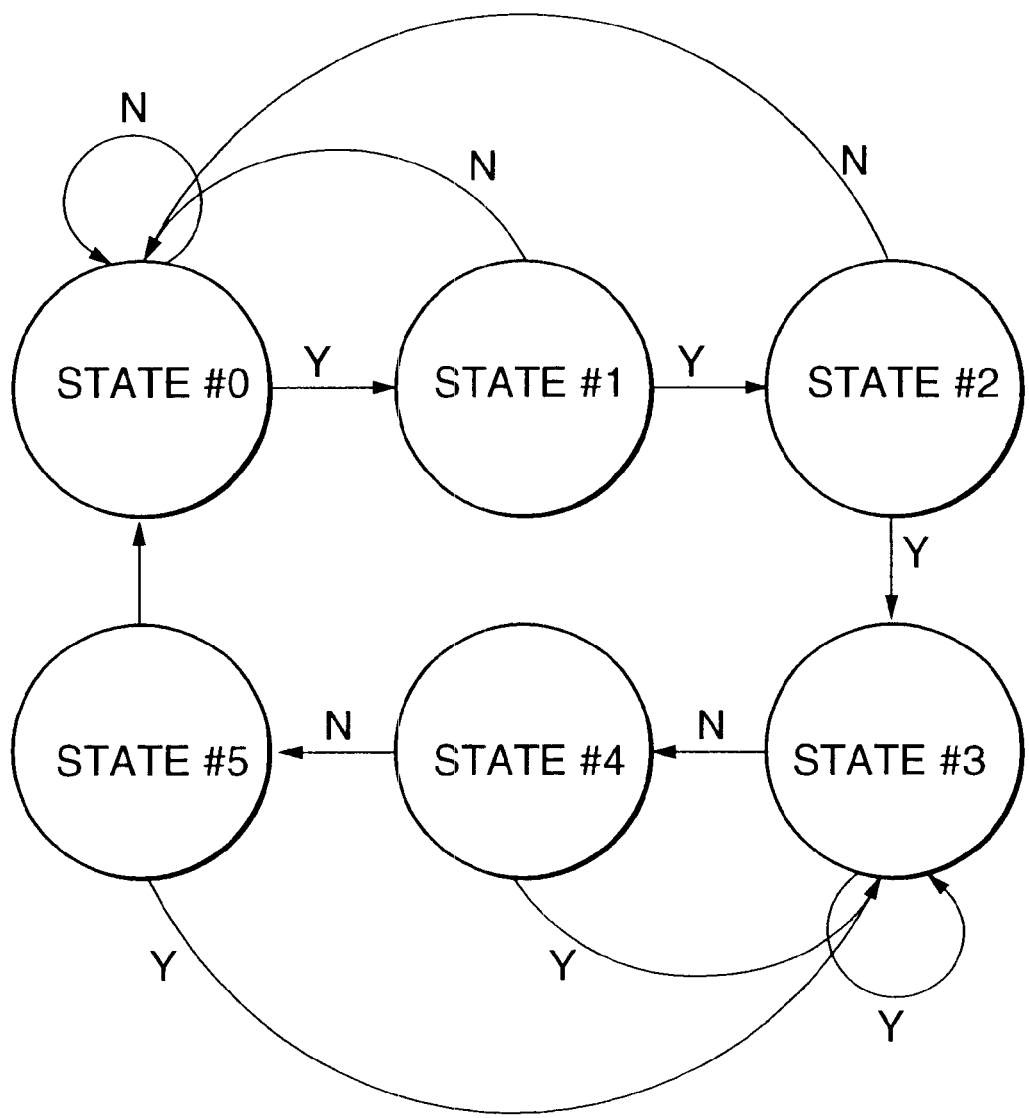
FIG. 33 is a transitional diagram showing the operation of a state machine of the synchronization protection circuit of FIG. 30.

FIG. 31 shows the circuit configuration of the synchronization protector 65 of FIG. 30, FIG. 32 shows an operation of the synchronization protector 65, and FIG. 33 shows an operation of a state machine of the synchronization protector 65.

As shown in FIG. 31, the synchronization protector 65 is comprised of a counter 66 and a state machine 67. The state machine 67 operates in accordance with the state transition diagram as shown in FIG. 33.

Referring to FIG. 33, reference symbol "Y" indicates that the head receive timing signal 212.0 is "1" during the period where the window signal 225 is "1", and reference symbol "N" indicates that the head receive timing signal 212.0 has not changed to "1" during the period where the window signal 225 is "1". In the initial state, the state machine 67 is at state #0.

When the state machine 67 is in the state #0, the reset enable signal 224 is "1", and otherwise is "0". When the head receive timing signal 212.0 changes to "1" while the reset enable signal 224 is "1", the counter 66 is reset. The counter 66 counts up to "10" and then returns to "0".

When the count of the counter 66 is "10", "0" or "1", or when the reset enable signal 224 is "1", the window signal 225 is "1". Hereinafter, the period where the window signal 225 is "1" is called window.

In the case where the state machine 67 is in the state #2 or less, if the head receiver timing signal 212.0 becomes "1" in the window, then the state of the state machine 67 is increased by one, and if the head receive timing signal 212.0 does not become "1" in the window, then the state machine 67 returns to the state #0.

Therefore, when the head receive timing signal 212.0 becomes "1" three times in succession in the window, the state of the state machine reaches the state #3. When the state machine 67 is in the state #0, #1 or #2, it is determined that the packet synchronization is not established, and the selector control signal 222 does not change. At the states #3, #4 or #5, it is determined that the packet synchronization has been established, and the head receive timing signal 212.1 is output as a selector control signal 222.

When the state transition of "N", in which the head receive timing signal 212.0 does not become "1", occurs three times in succession after entering the state #3, the state machine 67 returns to the state #0 via the states #4 and #5.

According to the operation of the synchronization protector 65 described above, the fifth embodiment of the present invention achieves the so-called backward protection, in which establishment of packet synchronization is determined when the packet synchronization pattern is detected three times in succession from a state out of packet synchronization, and the so-called forward protection, in which non-establishment of packet synchronization is determined when the packet synchronization pattern is not detected three times in succession from the state of packet synchronization establishment.

In the fifth embodiment of the present invention, the backward protection can prevent erroneous packet synchronization caused by changing a pattern other than the packet synchronization pattern into the packet synchronization pattern due to the occurrence of bit errors. In addition, the forward protection can prevent loss of synchronization caused by bit errors in the packet synchronization pattern.

In a packet switching network exchanging high-speed signals using an analog switch such as an optical switch, every time the switches are switched, there is a possibility that the frame phase and the packet phase of a packet received at a receiving node may be changed, and consequently frame and packet synchronization is needed at every packet. The fifth embodiment of the present invention defines a window of a certain length in such a packet switching network, and carries out the forward and backward protections by recognizing only packet synchronization patterns detected in the window as true packet synchronization patterns.

During this operation, the shorter the length of the window, the higher the precision of the forward and backward protections. In the present embodiment, since skews occurring from each of the sending nodes to the packet switching system 3 are absorbed by the method already described in detail in the fourth embodiment of the present invention, the length of the window can be made sufficiently short.

Sixth Embodiment

The sixth embodiment of the present invention comprises a 4×4 packet switching network. The switch timings of all switch elements within the packet switch become equal when there is no variation in delay (i.e. no skews) in the packet switch. Therefore, by employing a method for automatically adjusting delays occurring from the sending nodes to the packet switch to match the switch timing of the packet switch, skews from all the sending nodes to all the switch elements in the packet switch can be absorbed.

However, in the case where there is a skew in the packet switch, the skew cannot be absorbed by employing the above-mentioned method. The sixth embodiment of the present invention provides a method for absorbing such skews in the packet switch.

The conrifuration of the sixth embodiment of the present invention is basically identical to that of the fourth embodiment of the present invention. The differences between them are the constitution of the optical switch 30 of the packet switching system 3, and the method for controlling skew absorption.

Figure 34:
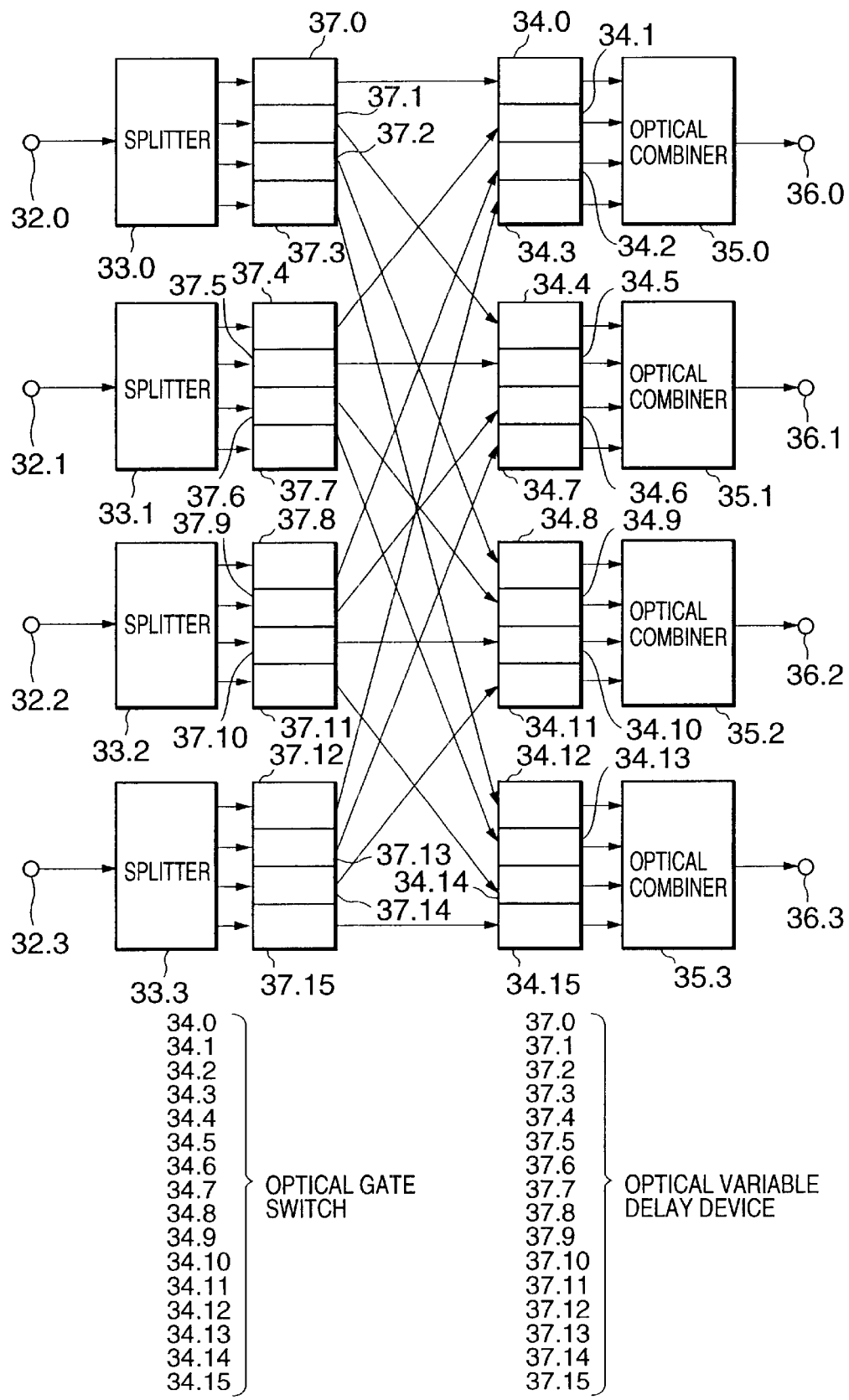
FIG. 34 is a block diagram showing a constitution of an optical switch according to a sixth embodiment of the present invention.

FIG. 34 shows the constitution of the optical switch 30 according to the sixth embodiment of the present invention. In FIG. 34, optical variable delay devices 37.0 to 37.15 are inserted into optical interconnections between the optical splitters 33.0 to 33.3 and the optical gate switches 34.0 to 34.15, respectively. In all other respects, the constitution is the same as that of the optical switch 30 according to the first embodiment of the present invention shown above in FIG. 5, and similar elements are denoted by the same reference numerals. Here, the respective optical variable delay devices 37.0 to 37.15 change the lengths of the paths by changing the tension applied to corresponding optical fibers.

In the sixth embodiment of the present invention, the CPU 5 first sets the delay amount of all the optical variable delay devices 37.0 to 37.15 of the optical switch 30 at the center of a variable range of delay. Then, using the method shown in the fourth embodiment of the present invention, the CPU 5 operates in a first mode of the switch timing detection and delay adjustment modes.

Next, the CPU 5 instructs the packet switching system 3 to alter the arrangement of the connections between the sending node and the receiving node, and starts a second mode of the switch timing detection and delay adjustment modes. Here, in the switch timing detection mode, the CPU 5 alternately switches between the connection of the sending node 1.0 and the receiving node 2.1 and the connection of the sending node 1.1 and the receiving node 2.1. Further, in the delay adjustment mode, the CPU 5 connects the sending node 1.0 to the receiving node 2.1. That is, in the first mode of switch timing detection and delay adjustment modes, the CPU 5 adjusts a delay of the sending node 1.0 using the receiving node 2.0. Then, in the second mode of switch timing detection and delay adjustment modes, the CPU 5 adjusts a delay of the sending node 1.0 using the receiving node 2.1.

The delay control signal 210 obtained by the second delay adjustment is not supplied to the sending node 1.0, but the same delay adjustment is performed by the optical variable delay device 37.1. Next, the CPU 5 carries out a third adjustment of delay of the sending node using the receiving node 2.2. As a result, the obtained delay control signal 210 is again not supplied to the-transmission 1.0, and the same delay adjustment is performed with the optical variable delay device 37.2.

Furthermore, the CPU 5 carries out a fourth delay adjustment using the receiving node 2.3, and supplies the result to the optical variable delay device 37.3. In this way, the skews of four paths between the input port 32.0 and the optical gate switches 34.0, 34.4, 34.8 and 34.12, can be absorbed. By repeating the same operation with the input ports 32.1, 32.2, and 32.3, the skews between all the input ports 32.0 to 32.3 and the optical gate switches 34.0 to 34.15 in the optical switch 30 can be absorbed.

Seventh Embodiment

The seventh embodiment of the present invention uses a 4×4 packet switching network. In the present embodiment, the constitutions of the sending nodes 1.0 to 1.3 and the receiving nodes 2.0 to 2.3 differ from those in the fourth embodiment of the present invention, but the constitutions of the other parts are the same. Furthermore, in the present embodiment, the constitution of a packet differs from that of the fourth embodiment of the present invention, the period of the packet clock being twelve times that of the system clock.

Figure 35:
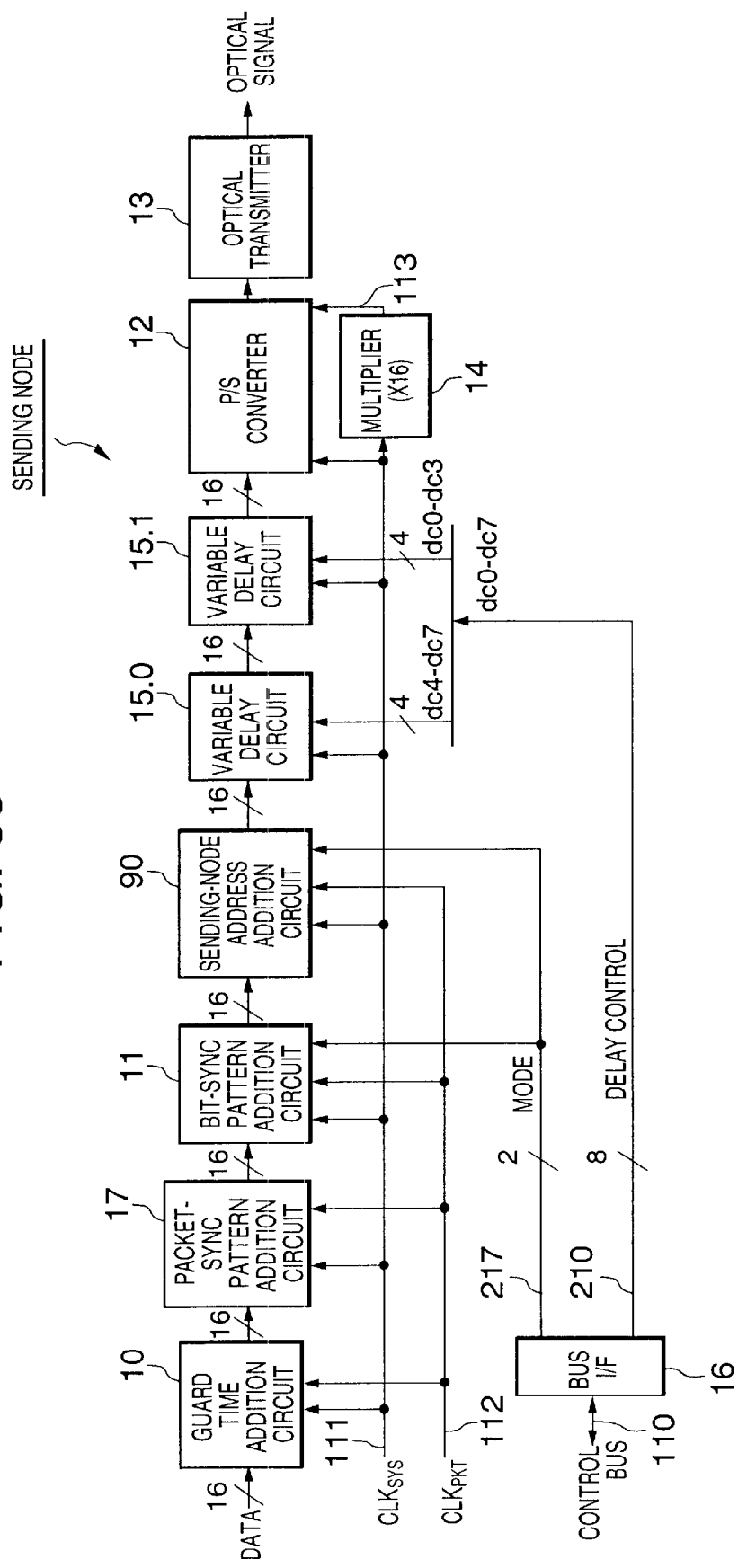
FIG. 35 is a block diagram showing a constitution of a sending node according to the seventh embodiment of the present invention.

FIG. 35 shows the circuit configuration of a sending node in accordance with the seventh embodiment of the present invention. In FIG. 35, a sending-node address addition circuit 90 is added between the bit synchronization pattern addition circuit 11 and the variable delay circuit 15.0 of the sending node. In all other respects, the constitution of the sending node according to the seventh embodiment of the present invention is the same as that according to the fourth embodiment of the present invention as shown in FIG. 22. Therefore, similar circuit blocks are denoted by the same reference numerals.

Figures 36A, 36B, 36C:
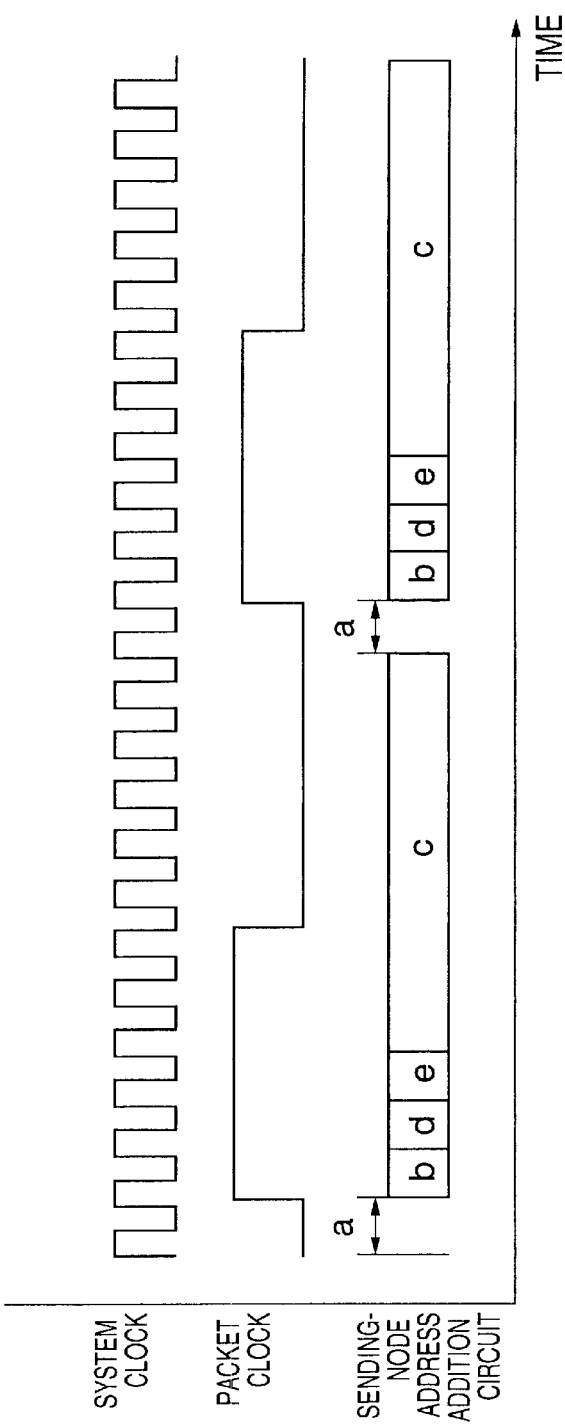
FIGS. 36A–36C are a timing chart showing a signal output from a sending-node address addition circuit of a sending node according to the seventh embodiment of the present invention.

FIG. 36 shows an output signal of the sending-node address addition circuit 90 of the sending node according to the seventh embodiment of the present invention. An operation of the sending-node address addition circuit 90 will be explained with reference to FIGS. 35 and 36.

When the mode signal 217 is set to "10", that is, during the delay adjustment mode and the packet transmission mode, the sending-node address addition circuit 90 inserts the number of its own node to each packet after the packet synchronization pattern, as a 16-bit sending-node address denoted by reference symbol "e". For instance, the sending-node address is a serial number of the node. In the sending node 1.1, it appends a 16-bit sending-node address of "0000000000000001" to all the packets to be sent. Similarly, in the sending node 1.2, it appends a 16-bit sending-node address of "0000000000000002" to all the packets to be sent.

Figure 37:
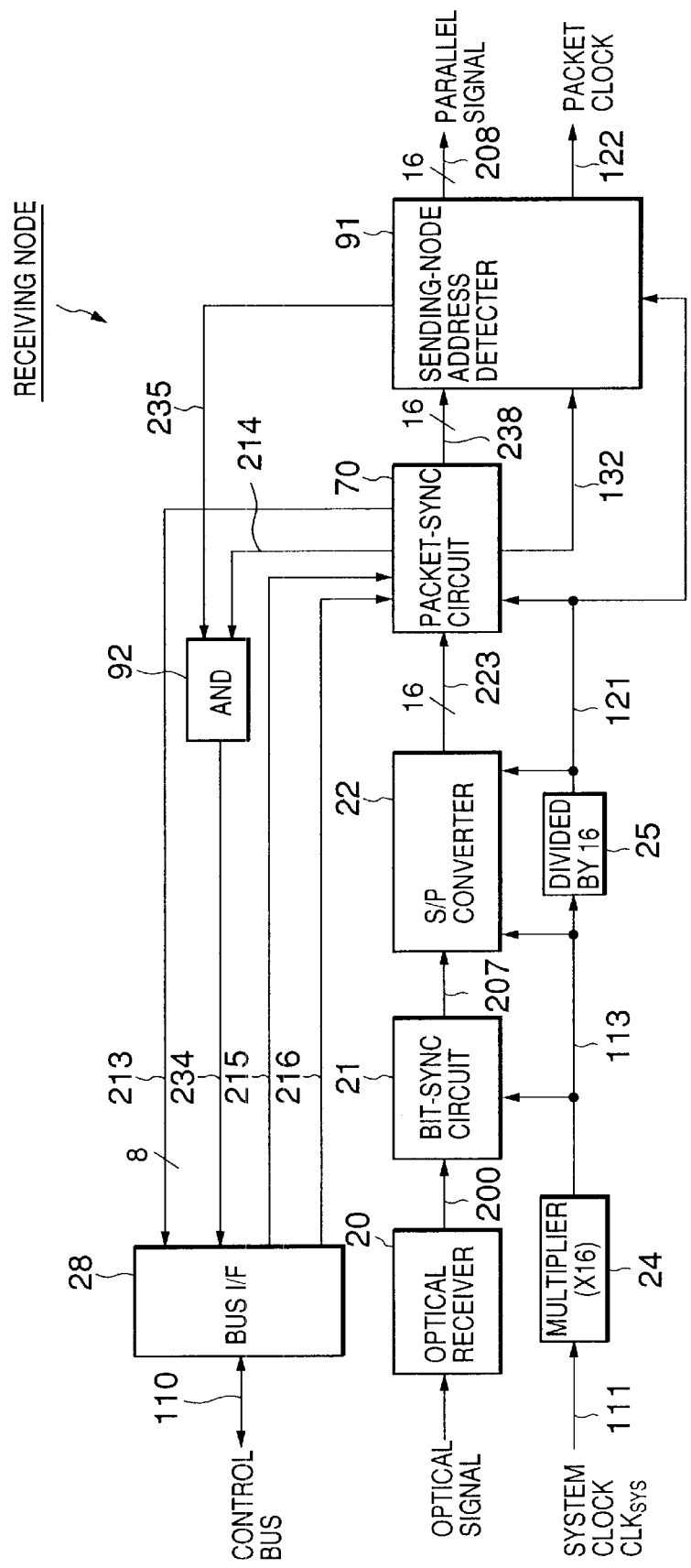
FIG. 37 is a block diagram showing a constitution of a receiving node according to the seventh embodiment of the present invention.

FIG. 37 shows the circuit configuration of a receiving node according to the seventh embodiment of the present invention. In FIG. 37, excepting the additions of a sending-node address detector 91 and an AND circuit 92, the constitution of the receiving node according to the seventh embodiment of the present invention is identical to that of the fourth embodiment of the present invention. Therefore, similar circuit blocks are denoted by the same reference numerals.

Referring to FIG. 37, the sending-node address detector 91 reads the sending-node address e appended to a received packet, and, when the read sending-node address is identical to the number of its own node, changes an address match signal 235 to "1", and otherwise, to "0". For instance, the receiving node 2.1 has the number of node "0000000000000001". Therefore, when the sending-node address read out in the receiving node 2.1 is "0000000000000001", the address match signal 235 is changed to "1".

The AND circuit 92 outputs a logical AND of the address match signal 235 and the strobe signal 214 output from the packet synchronization 70 as a strobe signal 234 to the bus interface 28. That is, the strobe signal 234 is valid only when the packet sent from the sending node has the same number as its own node.

As in the fourth embodiment of the present invention, the seventh embodiment of the present invention has three operation modes: the switch timing detection mode, the delay adjustment mode, and the packet transmission mode. At the initial state, that is, at start-up, operation is in the switch timing detection mode, followed by the delay adjustment mode, and further followed by the packet transmission mode. The operation of the seventh embodiment in the switch timing detection mode is the same as that of the fourth embodiment of the present invention. Furthermore, the operation in the delay adjustment mode is also the same as the fourth embodiment, excepting the sending-node address appended to a packet. Therefore, only the operation in the packet transmission mode will be explained hereafter.

In the packet transmission mode, the CPU 5 changes the mode signal 217 of all the sending nodes to "10", and the enable signal 216 of the receiving node to "0". Furthermore, the CPU 5 keeps the trigger signal 215 at "1" at all times. The delay control signal 210 preserves the value at the end of the delay adjustment mode. The sending node deems the input data to be a payload c, and sends the packet after appending a bit synchronization pattern b, a packet synchronization pattern d, and a sending-node address e to the payload c. The packet switching system 3 switches packets according to a command received from the controller 31, and the receiving node receives the packet.

As in the delay adjustment mode, the receiving node detects the head receive timing. In this case, since the trigger signal 215 is constantly "1", the error detector 83 updates the error signal 213 every time it receives a packet, and simultaneously changes the strobe signal 214 to "1". As mentioned earlier, the address match signal 235 is "1" only when receiving a packet from a sending node with the same number as its own node. Since the strobe signal 234 is the logical AND of the strobe signal 214 and the address match signal 235, the error signal 213 is written onto the bus interface 28 and then sent to the CPU 5 only when the received packet is transmitted by a sending node with the same number as its own node.

The CPU 5 monitors the error signals 213 received from the receiving nodes, and when the respective error signals are larger than a first predetermined threshold value or smaller than a second predetermined threshold value, the CPU 5 produces an alarm and returns the packet switching network to its initial state, and thereafter operates in the switch timing detection mode, delay adjustment mode and the packet transmission mode again.

By the above operation, in the packet switching network according the seventh embodiment of the present invention, the error signal 213 is monitored during operation in the packet transmission mode. For instance, when the amount of delay of the optical fiber alters due to a change in temperature, a time difference arises between the timing of the passing of the packet through the optical switch and the switch timing, resulting in no switch taking place during the guard time a. Since such changes are expressed as an increase or decrease in the error signal 213, when the error signal 213 reaches a value higher than the first threshold value or less than the second threshold value, it is possible to prevent deviation of the switch timing from the guard time by performing operation in the timing detection mode and the delay adjustment mode again.

Eighth Embodiment

Figure 38:
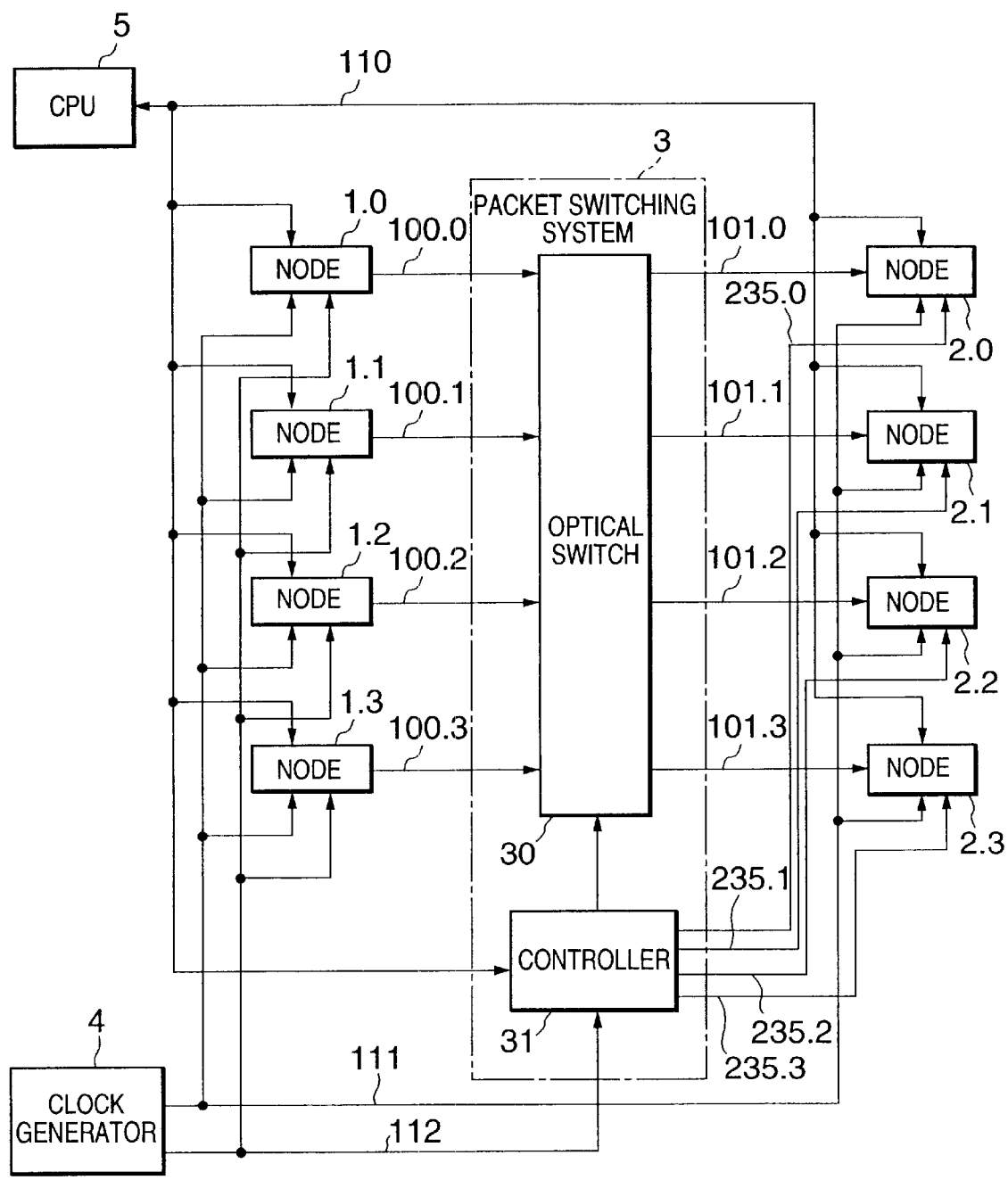
FIG. 38 is a block diagram showing a constitution of a packet switching network according to an eighth embodiment of the present invention.

FIG. 38 shows the configuration of a packet switching network according to an eighth embodiment of the present invention. In FIG. 38, the packet switching network according to the eighth embodiment of the present invention is a 4×4 packet switching network in which address match signals 235.0 to 235.3 are sent from the controller 31 to the receiving nodes 2.0 to 2.3, respectively. Furthermore, the constitution of each of the sending nodes 1.0 to 1.3 according to the eighth embodiment of the present invention is the same as that of the fourth embodiment of the present invention.

Figure 39:
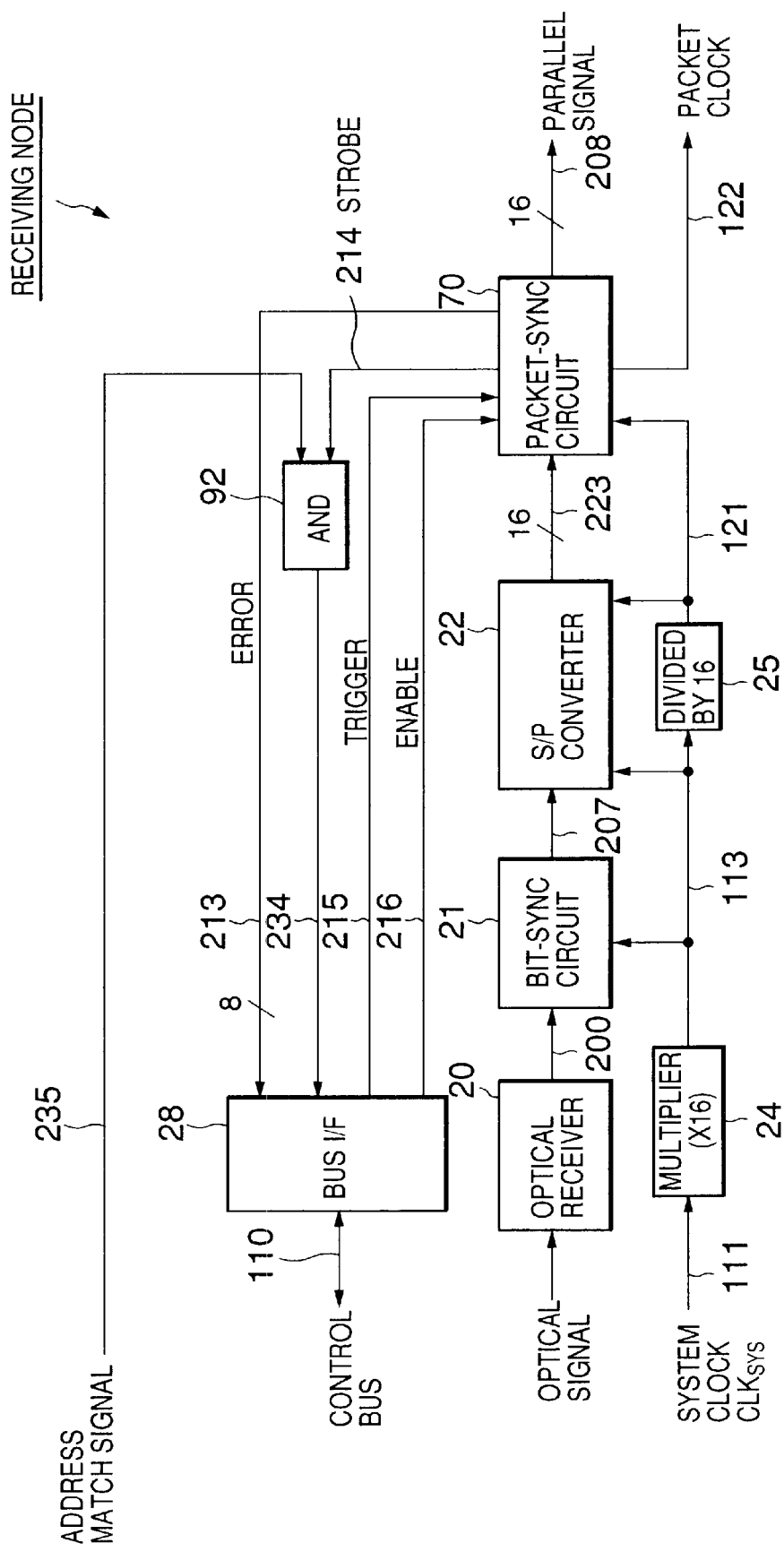
FIG. 39 a block diagram showing a constitution of a receiving node according to the eighth embodiment of the present invention.

FIG. 39 shows the circuit configuration of a receiving node according to the eighth embodiment of the present invention. As shown in FIG. 39, the constitution of the receiving node according to the eighth embodiment is the same as that of the fourth embodiment as shown in FIG. 25, with the exception of an additional AND circuit 92. Therefore, other circuit blocks are denoted by the same reference numerals.

Referring to FIG. 39, the AND circuit 92 outputs a logical AND of the strobe signal 214 received from the packet sync circuit 70 and the address match signal 235 received from the controller 31 as a strobe signal 234 to the CPU 5 through the bus interface 28 and the control bus 110. In all other respects, the constitution and the packet constitution of the eighth embodiment of the present invention are the same as those of the fourth embodiment of the present invention.

As in the fourth embodiment of the present invention, the eighth embodiment of the present invention has three operation modes: the switch timing detection mode, the delay adjustment mode, and the packet transmission mode. In the initial state, that is, at start-up, the embodiment operates in the switch timing detection mode, followed by the delay adjustment mode, and further followed by the packet transmission mode. The operation of the eighth embodiment in the switch timing detection mode and the delay adjustment mode is the same as that of the fourth embodiment of the present invention. Accordingly, only the operation in the packet transmission mode will be explained hereafter.

In the packet transmission mode, the CPU 5 changes the mode signal 217 of all the sending nodes to "10", and the enable signal 216 of the receiving node to "0". Furthermore, the CPU 5 keeps the trigger signal 215 at "1". The delay control signal 210 preserves the value at the end of the delay adjustment mode. The sending node deems the input data to be a payload c, and transmits a packet after appending a bit synchronization pattern b, and a packet synchronization pattern d to the payload c. The packet switching system 3 switches the packet according to a command from the controller 31, and the receiving node receives the packet.

The controller 31 receives a request signal (not shown) indicating the destination of a packet from a buffer (not shown) in the front stage of the sending node, and then the controller 31 controls the optical switch 30 in accordance with the arbitration result of the request signal. Accordingly, the controller 31 knows the source nodes and the destination nodes for all the packets passing through. Here, in the case where a packet is sent from a sending node to a receiving node having the same number of node as that of the sending node, the controller 31 changes the address match signal 235 sent to the receiving node to "1". Otherwise, the controller 31 changes the address match signal 235 to "0". For instance, when a packet is sent from the sending node 1.0 to the receiving node 2.0, the controller 31 changes the address match signal 235.0 to "1". Similarly, when a packet is sent from the sending node 1.3 to the receiving node 2.3, the controller 31 also changes the address match signal 235.0 to "1".

Hereinafter, an operation in the case of the sending node 1.0 and the receiving node 2.0 will be explained. The other sending nodes and receiving nodes operate in the same way as the sending node 1.0 and the receiving node 2.0. The receiving node 2.0 detects the head receive timings as in the delay adjustment mode. In such a case, since the trigger signal 215 is constantly at "1", the error detector 83 updates the error signal 213 every time it receives a packet, and at the same time changes the strobe signal 214 to "1".

Here, when the received packet is sent by the sending node 1.0, since the address match signal 235 is "1", the error signal 213 is written onto the bus interface 28 according to the strobe signal 234, and is sent to the CPU 5.

In the case where the error signal 213 is greater than the first predetermined threshold value or smaller than the second predetermined threshold value, the CPU 5 calculates a new delay control signal 210 using the error signal 213 as a reference, and sends it to the variable delay circuit 15 of the sending node 1.0. The variable delay circuit 15 changes the amount of delay in accordance with the new delay control signal 210. The timing of change in delay value is controlled so as to occur during the guard time a, so that the packet is not damaged.

As explained above, in the packet switching network according to the eighth embodiment of the present invention, the error signal 213 is monitored during operation in the packet transmission mode, and when the error signal 213 is larger than the first threshold value or smaller than the second threshold value, it is fed back to the sending node and the amount of delay is re-adjusted. Therefore, even when the switch timing and the timing of the passing of the packet deviate due to change in temperature and the like, this is automatically corrected, thereby preventing the switch timing from deviating from the guard time a.

Furthermore, in the seventh embodiment of the present invention, the packet whose timing is to be monitored by the receiving node reading the sending-node address e appended to the packet, that is, the packet to be sent from the sending node to the receiving node of the same number is determined. In the eighth embodiment of the present invention, the same operation is carried out by the controller 31, which outputs the address match signal 235 to the receiving node. Therefore, the eighth embodiment of the presentation has an advantage that the overhead of a packet is smaller than that of the seventh embodiment of the present invention.

As described above, in the first to the eighth embodiments of the present invention, the packet switching network is a 4×4 switching network, but the numbers of sending nodes, receiver nodes, and ports of the packet switching system 3 can be arbitrarily determined. Furthermore, the transmission rate per node, the number of stages for parallel/serial conversion, the lengths and the bit patterns of the guard time a, the bit synchronization pattern b, the packet synchronization pattern d, and the idle pattern, and the length of the payload c can also be set as desired.

In the first to the eighth embodiments of the present invention, the optical switch 30 is used for the packet switching system 3. Alternatively, however, an electric switch can be used instead. Furthermore, even when the optical switch 30 is used, the constitutions and the operation principles are optional. For instance, it is also possible to use an electrooptic switch formed on a substrate of acidic niobium lithium, or a mechanical switch for mechanically switching couplings of optical fibers, etc.

In the first to the eighth embodiments of the present invention, a CPU is used to control delay adjustment and the like. However, the control means is not restricted to a CPU. For instance, all control may be carried out by hardware such as logical circuits. Furthermore, although a bus is used to connect the CPU, the sending nodes, the receiving nodes, the packet switch, and the like, the connection means is not restricted to a bus. For instance, a plurality of elements to be controlled may be connected by separate control lines.

Figure 40A:
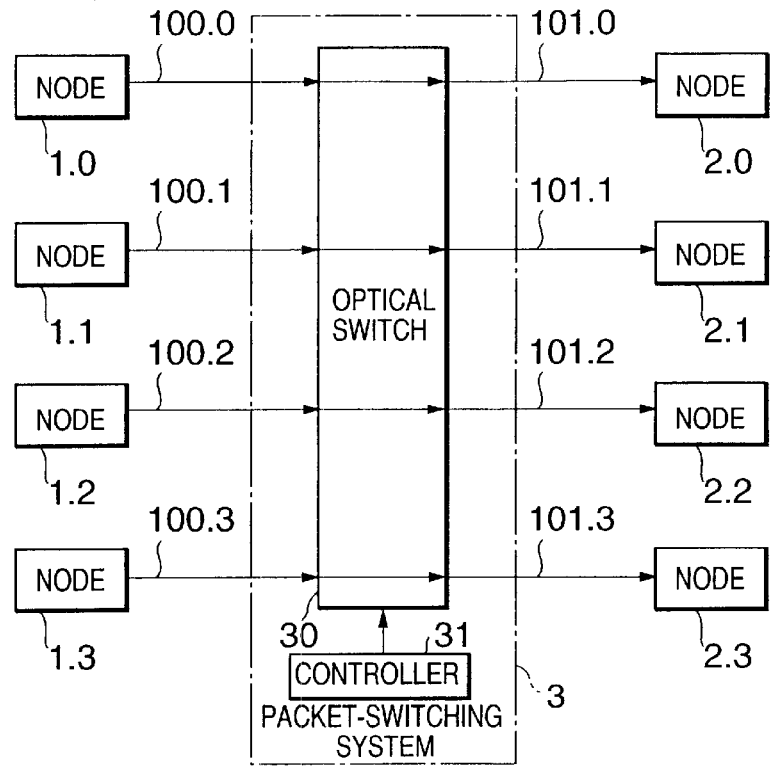
FIG. 40A and 40B are diagrams showing modifications of a connection of a packet switch in a switch timing detection mode according to the eighth embodiment of the present invention.
Figure 40B:
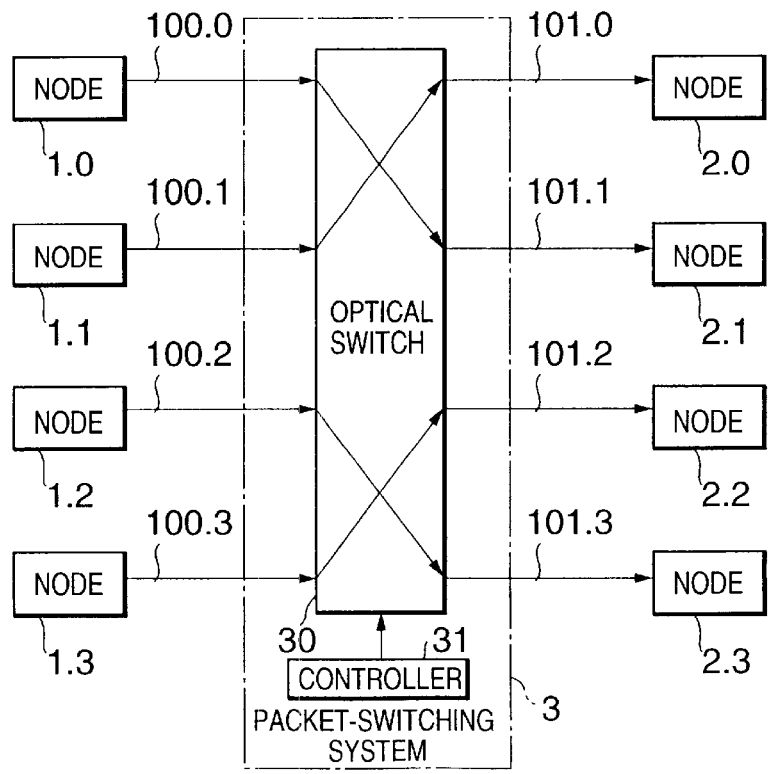
Figure 41A:
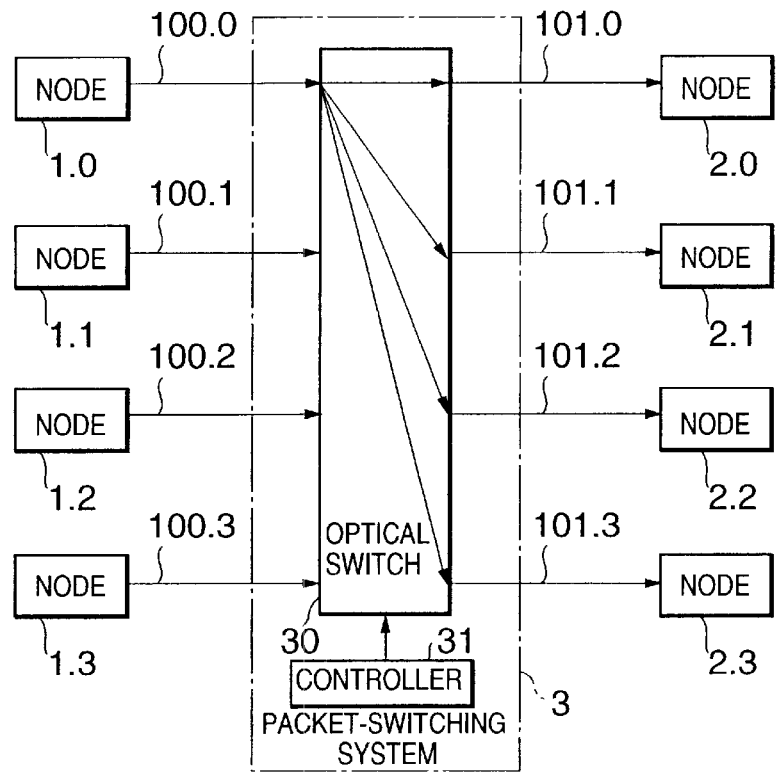
FIGS. 41A and 41B are diagrams showing other modifications of a connection of a packet switch in an switch timing detection mode according to the third to eighth embodiments of the present invention.
Figure 41B:
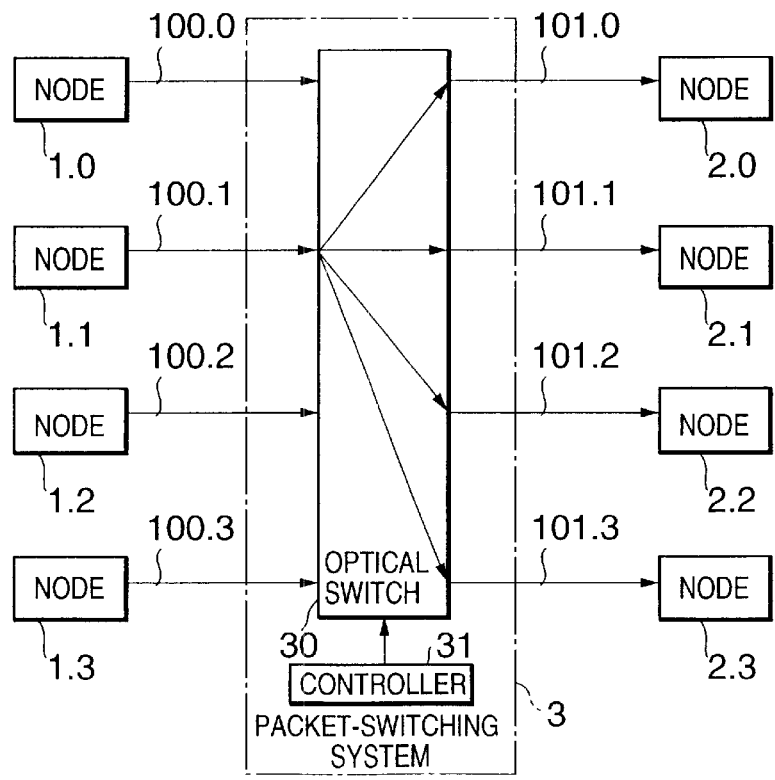

In the third to the eighth embodiments of the present invention, a combination of sending and receiving nodes to be connected in the switch timing detection and delay adjustment modes is not restricted to those described. For instance, in the switch timing detection mode, instead of alternately switching between the connections of FIGS. 17A and 17B, combinations of the connections of FIGS. 39A and 39B or those of FIGS. 40A and 40B may be employed.

Furthermore, in the delay adjustment mode, after first connecting the sending node 1.0 and the receiving node 2.0, the delay of the sending node 1.1 is adjusted, and then after connecting the sending node 1.1 and the receiving node 2.0, the delay of the sending node 1.1 is adjusted, and so on, so as to adjust the delays of all the sending nodes. There are varieties of combining connections.

The switch timing detect means and the head detect means used in the third to the eighth embodiments of the present invention can be replaced with other means. For instance, the means used in the first embodiment of the present invention may be used as a switch timing detection means, and also as the head receive detection means for detecting the head of a packet by monitoring a signal waveform in an analog fashion in a similar manner to that of the switch timing detection means used in the first embodiment.

In the delay adjustment mode in the third to eighth embodiments, the delay adjustment is carried out once for each sending node. However, the number of delay adjustments is not limited to one. For instance, it is acceptable to use a method in which an error signal is obtained approximately three times, and an average of these error signals is used.

In the sixth embodiment of the present invention, the path lengths of the optical variable delay devices 37.0 to 37.15 for absorbing the skews inside the packet switching system 3 were varied by altering the tension applied to the optical fibers. However, the components and the constitution of the optical variable delay devices 37.0 to 37.15 are not limited to those described above. For instance, it is acceptable to use a collimated optical system with variable distance between two lenses, or such like. Furthermore, the absorption of skews is possible not just by using the optical variable delay devices 37.0 to 37.15, but it is also possible by adjusting the delays applied to the control signals which are used to individually switch the optical gate switches 34.0 to 34.15 ON and OFF.

As described in detail in the descriptions of the first to eighth embodiments of the present invention, an object of the present invention is to provide means for synchronizing the operation of a packet switching network comprising an analog switch which does not originally operate in synchronization.

In this way, in a packet switching network comprising the multiple sending nodes 1.0 to 1.3 for sending packets, and the packet switching system 3 for switching the packets sent from each of the sending nodes 1.0 to 1.3, and the multiple receiving nodes 2.0 to 2.3 which receive packets switched by the packet switching system 3, wherein the guard time a is set at the boundary of packets, each of the receiving nodes is provided with; a switch timing detector 26 for detecting the switch timing of the packet switching system 3 and outputting a switch timing signal; and a timing holder 27 for storing the switch timings. Therefore, the receiving nodes 2.0 to 2.3 can operate without adjusting the lengths of the paths from the packet switching system 3 to the receiving nodes 2.0 to 2.3, in synchronization with the switch timing of the packet switching system 3.

As a result, the entire network can be synchronously operated merely by precisely adjusting the path lengths from the sending nodes 1.0 to 1.3 to the packet switching system 3. Therefore, a packet can be synchronized without appending a packet synchronization pattern thereto, making it possible to reduce the latency of packet transmission.

In a packet switching network comprising the multiple sending nodes 1.0 to 1.3 for sending packets, and the packet switching system 3 for switching the packets sent from each of the sending nodes 1.0 to 1.3, and the multiple receiving nodes 2.0 to 2.3 which receive packets switched by the packet switching system 3, wherein the guard time a is set at the boundary of packets, each of the sending nodes is provided with a variable-delay circuit 15 for applying a variable delay to the sending nodes 1.0 to 1.3 therefore, the delay occurring from the sending nodes 1.0 to 1.3 to the packet switching system 3 can be easily adjusted. Consequently, the sending nodes 1.0 to 1.3 are able to operate in synchronization with the switch timing of the packet switching system 3, even without precisely adjusting the lengths of the paths from the sending nodes 1.0 to 1.3 to the packet switching system 3.

As a result, the length of the guard time a, provided between the packets to enable the packet switching system 3 to carry out switching, can be minimized, and the entire network can be operated synchronously merely by precisely adjusting the lengths of the paths from the packet switching system 3 to the receiving nodes 2.0 to 2.3. Therefore, a packet can be synchronized without for instance appending a packet synchronization pattern thereto, making it possible to reduce the latency of the packet transmission.

Each of the receiving nodes 2.0 to 2.3 further comprise an switch timing detector 26 for detecting the switch timing of the packet switching system 3 and outputting it as an switch timing signal, a header receive timing detector 56 for detecting the header receive timing of a packet and outputting it as a header receive timing signal, and a controller 82 for determining the time difference between an switch timing and a header receive timing. By feeding back the time difference to the variable-delay circuit 15 of each of the sending nodes 1.0 to 1.3 as the amount of delay to be applied to the packet, the delays from the sending nodes 1.0 to 1.3 to the packet switching system 3 can be adjusted automatically. In this case, all the sending nodes 1.0 to 1.3 and the receiving nodes 2.0 to 2.3 can be operated in synchronization with the switch timing of the packet switching system 3, without adjusting the lengths of the paths from the sending nodes 1.0 to 1.3 to the packet switching system 3 and the lengths of the paths from the packet switching system 3 to the receiving nodes 2.0 to 2.3.

In the packet switch, in which a first sending node sends a first signal pattern identical to the bit synchronization pattern, and a second sending node sends a second signal pattern different from the bit synchronization pattern, a receiving node which receives an output signal of a given output port of the packet switch detects a switching timing by monitoring a pattern change point from the signal sent from the first sending node to the signal sent from the second sending node, or from the signal sent from the second sending node to the signal sent from the first sending node. As a result, switch timing can be detected using only a logic circuit, resulting in reduced cost. Furthermore, since this detection method is not dependent on an analog waveform, switch timing can be detected with strong resistance to noise and at high precision.

An switch timing signal comprises information showing the order of the clock period the switching occurs, and information showing the position of the switching within a parallel signal in that clock period. Consequently, the switch timing detector 26 can be formed with a parallel circuit. Furthermore, this constitution enables the operation clock frequency to be lowered, making it possible to produce the switch timing detector 26 by using an inexpensive semiconductor process, further reducing costs. Moreover, this constitution enables the resolution of the switch timing signal to be made sufficiently small, while representing a wide range of switch timings.

Each of the sending nodes 1.0 to 1.3 sends a packet after appending a packet synchronization pattern thereto, and one of the receiving nodes 2.0 to 2.3 detects the head receive timing of the packet by detecting the packet synchronization pattern. Therefore, the head receive timing of a packet can be detected using only a logic circuit, enabling costs to be reduced. Furthermore, since this detection method is not dependent on an analog waveform, the head receive timing can be detected with strong resistance to noise and at high precision.

A head receive timing signal comprises information showing the order of a clock period the head is received and information showing the position of the head receive timing within a parallel signal in that clock period. Consequently, the head receive timing detector 56 can comprise a parallel-connected circuit. Furthermore, this constitution enables the operation clock frequency to be lowered, making it possible to realize the head receive timing detector 56 by an inexpensive semiconductor process, further reducing costs. Moreover, this constitution enables the resolution of the head receive timing signal to be made sufficiently small, while representing a wide range of head receive timings.

The variable-delay circuit 15 comprises a shift register 60 comprising multiple flip-flops 61.1 to 61.15 or registers 63.1 to 63.15 connected in series, and a selector 62 for selecting and outputting one of the outputs received from the flip-flops 61.1 to 61.15 or the registers 63.1 to 63.15. Consequently, the variable-delay circuit 15 can be formed with only a logic circuit, enabling it to be realized at low cost. Furthermore, the amount of delay of the variable-delay circuit 15 can be set exactly to a multiple integral of the clock period, enabling it to be highly precise.

Since the variable-delay circuit 15 comprises a bit rotator for rotationally outputting the bits of a serial signal in sequence, the variable-delay circuit 15 can be formed with only a logic circuit and the operation clock frequency can be lowered, enabling it to be realized at extremely low cost. Further, the variable step of delay of the variable-delay circuit 15 can be sufficiently reduced, enabling the delay to be adjusted with high precision.

The sending nodes 1.0 to 1.3 send packets after appending packet synchronization patterns thereto, the receiving nodes 2.0 to 2.3 detect the packet synchronization patterns to establish frame and packet synchronization. In addition, in the receiving nodes 2.0 to 2.3, a certain fixed period of time, taking as its center the timing at which a packet synchronization pattern is detected for the first time, is deemed a window, and from the next packet onward, packet synchronization patterns are detected only within the window. Consequently, it is possible to realize the forward and backward protections for frame synchronization or packet synchronization. With this method, the backward protection reduces the possibility of erroneous synchronization to patterns other than the predetermined synchronization pattern, and the forward protection prevents synchronization failures caused by bit errors in the synchronization pattern.

The difference between the switch timing and the head receive timing determined on the first transmission path running from the first sending node, via the first input port of the packet switching system 3 and the first switch element, to the first receiving node, is deemed a first time difference. The difference between the switch timing and the head receive timing determined on the second transmission path running from the first sending node, via the first input port of the packet switching system 3 and the second switch element, to the second receiving node, is deemed a second time difference. Then, the difference between the first and second time differences is fed back to the delay from the first input port to the first switch element, or to the delay from the first input port to the second switch element, thereby enabling skews in the packet switching system 3 to be automatically absorbed.

According to the present invention described above, a packet switching network comprises a plurality of sending nodes for sending packets, a packet switch for switching packets received from the sending nodes, and a plurality of receiving nodes for receiving the packets switched by the packet switch. Further, a guard time is provided at the boundary between packets. At least one of the receiving nodes is comprised of: a switch timing detection means for detecting the switch timing of the packet switch and outputting the detected switch timing as a switch timing signal; and a timing memory means for storing switch timings. Consequently, the length of the guard time can be reduced to a minimum, and the transmission efficiency of the network can be raised, without precisely adjusting the length of the transmission path.

What is claimed is:

1. A packet switching network comprising:

a plurality of sending nodes;

a plurality of receiving nodes; and a packet switch for switching packets from the sending nodes to the receiving nodes, wherein the sending nodes send the packet switch packets each having a guard time added thereto and the receiving nodes receive the packets from the packet switch, each of the sending nodes comprising:

a delay controller for adjusting an amount of delay of a packet to be sent so that the network operates in synchronization with the switch timing of the packet switch;

wherein each of the receiving nodes comprises:

a switch timing detector for detecting switch timing of the packet switch based on a serial signal received from the packet switch;

a packet head detector for detecting head receive timing of a packet based on a packet synchronization pattern included in the packet received from the packet switch, and a time difference detector for detecting a time difference between the switch timing and the head receive timing, wherein the delay controller changes the amount of delay of a packet to be sent depending on the time difference;

wherein the switch timing detector detects the switch timing of the packet switch by determining a change in timing of the serial signal between a first predetermined bit pattern and a second predetermined bit pattern;

wherein first and second sending nodes send the first and second predetermined bit patterns, respectively, and the packet switch alternately switches the first and second predetermined bit patterns from the first and second sending nodes to a receiving node;

wherein the switch timing detector of the receiving node detects the switching timing of the packet switch by detecting a change in bit pattern between the first and second predetermined bit patterns.

2. The packet switching network according to claim 1, wherein each of the receiving nodes comprising a synchronization detector for detecting packet synchronization of the serial signal received from the packet switch, wherein the delay controller changes the amount of delay of a packet to be sent depending on whether the packet synchronization is established.

3. The packet switching network according to claim 1, wherein the switch timing detector detects the switch timing of the packet switch by monitoring a change of the serial signal consisting of a series of bits.

4. The packet switching network according to claim 1, wherein the switch timing detector determines the switching timing of the packet switch based on information as to a period of a reference clock and a bit position of a parallel signal produced from the serial signal in the period where the switch occurs.

5. The packet switching network according to claim 1, wherein each of the sending nodes sends a packet having the packet synchronization pattern added thereto.

6. A packet switching network comprising:

a plurality of sending nodes;

a plurality of receiving nodes; and a packet switch for switching packets from the sending nodes to the receiving nodes, wherein the sending nodes send the packet switch packets each having a guard time added thereto and the receiving nodes receive the packets from the packet switch, each of the sending nodes comprising:

a delay controller for adjusting an amount of delay of a packet to be sent so that the network operates in synchronization with the switch timing of the packet switch wherein the delay controller comprises:

a shift register having a single input terminal and a plurality of parallel output terminals, for storing input data in series and outputting the input data in parallel; and a selector for selecting one of the parallel output terminals of the shift register to produce a desired amount of delay.

7. A packet switching network comprising:

a plurality of sending nodes;

a plurality of receiving nodes; and a packet switch for switching packets from the sending nodes to the receiving nodes, wherein the sending nodes send the packet switch packets each having a guard time added thereto and the receiving nodes receive the packets from the packet switch, each of the sending nodes comprising:

a delay controller for adjusting an amount of delay of a packet to be sent so that the network operates in synchronization with the switch timing of the packet switch wherein the delay controller comprises:

a first variable delay controller for changing an amount of delay in relatively large steps; and a second variable delay controller following the first variable delay controller, for changing an amount of delay in relatively small steps;

wherein the first variable delay controller comprises:

a plurality of registers connected in series, for storing input data in series, wherein each of the resisters outputs data stored therein; and a first selector for selecting one of the registers to output data of a selected register to the second variable delay controller, and the second variable delay controller comprises:

a bit rotator for rotating bit order of data received from the first selector to produce a plurality of sequences of data; and a second selector for selecting one of the sequences of data.

* * * * *